US012756956B2

(12) United States Patent
Ikuma et al.

(10) Patent No.: US 12,756,956 B2
(45) Date of Patent: Oct. 6, 2026

(54) SOLID-STATE IMAGING APPARATUS, IMAGING APPARATUS, AND DISTANCE-MEASURING IMAGING APPARATUS

(71) Applicant: Nuvoton Technology Corporation Japan, Kyoto (JP)

(72) Inventors: Makoto Ikuma, Hyogo (JP); Yutaka Abe, Osaka (JP); Takayasu Kito, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 156 days.

(21) Appl. No.: 18/530,088

(22) Filed: Dec. 5, 2023

(65) Prior Publication Data

US 2024/0121533 A1 Apr. 11, 2024

Related U.S. Application Data

(63) Continuation of application No. PCT/JP2022/017786, filed on Apr. 14, 2022.

(30) Foreign Application Priority Data

Jun. 9, 2021 (JP) ................................ 2021-096556

(51) Int. Cl.
*H04N 25/772* (2023.01)
*H04N 25/57* (2023.01)

(52) U.S. Cl.
CPC ........... *H04N 25/772* (2023.01); *H04N 25/57* (2023.01)

(58) Field of Classification Search
CPC ...... H04N 25/59; H04N 25/772; H04N 25/57; H04N 25/616; H04N 25/00; H04N 25/51; H04N 25/771; H04N 25/78; H04N 25/79
(Continued)

(56) References Cited

U.S. PATENT DOCUMENTS

2004/0041927 A1* 3/2004 Cho ........................ H04N 23/70 348/E3.018
2006/0011810 A1 1/2006 Ando et al.
(Continued)

FOREIGN PATENT DOCUMENTS

CN 110679141 A * 1/2020 ................ G01J 1/46
EP 1746820 A1 * 1/2007 ........... H04N 23/741
(Continued)

OTHER PUBLICATIONS

International Search Report (ISR) issued on Jul. 5, 2022 in International (PCT) Application No. PCT/JP2022/017786.
(Continued)

*Primary Examiner* — Lin Ye
*Assistant Examiner* — Steven Daniel Barry
(74) *Attorney, Agent, or Firm* — Rimon P.C.

(57) ABSTRACT

A solid-state imaging apparatus includes a pixel circuit, a detection and selection circuit, and an AD conversion circuit. The pixel circuit outputs a plurality of pixel signals corresponding to mutually different gains or sensitivities. The detection and selection circuit compares one or more of the plurality of pixel signals with a reference value to generate a signal selection signal that instructs selection of a pixel signal among the plurality of pixel signals. The detection and selection circuit includes a sample and hold circuit that holds the plurality of pixel signals, and selects at least one pixel signal among the plurality of pixel signals held in the sample and hold circuit based on the signal selection signal. The detection and selection circuit is arranged in a stage before the AD conversion circuit that AD converts the at least one pixel signal selected.

20 Claims, 40 Drawing Sheets

(58) Field of Classification Search
USPC .......................................................... 348/294
See application file for complete search history.

(56) References Cited

U.S. PATENT DOCUMENTS

| | | | | |
|---|---|---|---|---|
| 2013/0027589 A1* | 1/2013 | Johansson | G06T 5/70 | 348/241 |
| 2013/0271633 A1* | 10/2013 | Hashimoto | H04N 25/616 | 348/300 |
| 2015/0249795 A1* | 9/2015 | Cho | H04N 25/611 | 348/251 |
| 2018/0031808 A1* | 2/2018 | Yao | G02B 9/62 | |
| 2019/0305792 A1* | 10/2019 | Hasegawa | H04N 25/76 | |
| 2020/0412987 A1* | 12/2020 | Okada | H04N 25/65 | |
| 2021/0112216 A1* | 4/2021 | Choi | G01S 17/894 | |

FOREIGN PATENT DOCUMENTS

| | | | | | |
|---|---|---|---|---|---|
| JP | 3976754 | B | | 6/2007 | |
| JP | 2016012904 | A | * | 1/2016 | H04N 25/70 |
| JP | 2018504013 | A | * | 2/2018 | H04N 23/815 |
| JP | 2019092143 | A | * | 6/2019 | H04N 25/77 |
| WO | WO-2018021053 | A1 | * | 2/2018 | H04N 25/76 |
| WO | WO-2020045373 | A1 | * | 3/2020 | H03M 1/74 |

OTHER PUBLICATIONS

Extended European Search Report dated Jun. 20, 2024 issued in the corresponding European Patent Application No. 22819949.3.

* cited by examiner

| | | | | | | | |
|---|---|---|---|---|---|---|---|
| B | Gb | B | Gb | B | Gb | B | Gb |
| Gr | R | Gr | R | Gr | R | Gr | R |

| | | | | | | | |
|---|---|---|---|---|---|---|---|
| B | Gb | B | Gb | B | Gb | B | Gb |
| Gr | R | Gr | R | Gr | R | Gr | R |

SOLID-STATE IMAGING APPARATUS, IMAGING APPARATUS, AND DISTANCE-MEASURING IMAGING APPARATUS

CROSS REFERENCE TO RELATED APPLICATIONS

This is a continuation application of PCT International Application No. PCT/JP2022/017786 filed on Apr. 14, 2022, designating the United States of America, which is based on and claims priority of Japanese Patent Application No. 2021-096556 filed on Jun. 9, 2021. The entire disclosures of the above-identified applications, including the specifications, drawings, and claims are incorporated herein by reference in their entirety.

FIELD

The present disclosure relates to a solid-state imaging apparatus, an imaging apparatus, and a distance-measuring imaging apparatus.

BACKGROUND

Patent literature (PTL) 1 discloses a method for achieving a wide dynamic range in a solid-state imaging apparatus.

CITATION LIST

Patent Literature

PTL 1: Japanese Patent No. 3976754

SUMMARY

Technical Problem

The solid-state imaging apparatus disclosed in PTL 1 selectively reads one digital signal from a plurality of digital signals generated by AD converting a plurality of pixel signals. Because this technique involves AD converting a plurality of pixel signals, it is difficult to both increase speed and reduce power.

In view of this, the present disclosure provides a solid-state imaging apparatus, an imaging apparatus, and a distance-measuring imaging apparatus that increase speed and reduce power, as well as simultaneously extend the dynamic range.

Solution to Problem

In order to overcome the above problem, a solid-state imaging apparatus according to one aspect of the present disclosure includes a pixel circuit, a detection and selection circuit, and an AD conversion circuit. The pixel circuit outputs a plurality of pixel signals corresponding to mutually different gains or sensitivities. The detection and selection circuit compares one or more of the plurality of pixel signals with a reference value to generate a signal selection signal that instructs selection of a pixel signal among the plurality of pixel signals. The detection and selection circuit includes a sample and hold circuit that holds the plurality of pixel signals, and selects at least one pixel signal among the plurality of pixel signals held in the sample and hold circuit based on the signal selection signal. The detection and selection circuit is arranged in a stage before the AD conversion circuit that AD converts the at least one pixel signal selected.

An imaging apparatus according to one aspect of the present disclosure includes: the solid-state imaging apparatus according to the above one aspect that captures an image of a subject; an imaging optical system that guides incident light from the subject to the solid-state imaging apparatus; and a signal processor that processes an output signal from the solid-state imaging apparatus.

A distance-measuring imaging apparatus according to one aspect of the present disclosure includes: the solid-state imaging apparatus according to the above one aspect that controls driving of a light source to emit pulsed light to a target and captures reflected light from the target; an imaging optical system that guides the reflected light from the target to the solid-state imaging apparatus; and a signal processor that processes an output signal from the solid-state imaging apparatus.

Advantageous Effects

The solid-state imaging apparatus, the imaging apparatus, and the distance-measuring imaging apparatus according to the present disclosure can increase speed and reduce power as well as extend the dynamic range.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
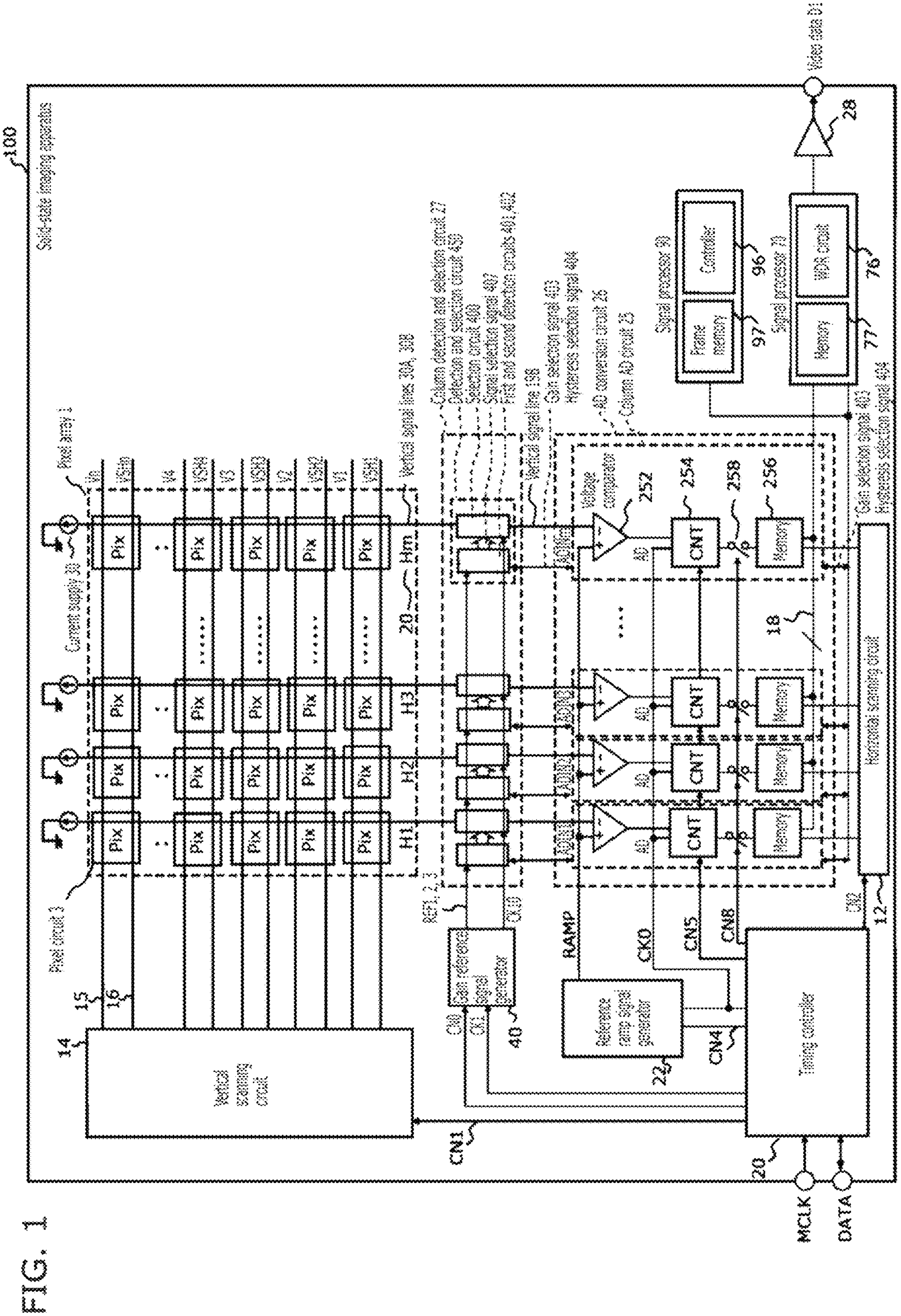
FIG. 1 is a block diagram of a configuration example of a solid-state imaging apparatus including a pixel circuit and a column detection and selection circuit according to Embodiment 1

Underlying Knowledge Forming Basis of the Present Disclosure

The inventors have found that the following issues arise in connection with a solid-state imaging apparatus described in the Background section above.

The solid-state imaging apparatus disclosed in PTL 1 redundantly reads all of the digital signals resulting from AD converting the pixel signals in order to selectively read one signal from a plurality of signals. This makes it difficult to increase speed and reduce power in a previous stage including the AD converter.

More specifically, since the AD conversion circuit performs signal processing for all of the plurality of signals, it is difficult to increase speed and reduce power. It is also difficult to make improvements to achieve increased speed in the pixel array.

It is also necessary to wait for the vertical signal lines to converge for all of the plurality of pixel signals, making it difficult to increase speed and reduce power in this regard. In particular, parasitic resistance and capacitance of vertical signal lines increase as pixel size or number increases, making convergence an important issue.

One conceivable measure is a configuration in which the vertical signal lines of the pixel array are divided per a set of a plurality of lines or per line as a minimum unit (i.e., per pixel) to minimize the convergence time of the vertical signal lines, and one or two pixel signals are selectively read out from the plurality of signals upon being output from the pixel circuit.

This further enables faster convergence time, increased speed and reduced power in all areas of analog and digital processing, including the pixel array and the AD conversion circuit, as well as an extended dynamic range.

In view of this, the present disclosure provides a solid-state imaging apparatus, an imaging apparatus, and a distance-measuring imaging apparatus that can increase speed and reduce power, as well as extend the dynamic range.

Hereinafter, a solid-state imaging apparatus, an imaging apparatus, and a distance-measuring imaging apparatus according to embodiments for implementing the present disclosure will be described with reference to the drawings.

As described in the above overview, a solid-state imaging apparatus according to one aspect of the present disclosure includes a pixel circuit, a detection and selection circuit, and an AD conversion circuit. The pixel circuit outputs a plurality of pixel signals corresponding to mutually different gains or sensitivities. The detection and selection circuit compares one or more of the plurality of pixel signals with a reference value to generate a signal selection signal that instructs selection of a pixel signal among the plurality of pixel signals. The detection and selection circuit includes a sample and hold circuit that holds the plurality of pixel signals, and selects at least one pixel signal among the plurality of pixel signals held in the sample and hold circuit based on the signal selection signal. The detection and selection circuit is arranged in a stage before the AD conversion circuit that AD converts the at least one pixel signal selected. Note that gain refers to the conversion ratio in the conversion from the original signal charge in the pixel circuit to the pixel signal voltage value. Moreover, sensitivity refers to the amount of signal charge or the magnitude of the voltage value of the pixel signal generated by the pixel circuit for a unit amount of light received or unit exposure time serving as a reference.

With this, selective reading to read out at least one pixel signal from among a plurality of pixel signals is performed without performing redundant reading to read out all of the plurality of signals, whereby increased speed and reduced power can be achieved in analog and digital processing in a subsequent stage including an AD conversion circuit. For example, if N pixel signals become one pixel signal, the speed is increased by a factor of N and the power is reduced to 1/N. Furthermore, the same dynamic range as when a plurality of pixel signals are used can be maintained.

Here, the solid-state imaging apparatus may further include: a first semiconductor chip including a pixel array, the pixel array including a plurality of pixel circuits, each of which is the pixel circuit, and a vertical signal line; and a second semiconductor chip including the detection and selection circuit and stacked on the first semiconductor chip. The pixel array and the vertical signal line may be divided into a plurality of pixel arrays and a plurality of vertical signal lines, and the detection and selection circuit may be provided in each of the plurality of pixel arrays.

With this, a plurality of detection and selection circuits are arranged in a stage before the AD conversion circuit, and at least one pixel signal among a plurality of pixel signals is AD converted and read out without performing redundant operations to AD convert and read out all of the plurality of pixel signals, thus providing increased speed and reduced power in analog and digital processing performed in a subsequent stage including the AD conversion circuit. Furthermore, by dividing the vertical signal line of the pixel array or the sample and hold circuit corresponding to the pixel array into a plurality of vertically arranged segments, the convergence of the vertical signal lines is improved and speed is increased. For example, if the vertical signal line is divided into M vertically arranged segments, the convergence time of the vertical signal line can be reduced to 1/M. For example, if N pixel signals become one pixel signal, the analog and digital processing speed is increased by a factor of N and the power is reduced to 1/N. In particular, the number of pixel signal convergences for the vertical signal line is 1/N, and speed is increased by a factor of N. Furthermore, the same dynamic range as when a plurality of pixel signals are used can be maintained.

Here, the plurality of pixel signals may include a first pixel signal for low illuminance, a second pixel signal for medium illuminance, and a third pixel signal for high illuminance. The solid-state imaging apparatus may further include a combining circuit that calculates, by interpolation processing, an unselected pixel signal based on the at least one pixel signal selected, and combines the at least one pixel signal selected and the unselected pixel signal calculated by interpolation processing. The reference value in the detection and selection circuit may include a first reference value and a second reference value. The first reference value may include a value corresponding to a level, of the second pixel signal, that corresponds to a level at a boundary immediately before a saturation level of the first pixel signal, and the second reference value may correspond to a level at a boundary immediately before a saturation level of the second pixel signal. Hereinafter, the first pixel signal for low illuminance is sometimes referred to as a high conversion gain (HCG) signal, or simply HCG. Similarly, the second pixel signal for medium illuminance is sometimes referred to as a middle conversion gain (MCG) signal, or simply MCG, and the third pixel signal for high illuminance is sometimes referred to as a low conversion gain (LCG) signal, or simply LCG.

With this, when selecting at least one pixel signal from a plurality of pixel signals for achieving a wide dynamic range function (WDR function), the selection can be made from MCG signals only. Accordingly, since there is no need to wait for the LCG signal to be read out from the pixel circuit, the capacitive elements for LCG sample and hold in the sample and hold circuit can be removed, reducing layout surface area. Furthermore, since the detection and selection circuit performs comparisons only for LCG, the circuit can be downsized and the layout surface area can be reduced.

Here, the first reference value may include a value that corresponds to a level at a boundary immediately before a saturation level of the first pixel signal.

With this, when selecting at least one pixel signal from a plurality of pixel signals for achieving a wide dynamic range function (WDR function), the selection can be made from HCG and MCG signals. Accordingly, since there is no need to wait for the LCG signal to be read out from the pixel circuit, the capacitive elements for LCG sample and hold in the sample and hold circuit can be removed, reducing layout surface area.

Here, the sample and hold circuit may include a plurality of sample and hold elements that hold the plurality of pixel signals. When the pixel signal instructed by the signal selection signal is within a predetermined range including the reference value, the detection and selection circuit may mix the pixel signal instructed by the signal selection signal with another pixel signal at a composition ratio of $\alpha:(1-\alpha)$ to generate a mixed pixel signal, and output the mixed pixel signal as the pixel signal instructed by the signal selection signal, $\alpha$ being a real number greater than or equal to zero and less than or equal to one. $\alpha$ may be defined according to a difference between a level of the pixel signal instructed by the signal selection signal and the reference value. A capacitance ratio of the plurality of sample and hold elements corresponding to the plurality of pixel signals may be an inverse ratio of a gain that converts an original signal charge into a voltage value within the pixel circuit in the plurality of pixel signals.

With this, when implementing a wide dynamic range function (WDR function), it is possible to mitigate sudden changes in the S/N at the boundary between HCG and MCG and the boundary between MCG and LCG.

Here, the sample and hold circuit may include two sample and hold capacitive elements, one for a reset component and one for a signal component, in correspondence with each of the plurality of pixel signals, and the detection and selection circuit may compare a pixel signal level with the reference value, the pixel signal level calculated by subtracting the reset component from the signal component.

With this, by performing analog CDS, the pixel signal level with canceled pixel circuit variations, can be compared with the reference value.

Here, the reference value may be defined according to a gain of AD conversion by the AD conversion circuit. The gain of AD conversion may be adjusted according to the magnitude of the incline of the RAMP signal input to the AD conversion circuit.

With this, each frame in the wide dynamic range can be combined even when the analog or digital gain is variable due to automatic exposure (AE) control.

Here, the solid-state imaging apparatus may further include: a reference ramp signal generator that simultaneously generates a plurality of RAMP signals corresponding to the plurality of pixel signals; and a selection switch that selects and outputs one of the plurality of RAMP signals to the AD conversion circuit. The selection switch may select the one of the plurality of RAMP signals according to the signal selection signal generated by the detection circuit.

With this, for one pixel signal, speed cannot be increased because the RAMP signal is generated three times in time-series, i.e., for HCG, MCG, and LCG. Alternatively, if the gain is the same, noise will worsen and accuracy will deteriorate. In contrast, according to the present aspect, three RAMP signals are generated simultaneously and the analog gains are set for each, thus achieving both high speed and noise reduction.

Here, the detection and selection circuit may generate a same signal selection signal for pixels included in a unit defined according to a color filter array.

With this, the gain is the same for each of units defined according to a color filter array, such as a unit of a Bayer array of four colors. This eliminates coloring due to the linearity shift of each color that may occur when the gain is different for each color.

Here, the detection and selection circuit may include: a detection circuit that generates the signal selection signal; and a selection circuit that includes the sample and hold circuit and selects the at least one pixel signal among the plurality of pixel signals held in the sample and hold circuit based on the signal selection signal.

With this, since the selection circuit includes the sample and hold circuit, the operation of sampling the pixel signal, the time to hold it, and the operation of selecting and outputting the signal can be controlled more easily and more flexibly.

Here, a plurality of pairs of the selection circuit and the detection circuit may be provided per pixel circuit, and the detection circuit included in one of the plurality of pairs and the selection circuit included in an other of the plurality of pairs may operate in parallel temporally.

With this, while the detection circuit of one pair is detecting signals, the selection circuit of another pair can select and output. With this, operations can be performed in parallel temporally, making it possible to achieve increased speed.

Here, the detection and selection circuit may include a comparator. The comparator may receive, via one of input terminals, an input of a reset component of the second pixel signal from the pixel circuit, and implement auto-zeroing on the input. The comparator may subsequently receive, via the one of the input terminals, an input of a signal component of the second pixel signal from the pixel circuit. The comparator may receive, via an other of the input terminals, an input of the first reference value or the second reference value. The detection and selection circuit may implement a comparison of the second pixel signal and the first reference value and a comparison of the second pixel signal and the second reference value in parallel using a plurality of comparators each of which is the comparator or sequentially using a single comparator which is the comparator.

With this, since analog CDS is performed by implementing auto-zeroing to cancel noise and correctly extract signal components, and at least one pixel signal can be detected during the period when the second pixel signal (MCG) is being read out, readout and detection can be processed simultaneously and increased speed can be achieved. In addition, the LCG capacity can be reduced, thus reducing layout surface area. When the comparison is divided temporally, the layout surface area can be further reduced because there is only one comparator.

Here, the signal selection signal generated by the detection and selection circuit may instruct selection of two pixel signals among the plurality of pixel signals.

With this, two frames—HCG and MCG or MCG and LCG—can be selected. Accordingly, a sudden change in S/N at the frame boundary that occurs when combining the frames to achieve a wide dynamic range can be digitally mitigated in the signal processor.

Here, the detection and selection circuit may output the at least one pixel signal selected to the AD conversion circuit via a vertical signal line. The detection and selection circuit may generate a gain selection signal having the same effect as the signal selection signal. The vertical signal line may be shared in a time-division manner for transferring of the gain selection signal from the detection and selection circuit to the AD conversion circuit and transferring of the pixel signal from the detection and selection circuit to the AD conversion circuit.

With this, the number of lines for the gain selection signal can be reduced, thereby inhibiting an increase in the layout surface area. The RAMP signal can be selected before the pixel signal is supplied to the AD conversion circuit.

Here, the first reference value and the second reference value may be adjusted according to the signal selection signal of a previous frame to imbue hysteresis which facilitates selection of a pixel signal for a current frame of a same gain or sensitivity as the pixel signal instructed by the signal selection signal of the previous frame.

This makes it possible to inhibit sudden changes in S/N between frames caused by misreadings due to, for example, superimposition of noise when the pixel signal level is close to the reference value at the boundary between HCG and MCG or the boundary between MCG and LCG when implementing a wide dynamic range function (WDR function).

Here, a noise reduction ratio in the signal processor may be determined according to the digital signal level of the second pixel signal or the first pixel signal within a first range including the first reference value, digital noise reduction may be implemented on the first pixel signal and the second pixel signal, a noise reduction ratio in the signal processor may be determined according to the digital signal level of the second pixel signal in a second range including the second reference value, and digital noise reduction may be implemented on the second pixel signal and the third pixel signal.

With this, when implementing a wide dynamic range function (WDR function), it is possible to mitigate sudden changes in the S/N at the boundary between HCG and MCG and the boundary between MCG and LCG by implementing digital noise reduction.

Here, the pixel circuit may include a first amplification transistor for outputting the plurality of pixel signals, the detection and selection circuit may include a second amplification transistor that outputs the pixel signal instructed by the signal selection signal, and the gate area of the second amplification transistor may be greater than the gate area of the first amplification transistor.

This reduces device noise that generates when reading signals from the selection circuit through the second amplification transistor.

Here, a vertical signal line from the detection and selection circuit may be provided above a wiring layer of a power supply or above a wiring layer of a ground electric potential (GND).

This can achieve the same effect as an electromagnetic shield against noise from the digital and analog circuits of the logic chip, and eliminate noise superimposition on the vertical signal line.

Here, the solid-state imaging apparatus may further include: a first semiconductor chip including a pixel array, the pixel array including a plurality of pixel circuits, each of which is the pixel circuit, and a vertical signal line; and a second semiconductor chip including the detection and selection circuit and stacked on the first semiconductor chip. The vertical signal line may be divided into vertically arranged segments per row of the pixel array, and the detection and selection circuit may be provided per pixel circuit.

This further enables faster convergence time of the vertical signal line, and increased speed and reduced power in analog and digital processing, including the AD conversion circuit, without loss of the dynamic range.

An imaging apparatus according to one aspect of the present disclosure includes: the solid-state imaging apparatus according to the above aspects that captures an image of a subject; an imaging optical system that guides incident light from the subject to the solid-state imaging apparatus; and a signal processor that processes an output signal from the solid-state imaging apparatus.

With this, the same advantages as described above with respect to the solid-state imaging apparatus can be achieved.

A distance-measuring imaging apparatus according to one aspect of the present disclosure includes: the solid-state imaging apparatus according to the above aspects that controls driving of a light source to emit pulsed light to a target and captures reflected light from the target; an imaging optical system that guides the reflected light from the target to the solid-state imaging apparatus; and a signal processor that processes an output signal from the solid-state imaging apparatus.

With this, the same advantages as described above with respect to the solid-state imaging apparatus can be achieved.

Hereinafter, a solid-state imaging apparatus according to embodiments for implementing the present disclosure will be described with reference to the drawings.

Embodiment 1

First, a configuration example of the solid-state imaging apparatus according to the present embodiment will be given. In Embodiment 1, the configuration example of FIG. 1 in which detection and selection circuits 450 are placed in the stage before column AD circuit will be described in detail.

Solid-state Imaging Apparatus 100 Configuration Example

FIG. 1 is a block diagram of a configuration example of solid-state imaging apparatus 100 according to Embodiment 1.

Solid-state imaging apparatus 100 includes pixel array 1, horizontal scanning circuit 12, vertical scanning circuit 14, vertical signal line 30A, vertical signal line 19B, timing controller 20, AD conversion circuit 26, reference ramp signal generator 22, first detection circuit 401, second detection circuit 402, gain reference signal generator 40, output circuit 28, signal processor 70, and signal processor 90. Solid-state imaging apparatus 100 further includes a MCLK terminal that receives an input of a master clock signal from an external component, a DATA terminal for transmitting and receiving a command or data to and from an external component, and a D1 terminal for transmitting video data to an external component, and still further includes other sorts of terminals to which power supply voltage and ground voltage are supplied.

Pixel array 1 includes a plurality of pixel circuits 3*a* or 3*b* arranged in a matrix. Hereinafter, where there is no particular need to distinguish between them, pixel circuits 3*a* and 3*b* are denoted simply as pixel circuit 3. In FIG. 1, the plurality of pixel circuits 3 are arranged in n rows and m columns. Each pixel circuit 3*a* includes a photodiode (PD), a charge storage (FD0), a transfer transistor (TG) that transfers signal charge generated by the photodiode to the charge storage (FD0), an amplification transistor (amplification transistor SF1) that outputs a pixel signal corresponding to the signal charge of charge storage (FD0), and reset transistor (RS) that resets the charge storage (FD0).

Horizontal scanning circuit 12 outputs AD converted pixel signals to signal processors 70 and 80 via a horizontal signal line by sequentially scanning memories 256 in the plurality of column AD circuits 25. This scanning may be performed in the order of alignment of column AD circuits 25.

Vertical scanning circuit 14 scans, row by row, horizontal scan line groups (also referred to as a "row control line groups") provided per row of pixel circuits 3 in pixel array 1. With this, vertical scanning circuit 14 selects pixel circuits 3 row by row, and concurrently outputs pixel signals from pixel circuits 3 belonging to the selected row to m vertical signal lines 19. The number of horizontal scan line groups 15 provided is the same as the number of pixel circuits 3 provided.

In FIG. 1, n horizontal scan line groups 15 (V1, V2, . . . , and Vn) are provided for pixel circuits 3*a* or 3*b*, and each includes reset control line φRS, stored charge transfer control line φTG, and selection control line φSEL_RS.

Moreover, n horizontal scan line groups 16 (VSH1, VSH2, . . . , and VSHn) are provided for sample and hold circuit SH10 and sample and hold circuit SH412, and each includes sample and hold switching control signal φSH, readout selection switching element control signal φSE, selection control lines φSEL_GS and φSEL_DET, and switching element control signal φSW.

Detection and selection circuits 450 are interposed between pixel array 1 and AD conversion circuit 26.

Vertical signal lines 30A are provided on a pixel chip in pixel array 1, or on a logic chip. The plurality of pixel signals output from amplification transistor SF1 of pixel circuit 3*a* or 3*b*, or output from amplification transistor SF2 of sample and hold circuit SH10 are input to detection and selection circuit 450 via vertical signal line 30A. At least one pixel signal is then selected from the plurality of pixel signals based on the reference values (REF1, REF2, and REF3) supplied by gain reference signal generator 40. The selected signal is then connected from amplification transistor SF30 to vertical signal line 19B via selection transistor SEL_DET. In this way, at least one pixel signal selected from the plurality of pixel signals output from pixel circuit 3*a* or 3*b* is propagated to column AD circuit 25.

In FIG. 1, there are m vertical signal lines 19A and vertical signal lines 19B (H1, . . . , Hm). Moreover, there are m ADC input lines (ADIN1, . . . , ADINm).

Timing controller 20 controls the entire solid-state imaging apparatus 100 by generating various groups of control signals. The various groups of control signals include control signal groups CN0, 0CN1, CN2, CN4, CN5, and CN8, and counter clock signals CK0 and CK1. For example, timing controller 20 receives master clock MCLK via a terminal, generates various internal clocks, and controls horizontal scanning circuit 12 and vertical scanning circuit 14 and the like.

Gain reference signal generator 40 is controlled by control signal CN0 and counter clock signal CK1 to generate a first reference value and a second reference value. For example, if resolution is increased by using a DA circuit or the like, the system can be applied to characteristics that require accuracy such as hysteresis characteristics.

AD conversion circuit 26 includes a column AD circuit 25 for each column. Each column AD circuit 25 AD converts pixel signals from vertical signal line 198, which are the output of detection and selection circuit 450.

Each column AD circuit 25 includes voltage comparator 252, counter 254, and memory 256.

Voltage comparator 252 compares an analog pixel signal from vertical signal line 198 which is the output of detection and selection circuit 450 and reference signal RAMP that is generated by reference ramp signal generator 22 and includes a ramp waveform (i.e., a triangular wave), and, for example, when the former exceeds the latter, inverts an output signal indicating the comparison result.

Counter 254 counts time from a start of a change in the triangular wave of reference signal RAMP until the output signal from voltage comparator 252 is inverted. Since the time until the inversion is defined according to the value of an analog pixel signal, the count value is a value of a digitized pixel signal.

Memory 256 holds count values of counter 254, i.e., digital pixel signals.

Reference ramp signal generator 22 generates reference signal RAMP including a triangular wave, and outputs reference signal RAMP to the positive input terminal of voltage comparator 252 in each column AD circuit 25.

Output circuit 28 outputs digital pixel signals to video data terminal D1.

Signal processor 90 includes frame memory 97 and controller 96, and includes a hysteresis function with respect to reference values (REF1, REF2, and REF3) supplied to detection and selection circuit 450 for previous and current frames. Signal processor 90 stores, in frame memory 97, gain reference signal 403 of the previous frame supplied by detection and selection circuit 450. Based on this information, controller 96 calculates the reference value for the current frame and reflects the reference value in the current frame by supplying hysteresis selection signal 404 to first detection circuit 401 or second detection circuit 402.

Signal processor 70 calculates, by interpolation processing, an unselected pixel signal based on the selected pixel signal, and combines the selected pixel signal with the other pixel signal calculated by interpolation processing.

This reduces the plurality of pixel signals to at least one pixel signal, thereby achieving increased speed and reduced power consumption in a subsequent stage including the AD conversion circuit, and also achieving increased speed and reduced power in signal processor 70, while maintaining the same dynamic range as when a plurality of pixel signals are used.

Vertical scanning circuit 14, reference ramp signal generator 22, and gain reference signal generator 40 may collectively be referred to as a drive unit. AD conversion circuit 26 and horizontal scanning circuit 12 may collectively be referred to as a control unit.

With this, detection and selection circuit 450 is located in the stage before AD conversion circuit 26, and performs selective reading to read out at least one pixel signal from among a plurality of pixel signals without performing redundant reading to read out all of the plurality of signals, whereby increased speed and reduced power can be achieved in analog and digital processing in a subsequent stage including AD conversion circuit 26. For example, if N pixel signals become one pixel signal, the speed is increased by a factor of N and the power is reduced to 1/N. At the same time, the same dynamic range as when a plurality of pixel signals are used can be maintained.

Pixel Configuration (Lateral OFD) Example

Figure 2:
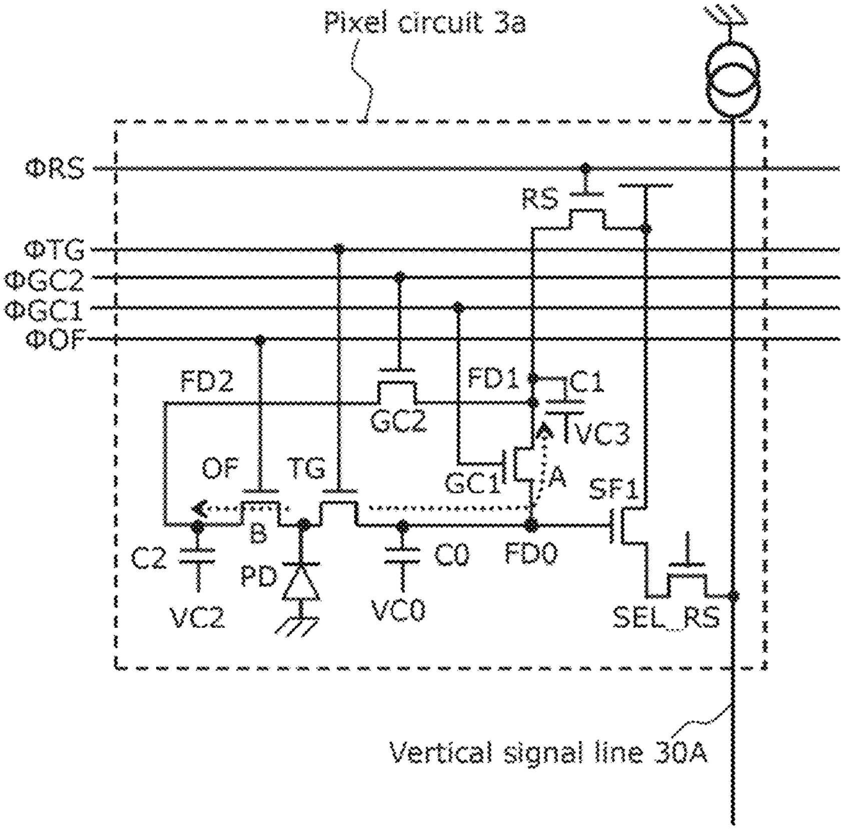
FIG. 2 illustrates a circuit example of a pixel circuit according to Embodiment 1.
Figure 29:
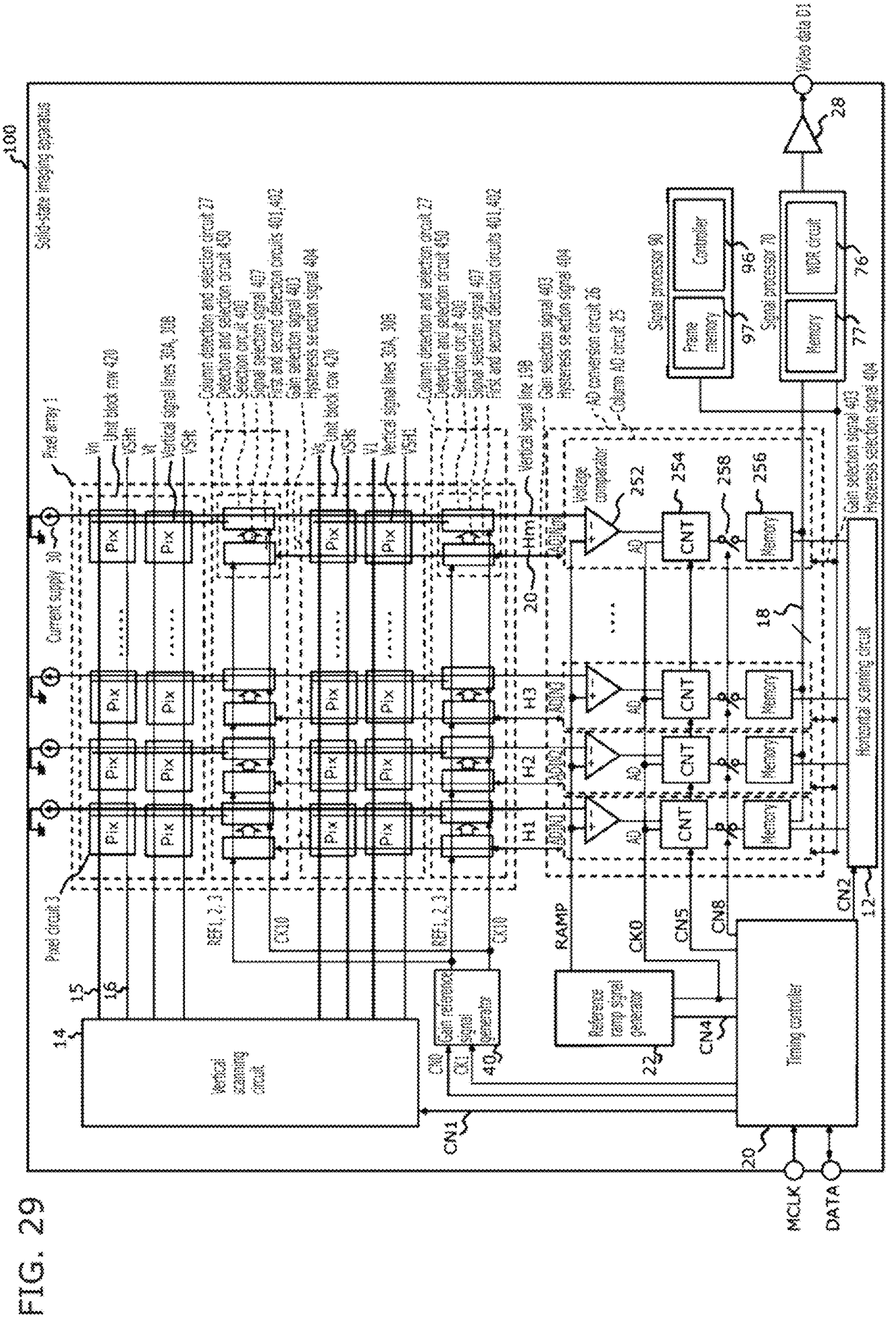
FIG. 29 is a block diagram of a configuration example of a solid-state imaging apparatus including a pixel circuit and a column detection and selection circuit according to Embodiment 2.

Solid-state imaging apparatus 100 illustrated in FIG. 1 and FIG. 29 includes, as pixel circuits 3, a plurality of pixel circuits 3*a* illustrated in FIG. 2 arranged in a matrix in pixel array 1. Such a configuration is suitable for when a rolling shutter method is used.

Figure 3:
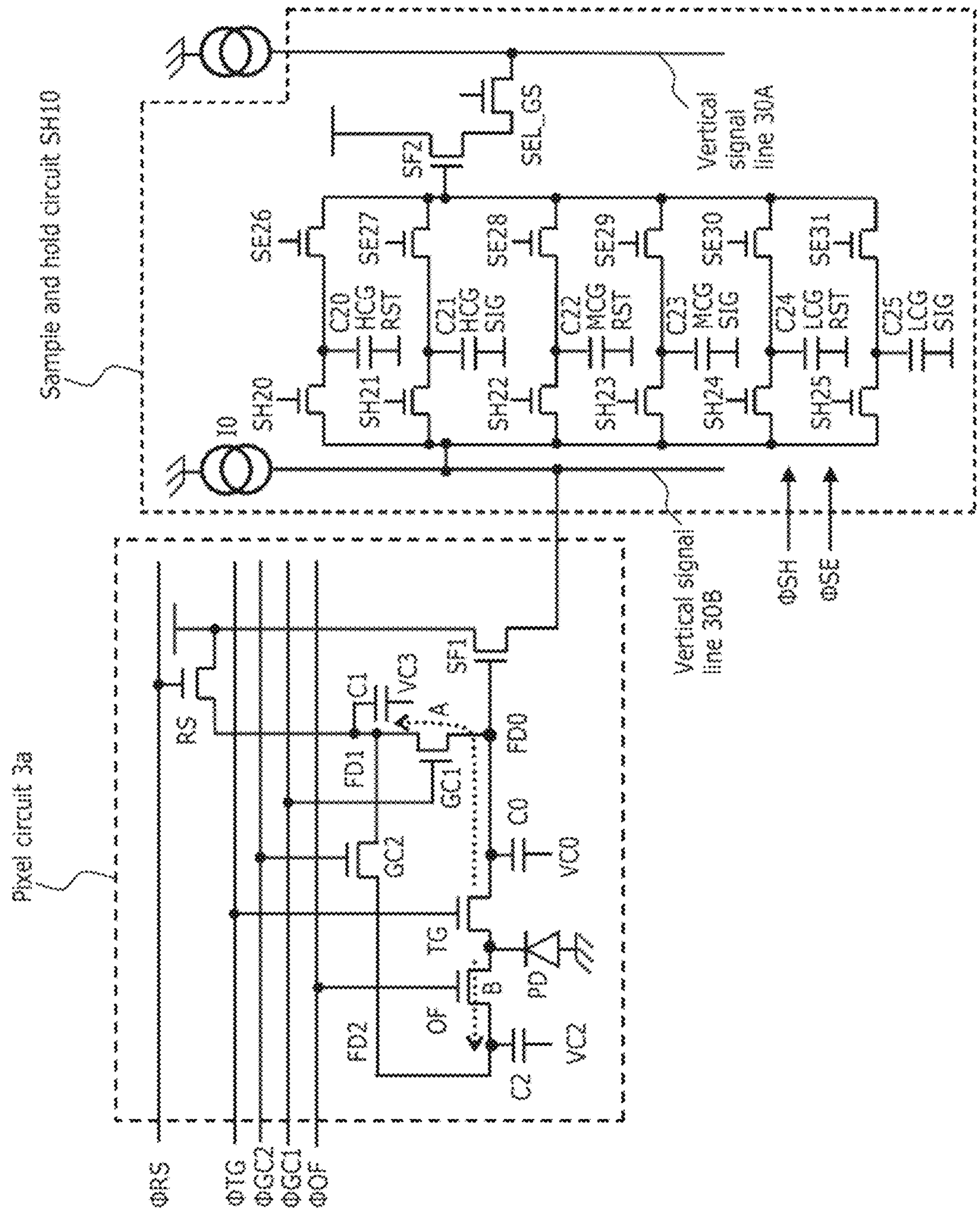
FIG. 3 illustrates a circuit example of a pixel circuit and sample and hold circuit SH10 according to Embodiment 1.

Similarly, solid-state imaging apparatus 100 can also include sample and hold circuit SH10 connected to pixel circuit 3*a* illustrated in FIG. 3. Such a configuration is suitable for when a global shutter method is used.

The pixel signal has at least two types, a reset component and a signal component.

First, a lateral OFD configuration example will be given. The lateral OFD configuration example is a configuration including a storage circuit in the horizontal direction.

Pixel circuit 3*a* includes photodiode PD, transfer transistor TG, charge storage FD0, transfer transistor TG, amplification transistor SF1, reset transistor RS, and first gain control transistor GC1. Selection transistor SEL_RS is provided in the configuration using the rolling shutter method of FIG. 2 and not provided in the configuration using the global shutter method of FIG. 3. Furthermore, the positions of first storage capacitive element C1, first gain control transistor GC1, second storage capacitive element C2, and second gain control transistor GC2 are added in the horizontal direction in terms of charge transfer.

Photodiode PD is a photoelectric conversion element that converts incident light into a signal charge.

Charge storage FD0 is formed as, for example, a floating diffusion layer, and holds the signal charge generated by photodiode PD. In FIG. 2 and FIG. 3, the storage capacitive element of charge storage FD0 is denoted as C0.

Amplification transistor SF1 outputs a pixel signal corresponding to the signal charge in charge storage FD0 to vertical signal line 30A via selection transistor SEL_RS.

Selection transistor SEL_RS is a switching element that selects whether or not to output the pixel signal from amplification transistor SF1 to vertical signal line 30A.

Reset transistor RS can perform three different resets depending on how first gain control transistor GC1 and second gain control transistor GC2 are controlled. Stated differently, reset transistor RS can reset charge storage FD0, first charge storage FD1, and second charge storage FD2.

The charge that overflows at charge storage FD0 when transfer transistor TG is on is transferred to and held by first storage capacitive element C1, as shown by dotted arrow line A in FIG. 2 and FIG. 3.

First gain control transistor GC1 is a transistor that controls the connection between charge storage FD0 and first storage capacitive element C1. First gain control transistor GC1 takes on and off states as a switching element.

The signal charge that overflows from photodiode PD during exposure is transferred to and held by second storage capacitive element C2, as shown by dotted arrow line B in FIG. 2 and FIG. 3. Overflow element OF is provided between photodiode PD and second storage capacitive element C2. The signal charge that overflows from photodiode PD is transferred to second storage capacitive element C2 via overflow element OF, instead of being transferred to first storage capacitive element C1 via transfer transistor TG.

Furthermore, the signal charge that overflows from second storage capacitive element C2 is discharged to the power supply via second gain control transistors GC2 and reset transistor RS.

Moreover, the effect of the dark current component in charge storage FD0 can be reduced since the signal charge that overflows from photodiode PD is stored in second storage capacitive element C2 without passing through charge storage FD0, as shown by dotted arrow line B. Providing overflow element OF makes it possible to control the level of overflow and the depth of the charge channel, thereby reducing the effect of the dark current component generated in the surface layer.

Second gain control transistor GC2 is a gain control transistor that controls the connection between first storage capacitive element C1 and second storage capacitive element C2. Second gain control transistor GC2 takes on and off states as a switching element.

Solid-state imaging apparatus 100 includes overflow storage circuits for holding the signal charge that overflows from photodiode PD. A single storage circuit is made up of a switching element and a storage capacitive element. The first stage storage circuit is made up of first gain control transistor GC1 and first storage capacitive element C1. The second stage storage circuit is made up of second gain control transistor GC2 and second storage capacitive element C2.

In this way, with the first configuration example, it possible to achieve both dynamic range extension and S/N improvement.

In the rolling shutter method, as illustrated in FIG. 2, a plurality of pixel signals of pixel circuit 3*a* are read out in a rolling manner row by row, and the plurality of pixel signals are supplied to detection and selection circuit 450 via vertical signal line 30A.

In the global shutter method, as illustrated in FIG. 3, sample and hold circuit SH10 connected to pixel circuit 3*a* can be provided. This is particularly suitable for when the global shutter method is used, where all pixels are exposed simultaneously, and the signals of all pixels are read out simultaneously to sample and hold circuit SH10, which holds the pixel signals before the next row-by-row rolling readout is performed. Here as well, a plurality of pixel signals of sample and hold circuit SH10 are read out in a rolling manner row by row, and the plurality of pixel signals are supplied to detection and selection circuit 450 via vertical signal line 30A.

With this, when the three frames of the first, second, and third pixel signals, which are respectively the HCG, the MCG, and the LCG pixel signals for low illuminance, medium illuminance, and high illuminance, respectively, are combined by WDR circuit 76, since the frames are simultaneously exposed, there is no blur or coloring between the frames.

Sample and hold circuit SH10 will be described in greater detail later.

Pixel Configuration (Vertical OFD) Example

Next, a vertical OFD configuration example will be given. The configuration example of the vertical OFD includes lateral OFD storage circuits described above connected in two stages in the vertical direction.

Figure 4:
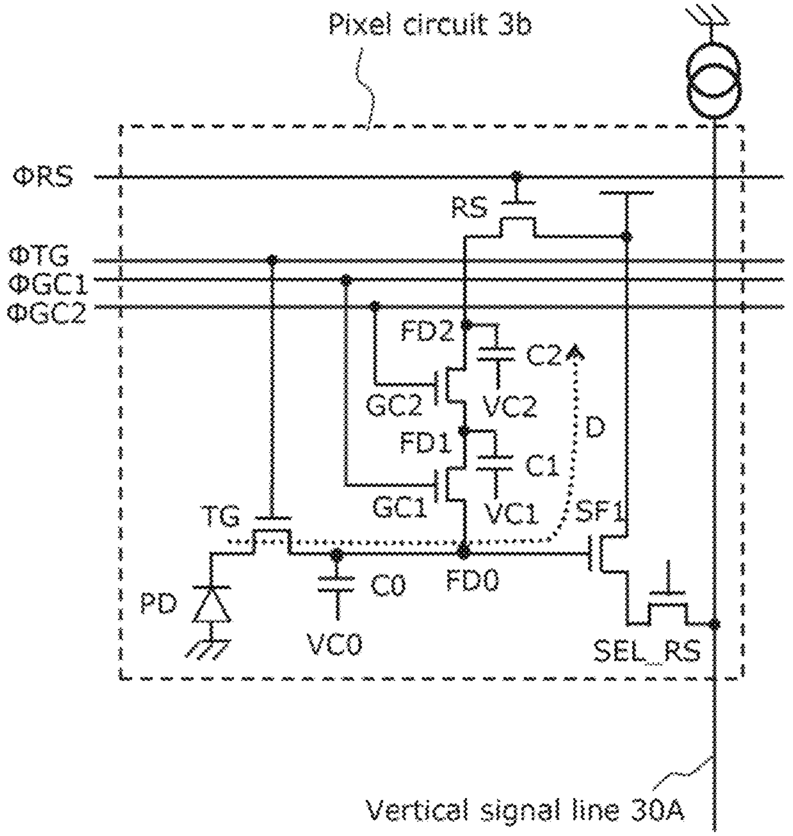
FIG. 4 illustrates a circuit example of a pixel circuit according to Embodiment 1.

Solid-state imaging apparatus 100 illustrated in FIG. 1 and FIG. 29 includes, as pixel circuits 3, a plurality of pixel circuits 3*b* illustrated in FIG. 4 arranged in a matrix in pixel array 1. Such a configuration is suitable for when a rolling shutter method is used.

Figure 5:
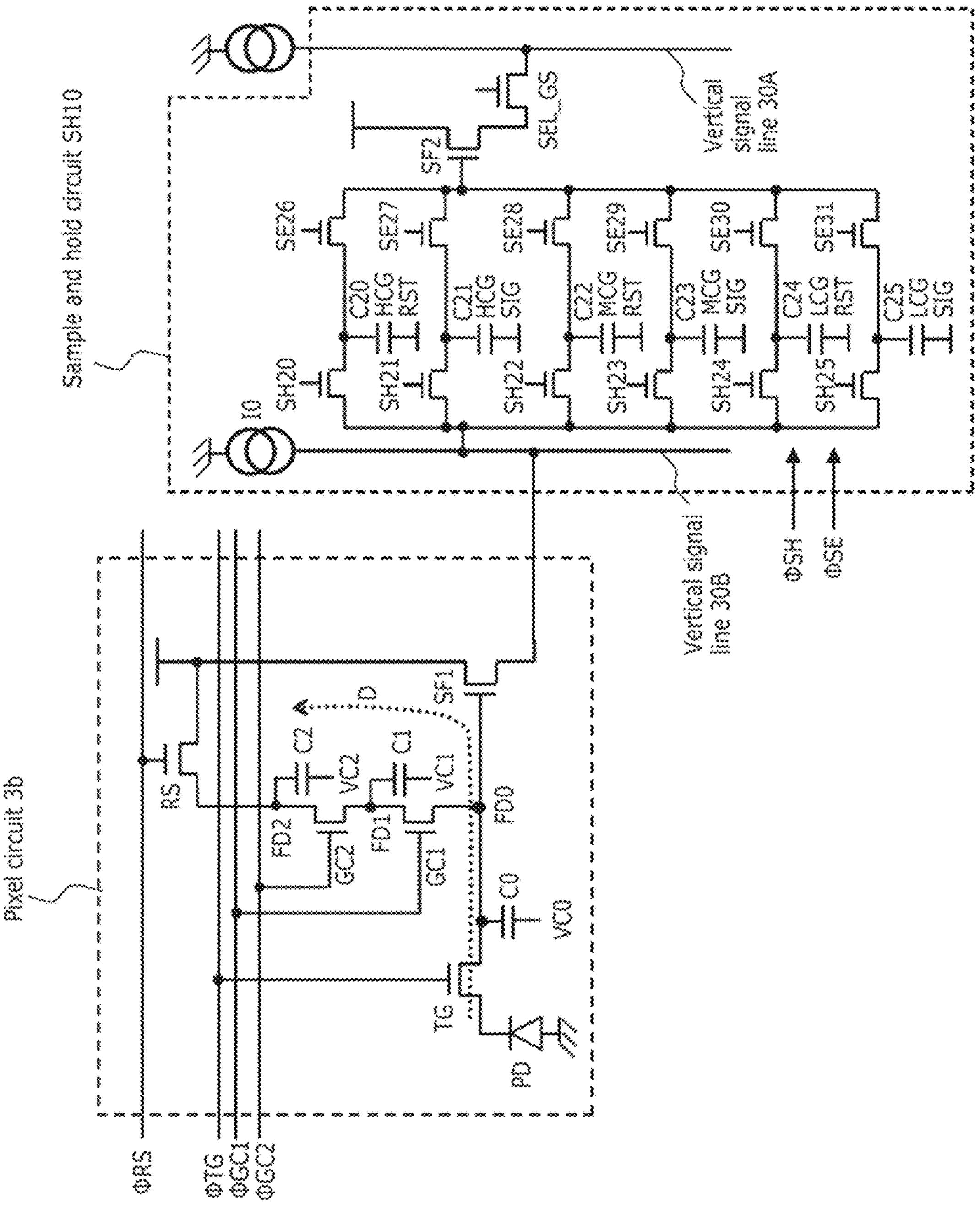
FIG. 5 illustrates a circuit example of a pixel circuit and sample and hold circuit SH10 according to Embodiment 1.

Similarly, solid-state imaging apparatus 100 can also include sample and hold circuit SH10 connected to pixel circuit 3*b* illustrated in FIG. 5. Such a configuration is suitable for when a global shutter method is used.

The pixel signal has at least two types, a reset component and a signal component.

The vertical OFD configuration example illustrated in FIG. 4 differs from the lateral OFD configuration example illustrated in FIG. 2 in regard to pixel circuit 3*b*. Sample and hold circuit SH10 is the same. The following description will focus on this point of difference.

Pixel circuit 3*b* includes photodiode PD, transfer transistor TG, charge storage FD0, transfer transistor TG, amplification transistor SF1, reset transistor RS, first storage capacitive element C1, first gain control transistor GC1, second storage capacitive element C2, and second gain control transistor GC2. Selection transistor SEL_RS is provided in the configuration using the rolling shutter method of FIG. 4 and not provided in the configuration using the global shutter method of FIG. 5.

Photodiode PD is a photoelectric conversion element that converts incident light into a signal charge. The signal charge that overflows from photodiode PD during exposure is transferred to and held by first storage capacitive element C1, as shown by dotted arrow line D in FIG. 4 and FIG. 5. The signal charge that overflows at first storage capacitive element C1 is further transferred to and held by second storage capacitive element C2.

Charge storage FD0 is formed as, for example, a floating diffusion layer, and holds the signal charge generated by photodiode PD. In FIG. 4 and FIG. 5, the storage capacitive element of charge storage FD0 is denoted as C0.

Amplification transistor SF1 outputs a pixel signal corresponding to the signal charge in charge storage FD0 to vertical signal line 30A via selection transistor SEL_RS.

Reset transistor RS resets charge storage FD0. More specifically, reset transistor RS can perform three different resets depending on how first gain control transistor GC1 and second gain control transistor GC2 are controlled. Stated differently, reset transistor RS can reset charge storage FD0, first charge storage FD1, and second charge storage FD2.

First storage capacitive element C1 holds the signal charge that overflows from photodiode PD. For example, first storage capacitive element C1 stores the signal charge that overflows from photodiode PD during exposure via transfer transistor TG and first gain control transistor GC1.

First gain control transistor GC1 is a transistor that controls the connection between charge storage FD0 and first storage capacitive element C1. First gain control transistor GC1 takes on and off states as a switching element. Note that during exposure, a gate voltage of transfer transistor TG and a gate voltage of first gain control transistor GC1 need not be completely off and may be set so as to enable a signal charge that overflows from photodiode PD to be transferred from transfer transistor TG to first storage capacitive element C1 via charge storage FD0 and first gain control transistor GC1.

Second storage capacitive element C2 holds the signal charge that overflows from first storage capacitive element C1. For example, second storage capacitive element C2 stores the signal charge that overflows from first storage capacitive element C1 via second gain control transistor GC2.

Second gain control transistor GC2 is a gain control transistor that controls the connection between first storage capacitive element C1 and second storage capacitive element C2. Second gain control transistor GC2 takes on and off states as a switching element. Note that during exposure, a gate voltage of second gain control transistor GC2 need not be completely off and may be set so as to enable a signal charge that overflows from first storage capacitive element C1 to be transferred to second storage capacitive element C2 via second gain control transistor GC2.

In this way, with the second configuration example, it possible to achieve both dynamic range extension and S/N improvement.

In the rolling shutter method, as illustrated in FIG. 4, a plurality of pixel signals of pixel circuit 3*b* are read out in a rolling manner row by row, and the plurality of pixel signals are supplied to detection and selection circuit 450 via vertical signal line 30A.

In the global shutter method, as illustrated in FIG. 5, sample and hold circuit SH10 connected to pixel circuit 3*b* can be provided. This is particularly suitable for when the global shutter method is used, where all pixels are exposed simultaneously, and the signals of all pixels are read out simultaneously to sample and hold circuit SH10, which holds the pixel signals before the next row-by-row rolling readout is performed. Here as well, a plurality of pixel signals of sample and hold circuit SH10 are read out in a rolling manner row by row, and the plurality of pixel signals are supplied to detection and selection circuit 450 via vertical signal line 30A.

With this, when the three frames of the first, second, and third pixel signals, which are respectively the HCG, the MCG, and the LCG pixel signals for low illuminance, medium illuminance, and high illuminance, respectively, are combined by WDR circuit 76, since the frames are simultaneously exposed, there is no blur or coloring between the frames.

Sample and hold circuit SH10 will be described in greater detail later.

Sample and Hold Circuit Configuration Example

Next, one example of sample and hold circuit SH10 will be given.

Sample and hold circuits SH10 are provided one-to-one with pixel circuits 3*a* or 3*b*. Sample and hold circuits SH10 are mainly suitable for transferring a plurality of pixel signals of pixel circuits 3*a* or 3*b* simultaneously for all pixels in a configuration that uses the global shutter method.

In sample and hold circuit SH10, the output of amplification transistor SF1 of pixel circuit 3*a* or 3*b* is connected to vertical signal line 30B as well as to the sample and hold capacitive elements (C20, C21, C22, C23, C24, and C25) via sample and hold switching elements (SH20, SH21, SH22, SH23, SH24, and SH25), and is input to the gate of amplification transistor SF2 via the provided output selection switching elements (SE26, SE27, SE28, SE29, SE30, and SE31). The output of amplification transistor SF2 is connected to vertical signal line 30A via selection transistor SEL_GS.

Sample and hold switching elements SH (SH20, SH21, SH22, SH23, SH24, and SH25) are switching transistors that turn on and off according to sample and hold switch control signal φSH. Sample and hold switching elements SH (SH20, SH21, SH22, SH23, SH24, and SH25) hold the pixel signal in sample and hold capacitive element C when sample and hold switch control signal φSH is off. Stated differently, when holding a pixel signal in sample and hold capacitive element C, address selection is performed by sample and hold switch control signal φSH.

Readout selection switching elements SE (SE26, SE27, SE28, SE29, SE30, and SE31) are switching transistors that turn on and off according to readout selection switching element control signal φSE. In readout selection switching elements SE (SE26, SE27, SE28, SE29, SE30, and SE31), when readout selection switching element control signal φSE is on, the pixel signal held in sample and hold capacitive element C is input to the gate of amplification transistor SF2. Stated differently, when reading out a pixel signal from sample and hold capacitive element C, address selection is performed by readout selection switching element control signal φSE.

Selection transistor SEL_GS is a switching transistor that turns on and off according to selection control signal φSEL_GS. Selection transistor SEL_GS electrically connects the source of amplification transistor SF2 and vertical signal line 30A when selection control signal φSEL_GS is high-level.

Here, the sample and hold capacitive element (C20) holds the signal of the reset component of the HCG, while the sample and hold capacitive element (C21) holds the signal of the signal component of the HCG.

The sample and hold capacitor (C22) holds the signal of the reset component of the MCG, while the sample and hold capacitor (C23) holds the signal of the signal component of the MCG.

The sample and hold capacitor (C24) holds the signal of the reset component of the LCG, while the sample and hold capacitor (C25) holds the signal of the signal component of the LCG Since the CDS in the AD conversion circuit subtracts the reset component from the signal component, circuit variations such as in the circuits of amplification transistor SF1 and amplification transistor SF2 are canceled.

Detection and Selection Circuit Configuration Example

Here, one example of detection and selection circuit 450 will be given.

Detection and selection circuit 450 includes selection circuit 400 that selects a signal from a plurality of pixel signals and includes sample and hold circuit SH412 that holds a plurality of pixel signals, and first detection circuit 401 or second detection circuit 402 that detects at least one pixel signal from the plurality of pixel signals.

First, a plurality of pixel signals from pixel circuit 3*a* or 3*b* or from sample and hold circuit SH10 are held in sample and hold circuit SH412.

First, one example of sample and hold circuit SH412 will be given.

In sample and hold circuit SH412, the output of amplification transistor SF1 of pixel circuit 3*a* or 3*b*, or the output of amplification transistor SF2 of sample and hold circuit SH10 turns switching element SW0 on, is connected to the sample and hold capacitive elements (C30, C31, C32, C33, C34, and C35) via the sample and hold switching elements (SH1, SH2, SH3, SH4, SH5, and SH6) through vertical signal line 30A, and then input to the gate of amplification transistor SF30 via the readout selection switching elements (SE7, SE8, SE9, SE10, SE11, SE12). The output of amplification transistor SF30 is connected to vertical signal line 19B via selection transistor SEL_DET.

Sample and hold switching elements SH (SH1, SH2, SH3, SH4, SH5, and SH6) are switching transistors that turn on and off according to sample and hold switch control signal φSH. In sample and hold switching elements SH, when sample and hold switch control signal φSH is off, the pixel signals are held in the sample and hold capacitive elements (C30, C31, C32, C33, C34, and C35). Stated differently, when holding the pixel signals in sample and hold capacitive elements (C30, C31, C32, C33, C34, and C35), address selection is performed by sample and hold switch control signal φSH.

The readout selection switching elements (SE7, SE8, SE9, SE10, SE11, and SE12) are switching transistors that turn on and off according to readout selection switching element control signal φSE. In readout selection switching elements SE, when readout selection switching element control signal φSE is on, the pixel signals held in the sample and hold capacitive elements (C30, C31, C32, C33, C34, and C35) are input to the gate of amplification transistor SF30. Stated differently, when reading out the pixel signals from the sample and hold capacitive element (C30, C31, C32, C33, C34, and C35), address selection is performed by readout selection switching element control signal φSE.

Selection transistor SEL_DET is a switching transistor that turns on and off according to selection control signal φSEL_DET. Selection transistor SEL_DET electrically connects the source of amplification transistor SF30 and vertical signal line 19B when selection control signal φSEL_DET is high-level.

Here, the sample and hold capacitive element (C30) holds the signal of the reset component of the HCG, while the sample and hold capacitive element (C31) holds the signal of the signal component of the HCG.

The sample and hold capacitor (C32) holds the signal of the reset component of the MCG, while the sample and hold capacitor (C33) holds the signal of the signal component of the MCG The sample and hold capacitor (C34) holds the signal of the reset component of the LCG, while the sample and hold capacitor (C35) holds the signal of the signal component of the LCG Next, in first detection circuit 401 and second detection circuit 402, the value obtained by subtracting the reset component (C32) from the signal component (C33) of MCG, which is the second pixel signal of sample and hold circuit SH412, is compared with first reference value REF1 at the boundary between HCG and MCG and second reference value REF2 at the boundary between MCG and LCG. This detects which gain the pixel signal belongs to, i.e., HCG, MCG, or LCG, and transmits signal selection signals 407 (φSE, φSH, and φSW) to selection circuit 400.

Next, selection circuit 400 controls readout selection switching element control signal φSE based on these signal selection signals 407 (φSE, φSH, and φSW). For example, when the pixel signal belongs to HCG, readout selection switching element SE7 is turned on and the reset component is output to vertical signal line 19B via amplification transistor SF30 and selection transistor SEL_DET, and similarly, readout selection switching element SE8 is turned on and the signal component is output to vertical signal line 19B.

Since the CDS in the AD conversion circuit subtracts the reset component from the signal component, circuit variations such as in the circuits of amplification transistor SF1, amplification transistor SF2, and amplification transistor SF30 are canceled.

With this, selective reading is performed to read out at least one pixel signal from among a plurality of pixel signals without performing redundant reading to read out all of the plurality of signals, whereby increased speed and reduced power can be achieved in a subsequent stage including an AD converter.

First Detection Circuit Configuration Example

Figure 6A:
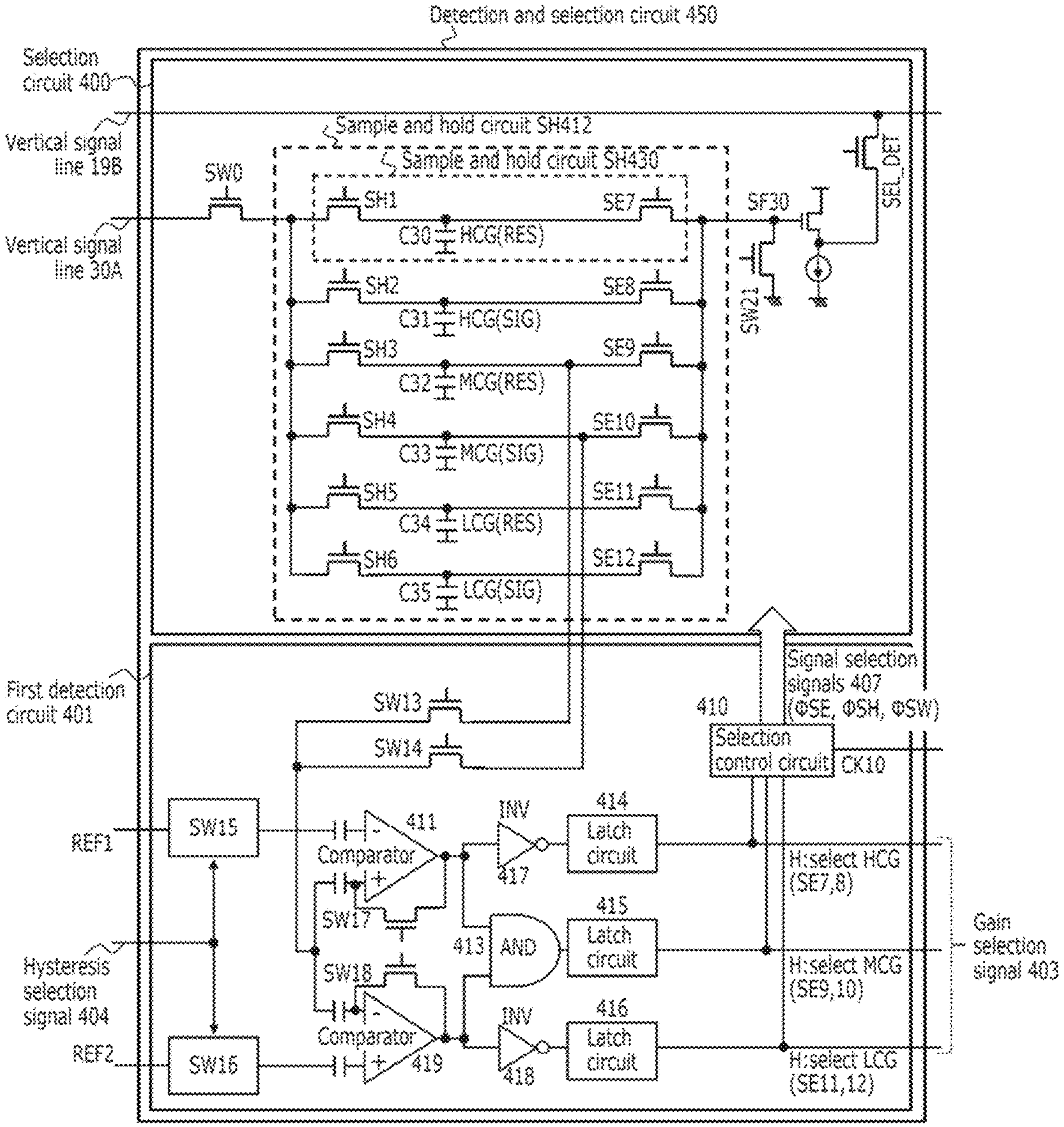
FIG. 6A is a block diagram of a configuration example including a detection and selection circuit including a selection circuit and a first detection circuit.
Figure 6B:
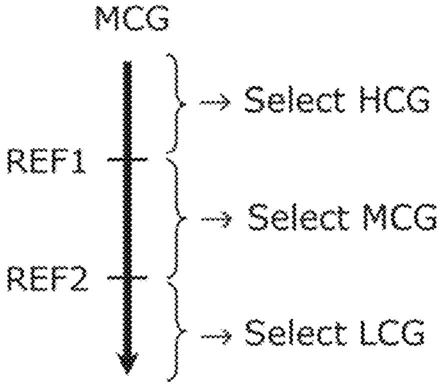
FIG. 6B illustrates an operation performed by a first detection circuit.

First detection circuit 401 illustrated in FIG. 6A includes comparator 411 and comparator 419. FIG. 6B illustrates an operation performed by the first detection circuit.

Comparator 411 receives, via one of its input terminals, a first reference value (REF1) via switching circuit SW15, and via the other input terminal, first implements auto-zeroing on an input of the reset component of the MCG signal, which is the second pixel signal (i.e., turns on SW0, SH3, SW13, SW17, and SW18), and then receives an input of the reset component of the MCG signal, which is the second pixel signal (i.e., turns on SW0, SH4, and SW14), and performs analog CDS to perform the comparison.

Similarly, comparator 419 receives, via one of its input terminals, a second reference value (REF2) via switching circuit SW16, and via the other input terminal, first implements auto-zeroing on an input of the reset component of the MCG signal, which is the second pixel signal (i.e., turns on SW0, SH3, SW13, SW17, and SW18), and then receives an input of the signal component of the MCG signal, which is the second pixel signal (i.e., turns on SW0, SH4, and SW14), and performs analog CDS to perform the comparison.

If the second pixel signal (MCG signal) is less than the first reference value (REF1), the output of comparator 411 is L and the output of comparator 419 is H. Accordingly, the output of latch circuit 414 is H, the output of latch circuit 415 is L, and the output of latch circuit 416 is L. The H signals of SE7 and SE8, which are the output signals of latch circuit 414, are sent to selection circuit 400 as signal selection signals 407 (φSE, φSH, and φSW). Stated differently, signal selection signals 407 (φSE, φSH, and φSW) instruct selection circuit 400 that the first pixel signal (HCG) held in sample and hold circuit SH should be selected.

If the second pixel signal (MCG signal) is between the first reference value (REF1) and the second reference value (REF2), the output of comparator 411 is H and the output of comparator 419 is H. Accordingly, the output of latch circuit 414 is L, the output of latch circuit 415 is H, and the output of latch circuit 416 is L. The H signals of SE9 and SE10, which are the output signals of latch circuit 415, are sent to selection circuit 400 as signal selection signals 407 (φSE, φSH, and φSW). Stated differently, signal selection signals 407 (φSE, φSH, and φSW) instruct selection circuit 400 that the second pixel signal (MCG) held in sample and hold circuit SH should be selected.

If the second pixel signal (MCG signal) is greater than the second reference value (REF2), the output of comparator 411 is H and the output of comparator 419 is L. Accordingly, the output of latch circuit 414 is L, the output of latch circuit 415 is H, and the output of latch circuit 416 is H. The H signals of SE11 and SE12, which are the output signals of latch circuit 416, are sent to selection circuit 400 as signal selection signals 407 (φSE, φSH, and φSW). Stated differently, signal selection signals 407 (φSE, φSH, and φSW) instruct selection circuit 400 that the third pixel signal (LCG) held in sample and hold circuit SH should be selected.

Signal selection signals 407 (φSE, φSH, and φSW) are also sent to voltage comparator 252 of column AD circuit 25 as gain selection signals 403. This will be described in greater detail later.

This makes it possible to increase detection speed because one pixel signal can be detected using the second pixel signal, which is the MCG signal.

When detecting two signals, the signals will be HCG and MCG or MCG and LCG. Therefore, an H signal is always sent to SE9 and SE10 of MCG as signal selection signals 407 (φSE, φSH, and φSW) in selection control circuit 410. HCG and LCG are based on the comparison results described above.

Gain selection signals 403 sent from first detection circuit 401 to AD conversion circuit 26 can also use vertical signal line 19B from selection circuit 400, so gain selection signals 403 can be transmitted to AD conversion circuit 26 before transmitting the selected pixel signal.

With this, when selecting at least one pixel signal from a plurality of pixel signals for achieving a wide dynamic range function (WDR function), the selection can be made from MCG signals only. Accordingly, since there is no need to wait for the LCG signal to be read out from pixel circuit 3, the capacitive elements (C34 and C35) for LCG sample and hold in sample and hold circuit SH412 can be removed, reducing layout surface area. Furthermore, since the detection circuits (401 and 402) perform comparisons only for LCG, the circuit can be downsized and the layout surface area can be reduced.

The same circuit configuration can also be used to detect one pixel signal using both the first pixel signal, which is the HCG signal, as the first reference value (REF3) and the second pixel signal, which is the MCG signal, as the second reference value (REF2).

With this, when selecting at least one pixel signal from a plurality of pixel signals for achieving a wide dynamic range function (WDR function), the selection can be made from HCG and MCG signals. Accordingly, since there is no need to wait for the LCG signal to be read out from pixel circuit 3, the capacitive elements (C34 and C35) for LCG sample and hold in sample and hold circuit SH412 can be removed, reducing layout surface area.

When detecting two signals at first detection circuit 401, the HCG and MCG frames or the MCG and LCG frames are detected. Accordingly, MCG should always be selected by selection control circuit 410, and HCG and LCG should be based on the comparison results described above.

With this, a sudden change in S/N at the frame boundary that occurs when combining the frames to achieve a wide dynamic range can be digitally mitigated in signal processor 70. The digital mitigation method is essentially the same concept as the method of mixing (blending) based on the WDR composition ratio that is described above.

Furthermore, when vertical signal line 19B is used for gain selection signals 403 as well, the number of lines for gain selection signals 403 can be reduced and an increase in the layout surface area can be inhibited.

Second Detection Circuit Configuration Example

Figure 7:
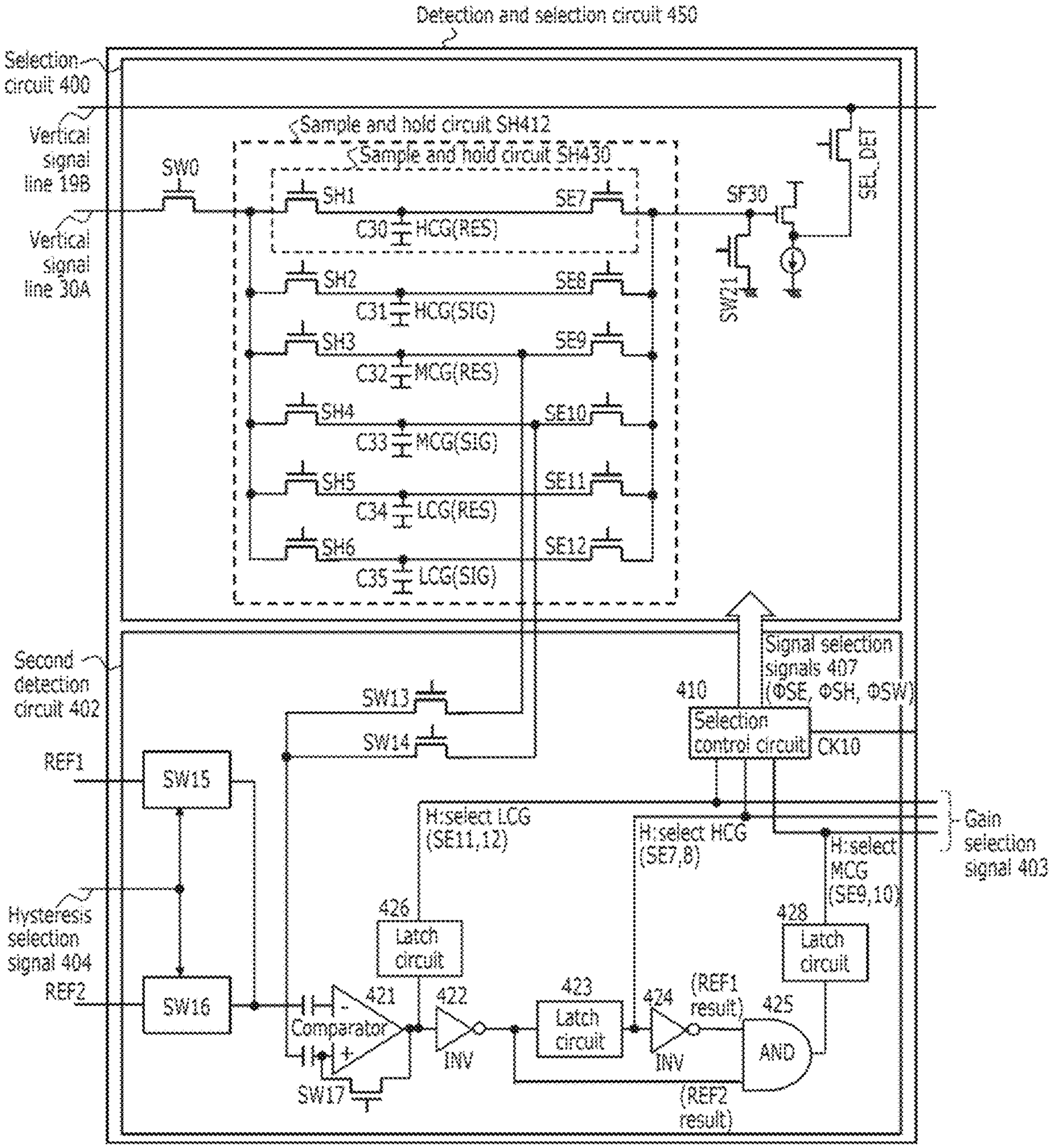
FIG. 7 is a block diagram of a configuration example including a detection and selection circuit including a selection circuit and a second detection circuit.

Second detection circuit 402 illustrated in FIG. 7 includes one less comparator, and includes comparator 421 and latch circuit 423. Second detection circuit 402 switches between inputting the first reference value (REF1) and the second reference value (REF2) in a temporally consecutive manner to one of the input terminals of comparator 421.

Regarding the other of the input terminals of comparator 421, temporally, second detection circuit 402 first inputs the reset component of the MCG signal, which is the second pixel signal, and comparator 421 implements auto-zeroing on the input (i.e., turns on SW0, SH3, SW13, and SW17), and then inputs the signal component of the MCG signal, which is the second pixel signal (i.e., turns on SW0, SH4, and SW14), and comparator 421 performs analog CDS to perform the comparison.

When the pixel signal is the first pixel signal (HCG), if the first reference value (REF1) is input, the output of comparator 421 is L, the output of latch circuit 423 is H, and the output of INV circuit 424 is L. Next, when the second reference value (REF2) is input, latch circuit 426 and latch circuit 428 are reset, the output of comparator 421 is L, the output of latch circuit 423 is held at H, and the output of AND 425 is L. Accordingly, the output of latch circuit 426 is L, the output of latch circuit 423 is H, and the output of latch circuit 428 is L. The H signals of SE7 and SE8, which are the output signals of latch circuit 423, are sent to selection circuit 400 as signal selection signals 407 (φSE, φSH, and φSW).

When the pixel signal is the second pixel signal (MCG), if the first reference value (REF1) is input, the output of comparator 421 is H, the output of latch circuit 423 is L, and the output of INV circuit 424 is H. Next, when the second reference value (REF2) is input, latch circuit 426 and latch circuit 428 are reset, the output of comparator 421 is L, the output of latch circuit 423 is held at L, and the output of AND 425 is H. Accordingly, the output of latch circuit 426 is L, the output of latch circuit 423 is H, and the output of latch circuit 428 is H. The H signals of SE9 and SE10, which are the output signals of latch circuit 428, are sent to selection circuit 400 as signal selection signals 407 (φSE, φSH, and φSW).

When the pixel signal is the third pixel signal (LCG), if the first reference value (REF1) is input, the output of comparator 421 is H, the output of latch circuit 423 is L, and the output of INV circuit 424 is H. Next, when the second reference value (REF2) is input, latch circuit 426 and latch circuit 428 are reset, the output of comparator 421 is H, the output of latch circuit 423 is held at L, and the output of AND 425 is L. Accordingly, the output of latch circuit 426 is H, the output of latch circuit 423 is L, and the output of latch circuit 428 is L. The H signals of SE11 and SE12, which are the output signals of latch circuit 426, are sent to selection circuit 400 as signal selection signals 407 (φSE, φSH, and φSW).

Signal selection signals 407 (φSE, φSH, and φSW) are also sent to voltage comparator 252 of column AD circuit 25 as gain selection signals 403. This will be described in greater detail later.

This makes it possible to increase detection speed because one pixel signal can be detected using the second pixel signal, which is the MCG signal.

With this, when selecting at least one pixel signal from a plurality of pixel signals for achieving a wide dynamic range function (WDR function), the selection can be made from MCG signals only. Accordingly, since there is no need to wait for the LCG signal to be read out from pixel circuit 3, the capacitive elements (C34 and C35) for LCG sample and hold in sample and hold circuit SH412 can be removed, reducing layout surface area. Furthermore, since the detection circuits (401 and 402) perform comparisons only for LCG, the circuit can be downsized and the layout surface area can be reduced.

The disclosures in the Second Detection Circuit Configuration Example section above also apply to when detecting two signals.

Configuration Example for Increasing Speed of Detection and Selection Circuit

Next, a configuration example for increasing the speed of detection and selection circuit 450 will be given. Above, a configuration example of detection and selection circuit 450 including selection circuit 400 and detection circuit 401 was given and the timing thereof was described. Here, a configuration for increasing the speed of detection and selection circuit 450 will be described.

In the above method, a plurality of pixel signals are held in sample and hold circuit SH412, and the pixel signals are used to perform a row-by-row readout operation in selection circuit 400 using signal selection signal 407 (q SE) detected by detection circuit 401 and selected by selection control circuit 410. Accordingly, the operation of holding a plurality of pixel signals, the operation of detecting at least one pixel signal, and the operation of reading out the selected pixel signal are performed in series temporally. This is time consuming.

Figure 10:
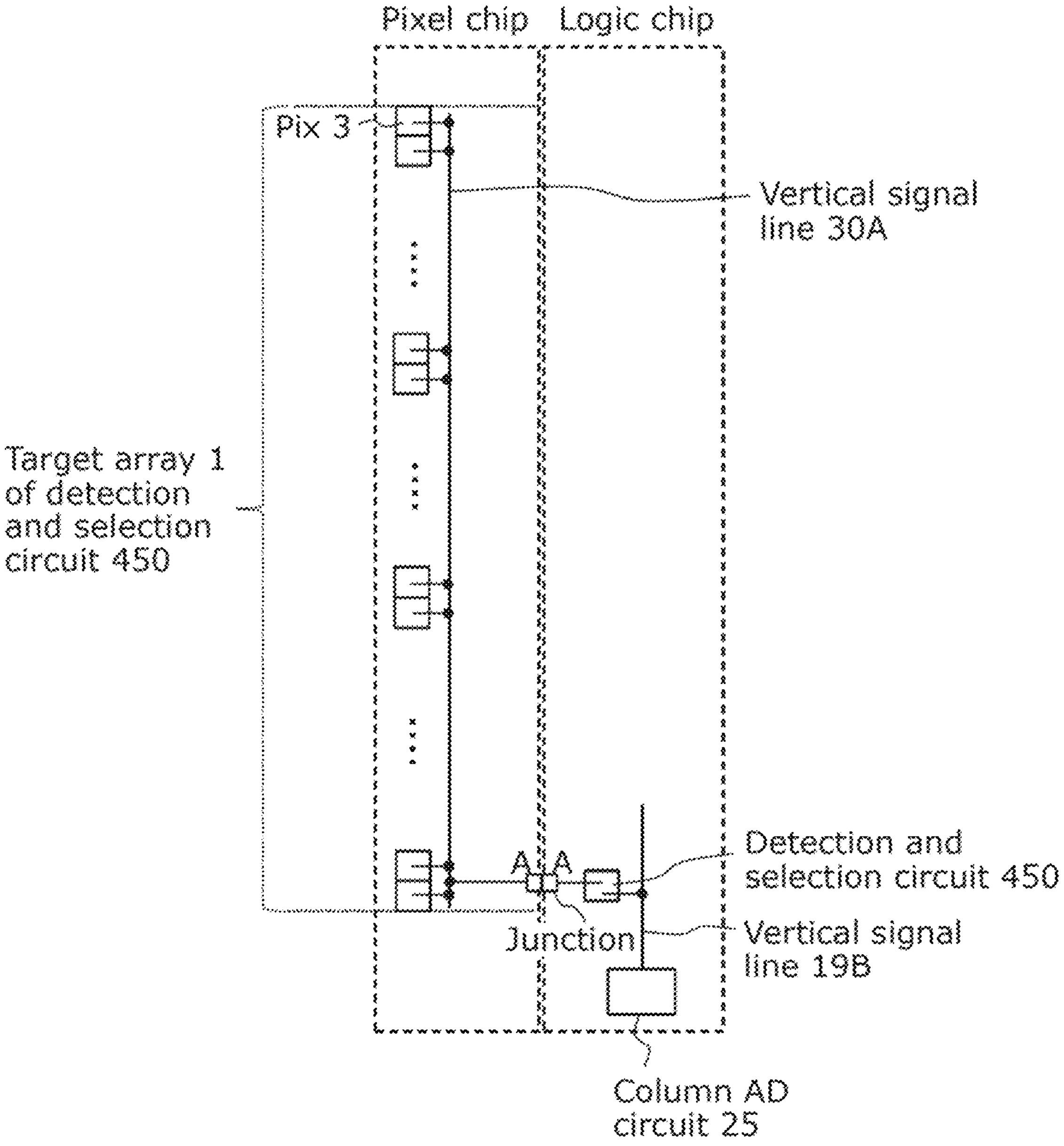
FIG. 10 illustrates an example of a junction between a pixel circuit and one detection and selection circuit according to Embodiment 1.
Figure 11:
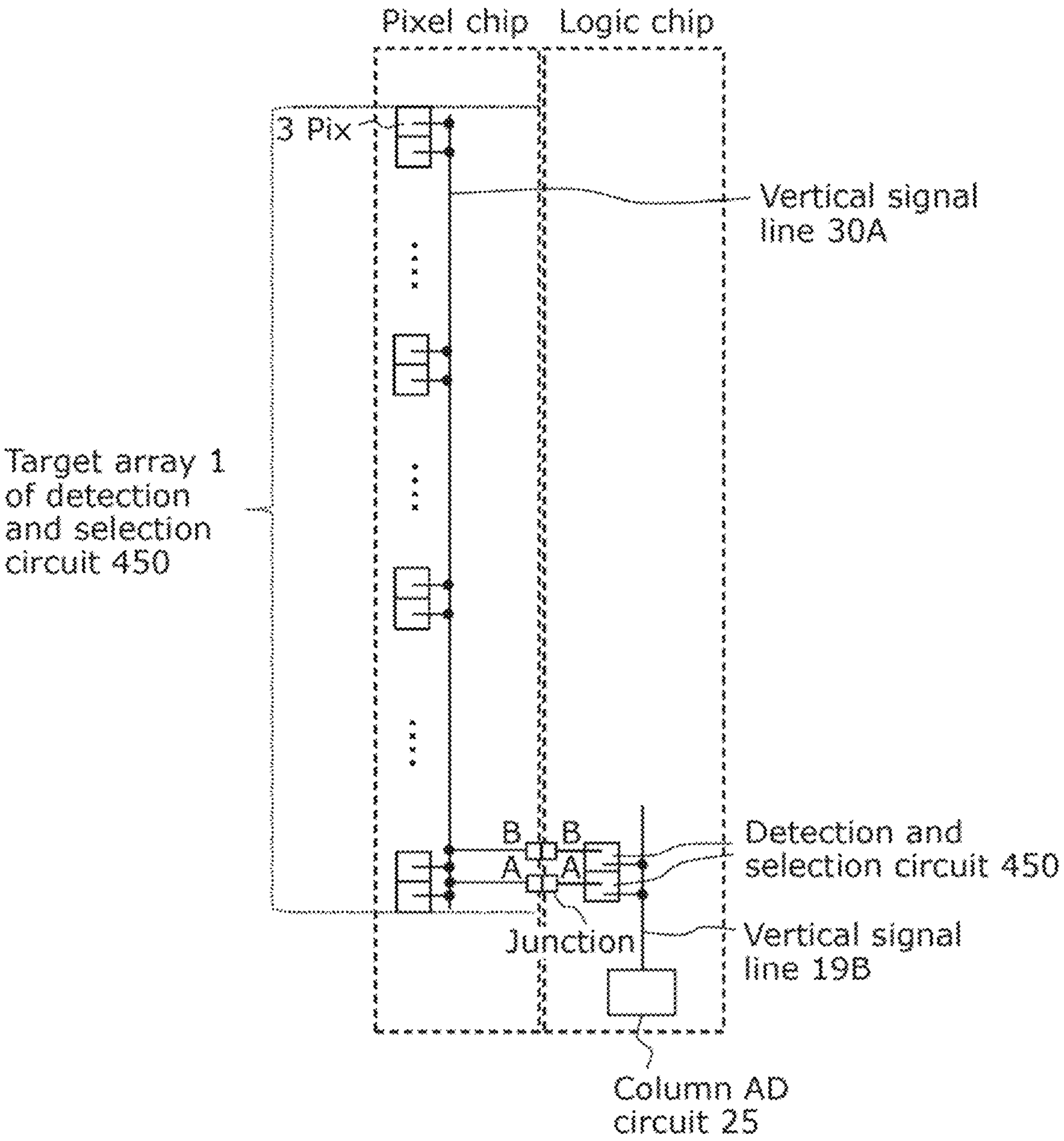
FIG. 11 illustrates an example of a junction between a pixel circuit and two detection and selection circuit according to Embodiment 1.
Figure 31:
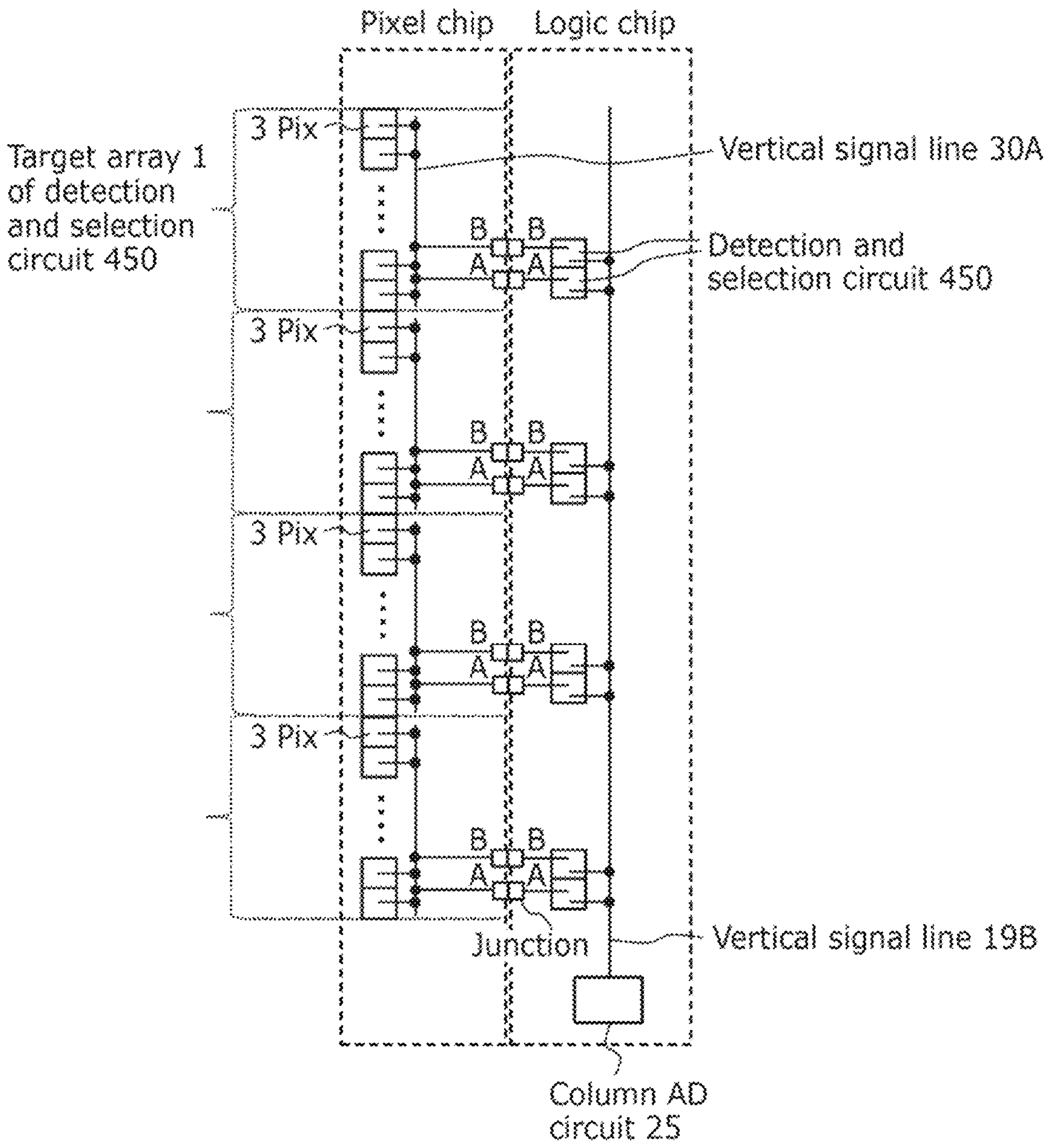
FIG. 31 illustrates an example of a junction between a pixel circuit and two detection and selection circuits according to Embodiment 2.

As a measure to address this, although FIG. 10 and FIG. illustrate only one detection and selection circuit 450, as illustrated in FIG. 11 and FIG. 31, a configuration example in which more than one detection and selection circuit 450 is provided is possible. Such a configuration enables the operation of holding a plurality of pixel signals, the operation of detecting at least one pixel signal, and the operation of reading out the selected pixel signal to be performed in parallel temporally, increasing speed.

First, a plurality of pixel signals from a row are input from vertical signal line 30A to the first of the plurality of detection and selection circuits 450 via switching element SW0, and turned off after input. Next, a plurality of pixel signals from the next row are input from vertical signal line 30A to the second of the plurality of detection and selection circuits 450 via switching element SW0, and turned off after input. Then, if necessary, a plurality of pixel signals from the next row are input from vertical signal line 30A to the third of the plurality of detection and selection circuits 450 via switching element SW0, and turned off after input.

With respect to the plurality of input signals, detection and selection circuits 450 perform, in parallel temporally, the operation of holding a plurality of pixel signals, the operation of detecting at least one pixel signal, and the operation of reading out the selected pixel signal, and the selected pixel signal is output to vertical signal line 19B through amplification transistor SF30 and switching element SEL_DET. This sort of control can achieve increased speed.

Here, switching element SW0 that inputs pixel signals to the plurality of detection and selection circuits 450 is exclusively turned on and off.

With this, while first detection circuit 401 or second detection circuit 402 of one detection and selection circuit 450 is detecting, the selection circuit 400 of another detection and selection circuit 450 can output a selection, thus achieving increased speed with detection and selection circuits 450.

Column AD Circuit Configuration Example

Figure 12:
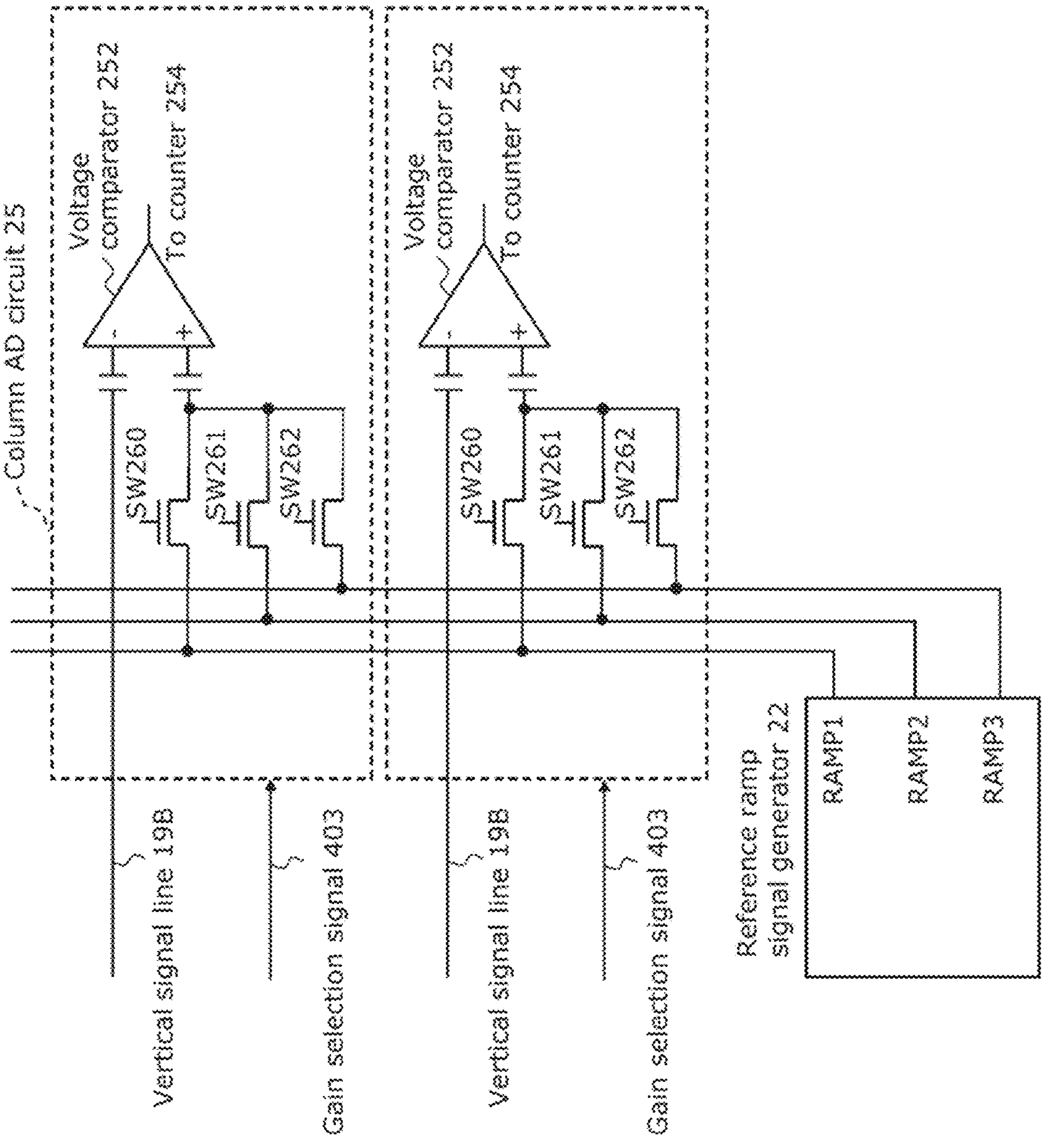
FIG. 12 is a block diagram of a configuration example of a reference ramp signal generator and a voltage comparator.

Next, a configuration example of column AD circuit 25 will be given with reference to FIG. 12.

Reference ramp signal generator 22, which supplies RAMP signals serving as reference signals to column AD circuit 25, simultaneously generates RAMP signals (RAMP1, RAMP2, and RAMP3) with analog gains respectively corresponding to HCG, MCG, and LCG.

Each RAMP signal is structured to be supplied to voltage comparator 252 via a selection switch (SW260, SW261, or SW262). The selection switching element (SW260, SW261, or SW262) is selected according to gain selection signal 403 from first detection circuit 401 or second detection circuit 402, and the corresponding RAMP signal is supplied to voltage comparator 252.

For example, if there is only one RAMP signal line, speed cannot be increased because the RAMP signal is generated three times in time-series, i.e., for HCG, MCG, and LCG. Alternatively, if the gain is the same, noise will worsen and accuracy will deteriorate. In contrast, reference ramp signal generator 22 generates the three RAMP signals simultaneously and sets the analog gains for each, thus achieving both high speed and noise reduction.

Dynamic Range Extension

A feature of the present embodiment is that in the global shutter method and the rolling shutter method, the three frames—the high-illuminance exposure, the medium-illuminance exposure, and the high-illuminance exposure frames—combined to achieve a WDR are exposed at exactly the same timing and the exact same pixels are used, which inhibits false colors, coloring, and blur.

The intra-pixel gain is set high for pixel signals in the frame for the low-illuminance region (i.e., for low-illuminance exposures) (HCG), set medium for pixel signals in the frame for the medium-illuminance region (i.e., for medium-illuminance exposures) (MCG), and set low for pixel signals in the frame for the high-illuminance region (i.e., for high-illuminance exposures) (LCG), which can also improve noise in low-illuminance conditions and extend the dynamic range in high-illuminance conditions.

Figure 13A:
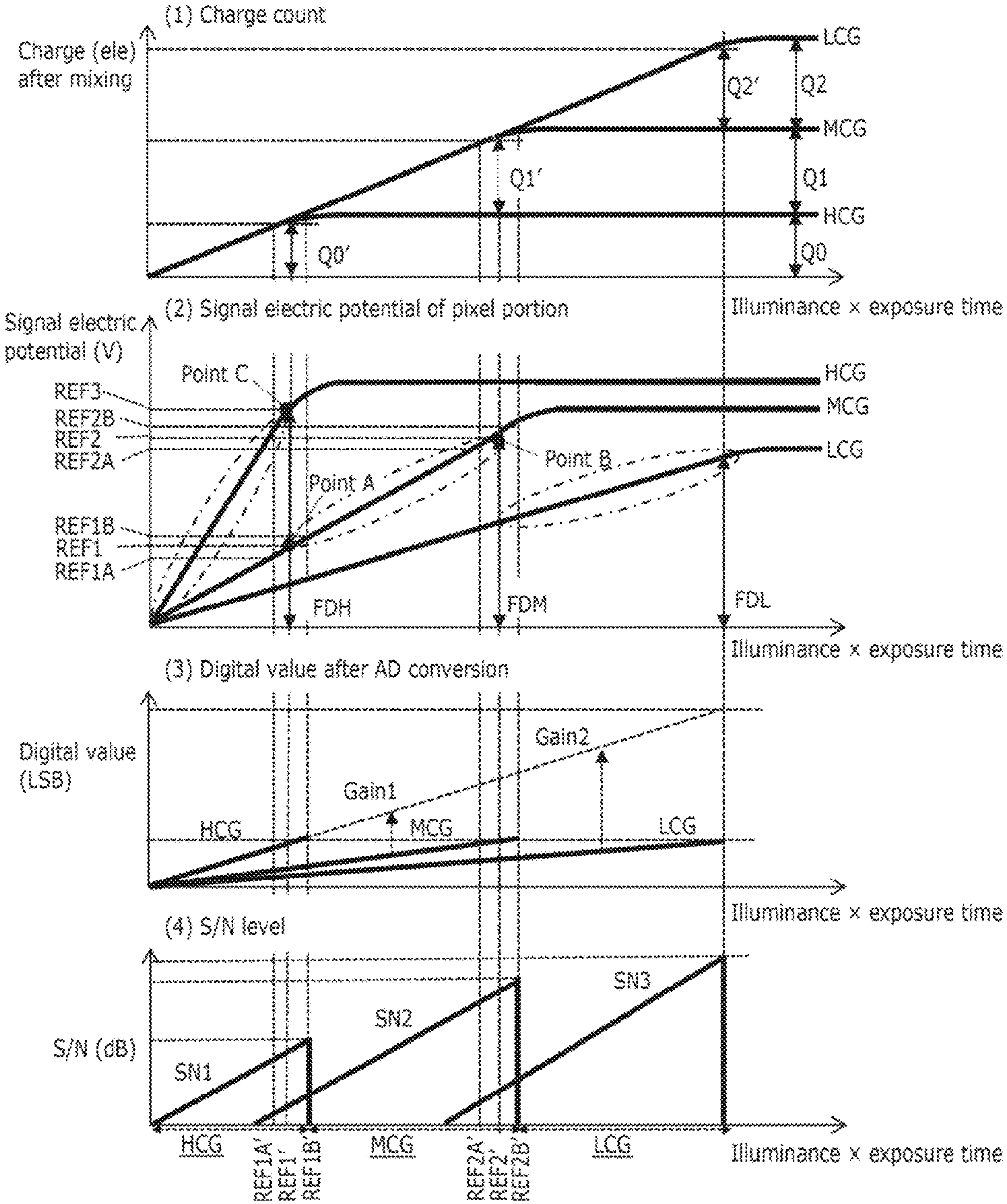
FIG. 13A is an overview of how WDR is implemented within a pixel.
Figure 25:
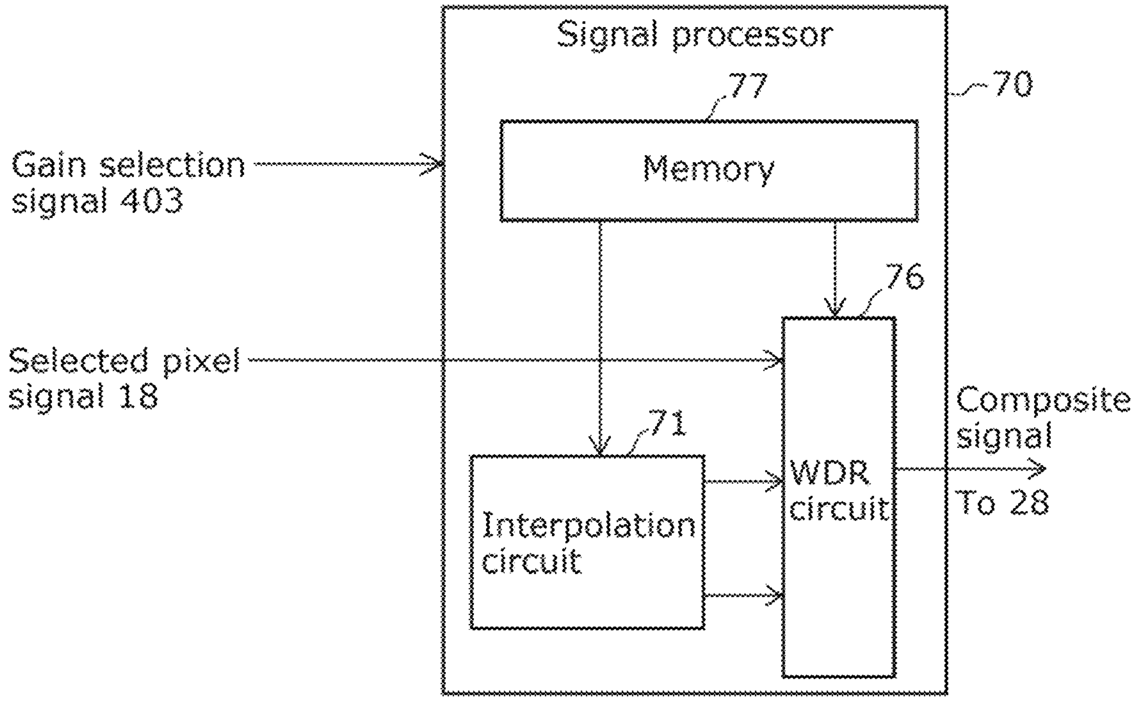
FIG. 25 illustrates a configuration example of a signal processor that combines three frames to achieve a WDR.

FIG. 13A is an overview of the combining method used within a pixel to achieve a WDR. FIG. 25 illustrates a configuration example of a signal processor that combines three frames to achieve a WDR. The WDR is achieved using the signal charge of Q0 for the low-illuminance exposure set to HCG, the signal charge of (Q0+Q1) for the medium-illuminance exposure set to MCG, and the signal charge of (Q0+Q1+Q2) for the high-illuminance exposure set to LCG, as illustrated in FIG. 13A. The product of illuminance and exposure time, illuminance at a certain time, or exposure time at a certain illuminance is represented on the horizontal axes of (1), (2), (3), and (4) in FIG. 13A. In (1), charge accumulation level is represented on the vertical axis. In (2), the signal electric potential of the pixel portion is represented on the vertical axis. In (3), the value after AD conversion is represented on the vertical axis. In (4), the S/N level is represented on the vertical axis.

WDR circuit 76 included in signal processor 70 is illustrated in greater detail in (3) and (4) in FIG. 13A. The "illuminance×exposure time" at the boundary between low- and medium-illuminance exposures corresponds to charge Q0' just before charge Q0 in (1) saturates and corresponds to signal electric potential FDH in the pixel portion in (2). The "illuminance×exposure time" at the boundary between medium- and high-illuminance exposures corresponds to charge Q0+Q1' just before charge Q0+Q1 in (1) saturates and corresponds to signal electric potential FDM in the pixel portion in (2). The "illuminance×exposure time" which is the maximum, high-illuminance exposure corresponds to charge Q0+Q1+Q2' just before charge Q0+Q1+Q2 in (1) saturates and corresponds to signal electric potential FDL in the pixel portion in (2).

With this, the pixel signal of the first, low-illuminance frame (low-illuminance exposure), the pixel signal of the second, medium-illuminance frame (medium-illuminance exposure), and the pixel signal of the third, high-illuminance frame (high-illuminance exposure) are combined, which achieves a wide dynamic range function (WDR function), or stated differently, functions to extend the dynamic range.

Signal processor 70 illustrated in FIG. 25 includes memory 77, interpolation circuit 71, and WDR circuit 76.

Memory 77 stores pre-measured data of the gain ratio or sensitivity ratio of the pixel values of the HCG, MCG, and LCG signals corresponding to illuminance×exposure time. For example, memory 77 stores Gain1 and Gain2 illustrated in (3) in FIG. 13A. Gain1 is the gain ratio between MCG and HCG signals. Gain2 is the gain ratio between LCG and HCG signals. Note that the gain ratio between LCG and MCG signals may be calculated as Gain2/Gain1, and, alternatively, a pre-measured value may be stored. Once one value of the HCG, MCG, and LCG signals has been identified, the other two values can be calculated by interpolation processing using the gain ratios described above. Note that memory 77 may store sensitivity ratios instead of gain ratios.

Among the three pixel signals, i.e., the HCG, MCG, and LCG signals, interpolation circuit 71 calculates, by interpolation processing, the pixel values of the two pixel signals that were not selected based on the one pixel signal selected by selection circuit 400. The pixel values of the two pixel signals that were not selected by selection circuit 400 are calculated by interpolation processing by interpolation circuit 71, and input into WDR circuit 76. Here, "interpolation processing" means interpolation or estimation.

WDR circuit 76 combines the three pixel signals so that they are linear from the gain ratio or sensitivity ratio data in memory 77, based on the pixel signal selected by selection circuit 400 and the two pixel signals calculated by the interpolation processing by interpolation circuit 71.

Figure 13B:
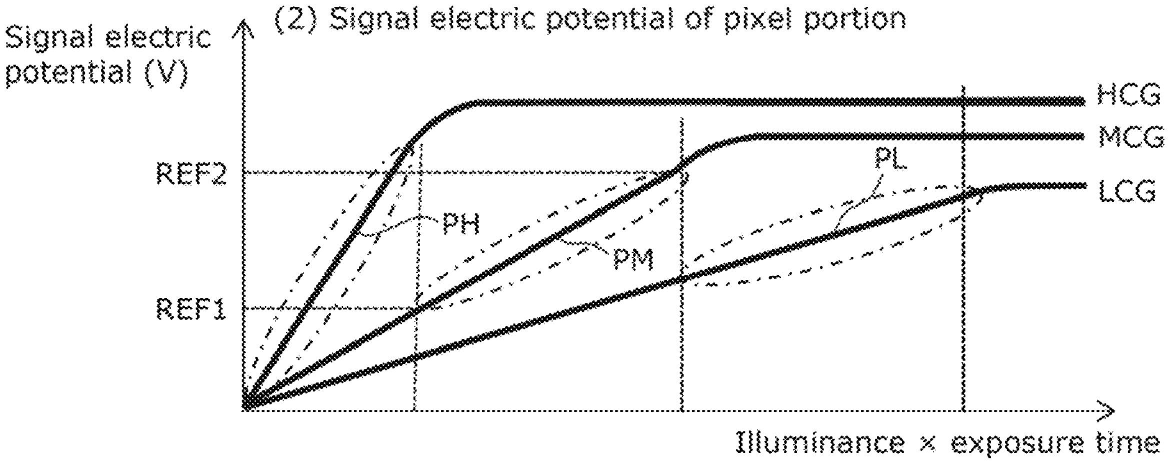
FIG. 13B is an overview of how WDR is implemented within a pixel.

For example, if pixel value PH of the pixel signal surrounded by the HCG signal in the dotted and dashed box in FIG. 13B is selected, MCG and LCG signals are calculated by interpolation processing from the gain ratio or sensitivity ratio in memory 77.

Similarly, if pixel value PM of the pixel signal surrounded by the MCG signal in the dotted and dashed box in FIG. 13B is selected, HCG and LCG signals are calculated by interpolation processing from the gain ratio or sensitivity ratio in memory 77.

Similarly, if pixel value PL of the pixel signal surrounded by the LCG signal in the dotted and dashed box in FIG. 13B is selected, HCG and MCG signals are calculated by interpolation processing from the gain ratio or sensitivity ratio in memory 77.

Similarly, selection circuit 400 may select two pixel signals, and among the three pixel signals, i.e., the HCG, MCG, and LCG signals, interpolation circuit 71 may calculate, by interpolation processing, the pixel value of the one pixel signal that was not selected based on the two pixel signals selected by selection circuit 400.

Thus, signal processor 70 obtains one pixel value among pixel value PH of the HCG signal, pixel value PM of the MCG signal, and pixel value PL of the LCG signal as the signal selected by selection circuit 400. Moreover, in signal processor 70, two pixel values among pixel value PH of the HCG signal, pixel value PM of the MCG signal, and pixel value PL of the LCG signal are obtained by interpolation by interpolation circuit 71. Signal processor 70 combines the three pixel values thus obtained so that they are linear to thereby obtain the linear digital pixel signal illustrated in (3) in FIG. 13A, corresponding to the charge after mixing illustrated in (1) in FIG. 13A.

Note that it is desirable to inhibit a sudden change in the S/N of the subject near the boundary between low- and medium-illuminance exposures, or at the boundary between medium- and high-illuminance exposures as much as possible.

First Reference Value and Second Reference Value

Next, the first reference value and the second reference value will be described with reference to FIG. 13A.

When combining three frames consisting of HCG (low-illuminance exposure), which is the first pixel signal, MCG (medium-illuminance exposure), which is second pixel signal, and LCG (high-illuminance exposure), which is the third pixel signal, the first reference value (REF1, REF3) of first detection circuit 401 or second detection circuit 402 is a value at the boundary between HCG (low-illuminance exposure), which is the first pixel signal, and MCG (medium-illuminance exposure), which is second pixel signal. The second reference value (REF2) of first detection circuit 401 or second detection circuit 402 is a value at the boundary between MCG (medium-illuminance exposure), which is second pixel signal, and LCG (high-illuminance exposure), which is the third pixel signal.

(i) Method of Setting First Reference Values (REF1 and REF2)

The illuminance×exposure time for the boundary between low-illuminance exposure and medium-illuminance exposure is expressed as REF1', and the illuminance×exposure time for the boundary between medium-illuminance exposure and high-illuminance exposure is expressed as REF2'. These correspond to REF1 and REF2 of the LCG in the signal electric potential of the pixel unit in (2). Signal electric potential REF1 of LCG is indicated by "point A" and corresponds to charge Q0' just before charge Q0 of the first pixel signal in (1) is saturated. Signal electric potential REF2 of LCG is indicated by "point B" and corresponds to charge Q0+Q1' just before charge QQ0+Q1 of the second pixel signal in (1) is saturated.

HCG (low-illuminance exposure), which is the first pixel signal, corresponds to when signal electric potential of LCG<REF1 of LCG.

MCG (medium-illuminance exposure), which is the second pixel signal, corresponds to when REF1 of LCG<signal electric potential of LCG<REF2 of LCG.

LCG (high-illuminance exposure), which is the third pixel signal, corresponds to when REF2 of LCG<signal electric potential of LCG.

(ii) Method of Setting Second Reference Values (REF3 and REF2)

The illuminance×exposure time for the boundary between low-illuminance exposure and medium-illuminance exposure is expressed as REF1', and the illuminance×exposure time for the boundary between medium-illuminance exposure and high-illuminance exposure is expressed as REF2'. These correspond to REF3 and REF2 of the LCG in the signal electric potential of the pixel unit in (2). Signal electric potential REF3 of HCG is indicated by "point C" and corresponds to charge Q0' just before charge Q0 of the first pixel signal in (1) is saturated. Signal electric potential REF2 of LCG is indicated by "point B" and corresponds to charge Q0+Q1' just before charge Q0+Q1 of the second pixel signal in (1) is saturated.

HCG (low-illuminance exposure), which is the first pixel signal, corresponds to when signal electric potential of HCG<REF3 of HCG.

MCG (medium-illuminance exposure), which is the second pixel signal, corresponds to when REF3 of HCG<signal electric potential of HCG and when signal electric potential of LCG<REF2 of LCG.

LCG (high-illuminance exposure), which is the third pixel signal, corresponds to when REF2 of LCG<signal electric potential of LCG.

With this, the pixel signal of the first, low-illuminance frame (low-illuminance exposure), the pixel signal of the second, medium-illuminance frame (medium-illuminance exposure), and the pixel signal of the third, high-illuminance frame (high-illuminance exposure) are combined, which achieves a wide dynamic range function (WDR function), or stated differently, functions to extend the dynamic range.

Reference Value Hysteresis Function

Next, the temporal hysteresis function of reference values REF1, REF2, and REF3 illustrated in FIG. 13A will be described. Although FIG. 28 describes a case where reference values REF1 and REF2 are used, the concept is the same for when reference values REF3 and REF2 are used.

Figures 26, 27, 28:
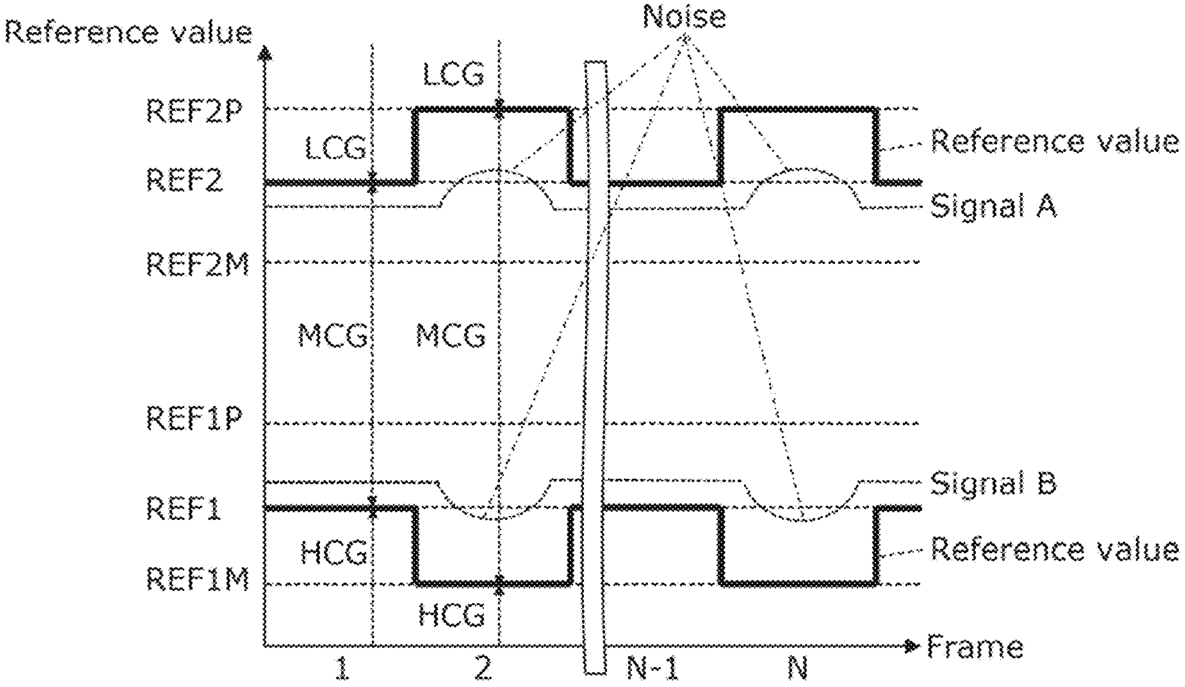
FIG. 26 illustrates a configuration example where a column detection and selection circuit independently selects signals for each color.
FIG. 27 illustrates a configuration example where a column detection and selection circuit selects gains giving priority to the largest signal of each color in units defined by a Bayer array.
FIG. 28 illustrates an example of hysteresis of WDR reference values REF1 and REF2.

FIG. 28 illustrates an example of disturbance noise superimposed on the MCG signal. Conversely, there may be cases where disturbance noise is superimposed on the reference value.

Reference values REF1 and REF2 are boundary values between a low-illuminance exposure frame (HCG), a medium-illuminance exposure frame (MCG), and a high-illuminance exposure frame (LCG). Accordingly, if reference values REF1 and REF2 always remain constant over time, as illustrated in the figure, the signal level becomes high (signal A) due to the superposition of slight disturbance noise and shot noise on the MCG signal in the second and N-th frames. Alternatively, the signal level may become low (signal B) and generate false readings. Stated differently, what should correctly be read as MCG may be misread as HCG or LCG. In this case, despite the subject being the same, the image may switch to one of the gains, resulting in an image with a different S/N for each frame due to the changes in S/N at the boundaries.

Accordingly, each reference value REF1 and REF2 in the current frame should be configured to have hysteresis, i.e., produce a different voltage from that in the previous frame for the same gain. For example, as illustrated in the figure, if temporal hysteresis is implemented that makes the first reference value, REF1M, a slightly lower voltage than REF1 (see signal B) and makes the second reference value, REF2P, a slightly higher voltage than REF2 (see signal A), then false readings can be eliminated in frame 2 or N as the current frame where frame 1 or N−1 is the previous frame. Stated differently, what should correctly be read as MCG is correctly read as MCG even if there is external noise.

Figure 8:
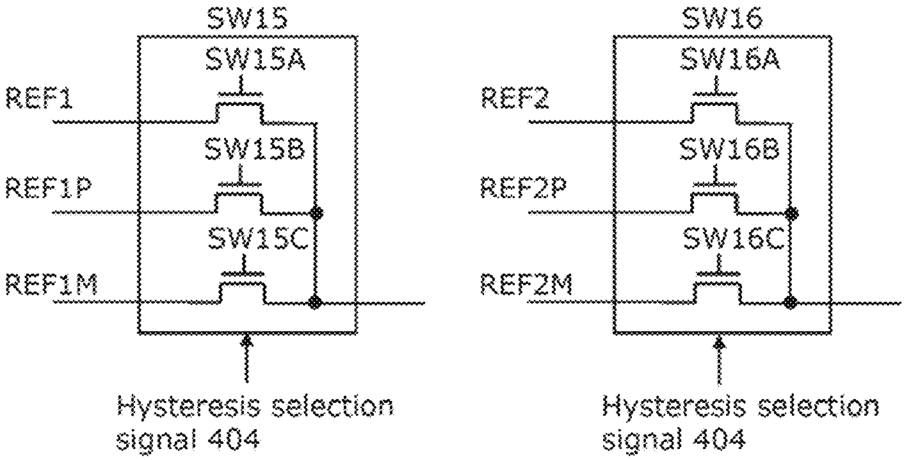
FIG. 8 is a block diagram illustrating a configuration example of switching circuits SW15 and SW16 in a first detection circuit and a second detection circuit.

In FIG. 8, the voltages supplied from gain reference signal generator 40 include first reference values REF1, REF1P, and REF1M and second reference values REF2, REF2P, and REF2M, which are supplied to switching circuit SW15 and switching circuit SW16 of first detection circuit 401 or second detection circuit 402, where an optimal reference value is selected by hysteresis selection signal 404, which will be described below.

The gain information for at least the previous frame is stored for all pixels in frame memory 97 of signal processor 90 via gain selection signal 403. Based on this information, the following signal processing flow is performed by controller 96 to select the optimal reference value for the current frame. The information is supplied to first detection circuit 401 or second detection circuit 402 via hysteresis selection signal 404 as gain information for the current frame.

Next, the signal processing flow in controller 96 will be described. A typical implementation of temporal hysteresis is to make the signal range in the current frame to be wider than the signal range of the previous frame for the same gain.

First, REF1 at the boundary between HCG and MCG will be described. If the previous frame is HCG, voltage REF1P is slightly higher than REF1 in the current frame. If the previous frame is MCG, voltage REF1M is slightly lower than REF1 in the current frame.

Next, REF2 at the boundary between MCG and LCG will be described. If the previous frame is MCG, voltage REF2P is slightly higher than REF2 in the current frame. If the previous frame is LCG, voltage REF2M is slightly lower than REF2 in the current frame.

Signals subject to the above control by controller 96 based on frame memory 97 for the previous frame for all the pixels have hysteresis by hysteresis selection signal 404 via column AD circuit 25 selecting switching circuit SW15 (SW15A, SW15B, and SW15C) and switching circuit SW16 (SW16A, SW16B, and SW16C) for each pixel.

This makes it possible to inhibit sudden changes in S/N between frames caused by misreadings due to, for example, superimposition of noise when the pixel signal level is close to the reference value at the boundary between HCG and MCG or the boundary between MCG and LCG when implementing a wide dynamic range function (WDR function).

Signal Selection in Units Defined According to Color Filter Array

Signal selection in units defined according to the color filter array will be described using a typical Bayer array of four colors (R, Gr, B, and Gb) as an example.

First, each reference value (REF1, REF2, and REF3) is configured to include a function whereby the value changes in coordination with the analog or digital gain.

With this, each frame in the wide dynamic range can be combined even when each color has a variable analog or digital gain due to AE control. This function is especially necessary when adjusting the gain for each color as the white balance changes when the color temperature of the subject changes.

Next, the relationship between first reference value REF1, second reference value REF2, and the color filters will be described with reference to FIG. 13A.

First, for example, in the case of a Bayer array, the sensitivity differs among the four colors (R, Gr, B, and Gb), with Gr or Gb having the greatest sensitivity and B and R having lower sensitivity. The reference values REF1' and REF2' for Gr or Gb are therefore lower than those for B and R. The voltage levels of each reference value REF1, REF2, and REF3 for each color change in coordination with this.

There are two combining methods for achieving a WDR.

(i) The first method is, in the case of a Bayer array, using the maximum signal gain of the four colors (R, Gr, B, and Gb) shown in the bold frame in FIG. 27 to combine the three frames.

In this case, detection and selection circuits 450 are provided for the four colors (R, Gr, B, and Gb) and are matched to the color with this maximum signal level. For example, if the high color of this maximum signal level is Gr and the maximum signal gain is detected to be LCG, LCG is also used for the other three colors (R, B, and Gb). For example, if the high color of this maximum signal level is R and the maximum signal gain is detected to be MCG, MCG is also used for the other three colors (Gr, B, and Gb).

With this, the same gain is used for each of units defined according to a color filter array, such as a unit of a Bayer array of four colors, and there is no coloring due to the shift in linearity of each color that may occur when the gain differs between colors. Moreover, even when the gain of each color changes due to AE control, reference value REF1' and reference value REF2' at the boundaries change in coordination, using the maximum signal level of the four colors (R, Gr, B, and Gb) at the S/N levels in (4) in FIG. 13A. Since the gain (HCG, MCG, and LCG) of each color before and after the WDR boundaries is the same, no coloring due to a linearity shift of each color occurs.

(ii) The second method is, in the case of a Bayer array, using the individual signal gains of the four colors (R, Gr, B, and Gb) shown in FIG. 26 to independently combine the three frames. Even when the gain of each color changes due to AE operation, reference value REF1' and reference value REF2' always change independently at the boundaries of the four colors (R, Gr, B, and Gb) at the S/N levels in (4) in FIG. 13A. In this case, detection and selection circuits 450 are provided for the four colors (R, Gr, B, and Gb), and each detect HCG, MCG, and LCG at the respective signal levels.

With this, the advantage of WDR is that reference value REF1' and reference value REF2' for each color can be maximized, resulting in a good S/N.

Exposure Time

Regarding the accumulation of charge in photodiode PD, first storage capacitive element C1, and second storage capacitive element C2, the amount of charge is Q0, Q1, and Q2, respectively, after continuing to be exposed for the desired exposure period.

(i) In the rolling shutter method, all pixels are scanned per selected row to start exposure, and since the exposure periods are the same, the exposure time is represented by T_Q0=T_Q1=T_Q2. Next, the readout of charge from the photodiode is performed for the row selected by scanning row by row to the sample and hold capacitive elements (C30, C31, C32, C33, C34, and C35) of sample and hold circuit SH412 in detection and selection circuit 450. Thereafter, the selected pixel signals are read out row by row using the rolling method.

(ii) In the global shutter method, the global reset is performed simultaneously for all pixels to start exposure, and since the exposure periods are the same, the exposure time is represented by T_Q0=T_Q1=T_Q2. Next, the charge from the photodiode is read out simultaneously for all pixels to the sample and hold capacitive elements (C20, C21, C22, C23, C24, and C25). Thereafter, the signal charges of the sample and hold capacitive elements (C20, C21, C22, C23, C24, and C25) are read out row by row using the rolling method.

Next, the readout of this signal charge is performed for the row selected by scanning row by row to the sample and hold capacitive elements (C30, C31, C32, C33, C34, and C35) of sample and hold circuit SH412 in detection and selection circuit 450. Thereafter, the selected pixel signals are read out row by row using the rolling method.

With this, when the three frames of the first, second, and third pixel signals, which are respectively the HCG, the MCG, and the LCG pixel signals for low illuminance, medium illuminance, and high illuminance, respectively, are combined by WDR circuit 76, since the frames are simultaneously exposed, there is no blur or coloring between the frames.

Mixing (Blending) at WDR Boundaries

When one pixel signal is selected from a plurality of pixel signals, there is a significant change in the S/N at the boundary between HCG and MCG and at the boundary between MCG and LCG, as shown by the S/N levels in (4) in FIG. 13A. Accordingly, despite the subject being the same, there is a possibility that variations may appear in the S/N depending on which gain is selected.

One measure to address this is to mix (blend) the HCG and MCG signals from just before the boundary between HCG and MCG, and select this mixed (blended) signal as a single pixel signal to mitigate the S/N at the boundary. The same method can be used to mitigate the S/N at the boundary between MCG and LCG.

Figure 9:
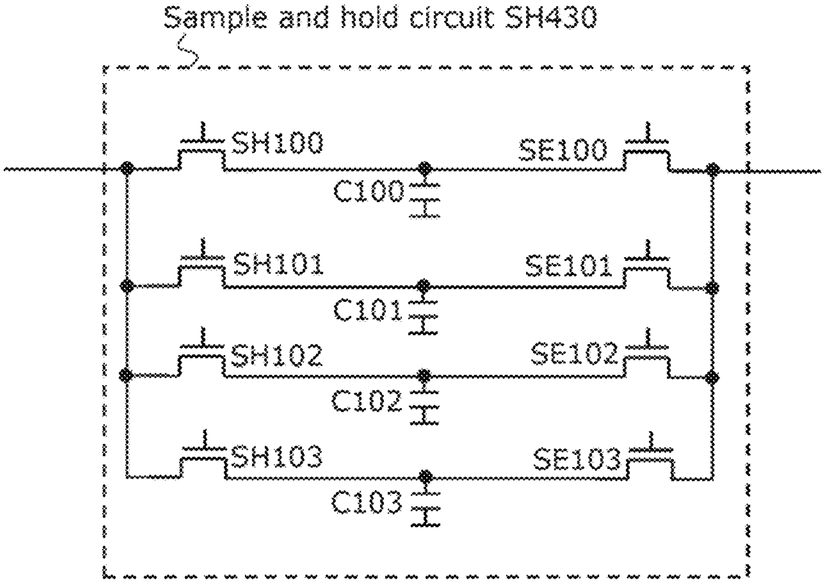
FIG. 9 illustrates a configuration example of sample and hold circuit SH430 pertaining to a selection circuit.

FIG. 9 illustrates a configuration in which sample and hold circuit SH430, which is included in selection circuit 400 and holds the signal of each gain of sample and hold circuit SH412, includes a plurality of sets of sample and hold elements (SH, C, and SE). In this example, this does not apply only to the reset component of the HCG, but shows that sample and hold circuit SH430 is provided for the six pairs of signal and reset components corresponding to all gains. As an example, compared to the number of sample and hold switching elements (SH), sample and hold capacitive elements (C), and readout selection switching elements (SE) included in sample and hold circuit SH412, the sets of sample and hold circuit SH430 include four times as many of the same elements.

Regarding the sample and hold capacitive elements (C), the ratio of HCG (C30 and C31) to MCG (C32 and C33) to LCG (C34 and C35) is set to be the inverse ratio of the gain (FD conversion gain (μV/ele)) in the charge storage (FD0). This is because the charge of the sample and hold capacitive element is given by $\Delta Q = C \times \Delta V$, and signal voltage $\Delta V$ of each gain is determined by the FD conversion gain ratio, so if capacitance value C is set to be the inverse ratio of the FD conversion gain ratio, charge Q will be equal and can be equally mixed independent of the HCG, MCG, and LCG gains.

Figure 14A:
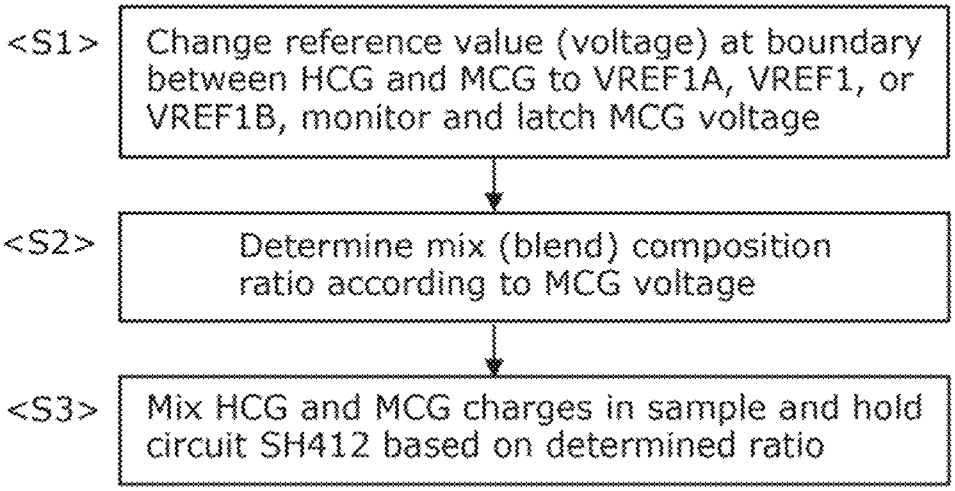
FIG. 14A is a flowchart for determining a composition ratio at the boundary between HCG and MCG of the WDR.

First, the mixing (blending) ratio for HCG and MCG in WDR will be described with reference to FIG. 14A. First, in <S1>, the reference value (voltage) at the boundary between HCG and MCG is changed to, for example, VREF1A, VREF1, or VREF1B, and the voltage of the MCG is monitored and latched. In <S2>, the composition ratio for the mixing (blending) is determined according to the MCG voltage. In <S3>, the HCG and MCG charges are mixed in sample and hold circuit SH412 including sample and hold circuits SH430 based on the determined composition ratio.

Figure 14B:
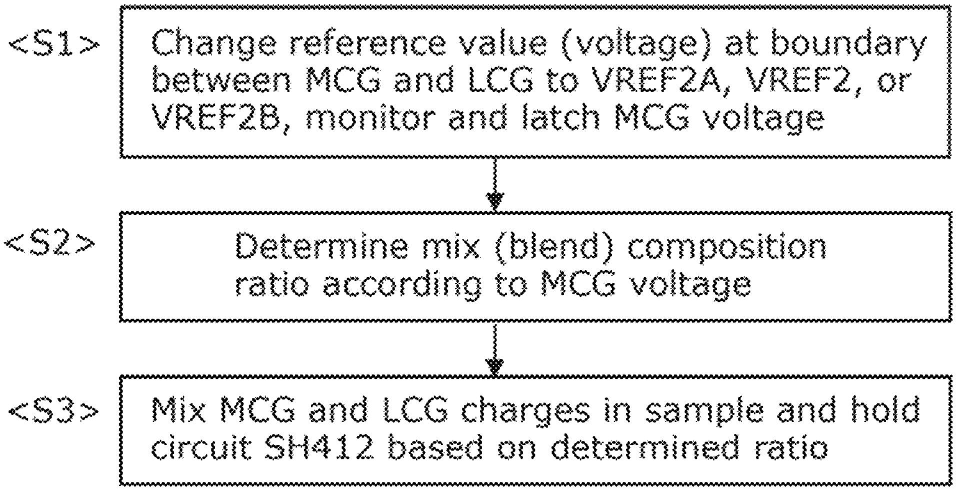
FIG. 14B is a flowchart for determining a composition ratio at the boundary between MCG and LCG of the WDR.

Next, the mixing (blending) ratio for MCG and LCG in WDR will be described with reference to FIG. 14B. First, in <S1>, the reference value (voltage) at the boundary between MCG and LCG is changed to, for example, VREF2A, VREF2, or VREF2B, and the voltage of the MCG is monitored and latched. In <S2>, the composition ratio for the mixing (blending) is determined according to the MCG voltage. In <S3>, the MCG and LCG charges are mixed in sample and hold circuit SH412 including sample and hold circuits SH430 based on the determined composition ratio.

Next, the method of mixing (blending) for HCG and MCG will be described with reference to (2) and (4) in FIG. 13A and with reference to FIG. 14C.

Figure 14C:
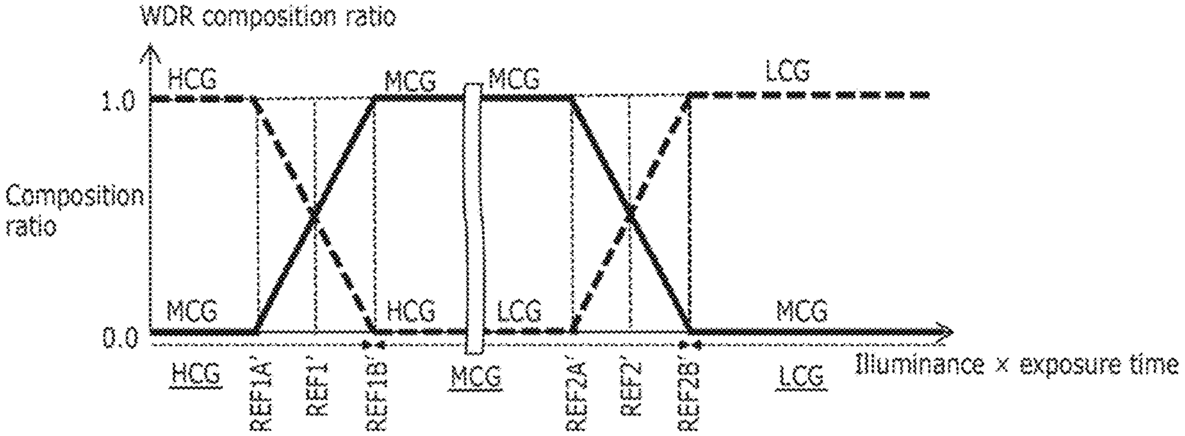
FIG. 14C is an overview of how the composition ratio of HCG, MCG, and LCG of WDR is implemented.

For example, in the case of REF1A' (REF1A) in (2) and (4) in FIG. 13A, which is a signal level low than REF1' (REF1) at the boundary between HCG and MCG in FIG. 14C, regarding the signal component, the charges of C100+C101+C102+C103 for HCG can be mixed to achieve a composition ratio of HCG:MCG=4:0, i.e., can be mixed without mixing in the MCG charge. Similarly, in the case of a signal level that is slightly lower than REF1' (REF1) at the boundary, regarding the signal component, the charges of C100+C101+C102 for HCG and the charge of C100 for MCG can be mixed to achieve a composition ratio of HCG:MCG=3:1. Similarly, in the case of REF1' (REF1) at the boundary between HCG and MCG, regarding the signal component, the charges of C100+C101 for HCG and the charges of C100+C101 for MCG can be mixed to achieve a composition ratio of HCG:MCG=2:2. Similarly, in the case of a signal level that is slightly higher than REF1' (REF1) at the boundary, regarding the signal component, the charge of C100 for HCG and the charges of C100+C101+C102 for MCG can be mixed to achieve a composition ratio of HCG:MCG=1:3. Similarly, in the case of REF1B' (REF1B) (Q0=approximately saturation level), which is a signal level higher than REF1' (REF1) at the boundary between HCG and MCG, regarding the signal component, the charges of C100+C101+C102+C103 for MCG can be mixed to achieve a composition ratio of HCG:MCG=0:4, i.e., can be mixed without mixing in the HCG charge.

Next, the method of mixing (blending) for MCG and LCG will be described with reference to (2) and (4) in FIG. 13A and with reference to FIG. 14C.

For example, in the case of REF2A' (REF2A), which is a signal level lower than REF2' (REF2) at the boundary between MCG and LCG in (2) and (4) in FIG. 13A and in FIG. 14C, regarding the signal component, the charges of C100+C101+C102+C103 for MCG can be mixed to achieve a composition ratio of MCG:LCG=4:0, i.e., can be mixed without mixing in the LCG charge. Similarly, in the case of a signal level that is slightly lower than REF1' (REF1) at the boundary, regarding the signal component, the charges of C100+C101+C102 for MCG and the charge of C100 for LCG can be mixed to achieve a composition ratio of MCG:LCG=3:1. Similarly, in the case of REF2' (REF2) at the boundary between MCG and LCG, regarding the signal component, the charges of C100+C101 for MCG and the charges of C100+C101 for LCG can be mixed to achieve a composition ratio of MCG:LCG=2:2. Similarly, in the case of a signal level that is slightly higher than REF2' (REF2) at the boundary, regarding the signal component, the charge of C100 for MCG and the charges of C100+C101+C102 for LCG can be mixed to achieve a composition ratio of MCG:LCG=1:3. Similarly, in the case of REF2B' (REF2B) (Q0+Q1=approximately saturation level), which is a signal level higher than REF2' (REF2) at the boundary between MCG and LCG, regarding the signal component, the charges of C100+C101+C102+C103 for LCG can be mixed to achieve a composition ratio of MCG:LCG=0:4, i.e., can be mixed without mixing in the MCG charge.

With this, when implementing a wide dynamic range function (WDR function), it is possible to slightly mix (blend) signals at the boundary between HCG and MCG and at the boundary between MCG and LCG, and mitigate the S/N at the boundaries by selecting the mixed (blended) signals as pixel signals. Similarly, blending for the reset component is performed using the same ratios.

Noise Reduction at WDR Boundaries

When one pixel signal is selected from a plurality of pixel signals, there is a significant change in the S/N at the boundary between HCG and MCG and at the boundary between MCG and LCG, as shown by the S/N levels in (4) in FIG. 13A. Accordingly, large variations appear in the S/N depending on which gain is selected.

As a measure to address this, a noise reduction ratio in the signal processor is determined according to each MCG or HCG digital signal level before and after the first reference values (REF1 and REF3) in (3) in FIG. 13A, and noise reduction between HCG and MCG is implemented.

Similarly, a noise reduction ratio in the signal processor is determined according to MCG digital signal levels before and after the second reference value (REF2) in (3) in FIG. 13A, and noise reduction between MCG and LCG is implemented.

With this, when implementing a wide dynamic range function (WDR function), it is possible to mitigate sudden changes in the S/N at the boundary between HCG and MCG and the boundary between MCG and LCG by implementing digital noise reduction.

Readout Operation Example

Next, the high conversion gain (HCG) readout operation in solid-state imaging apparatus 100 including pixel circuits 3 that is illustrated in FIG. 1 will be described. The HCG readout operation uses only charge storage FD0 to store the signal charge and increases the conversion gain of amplification transistor SF1. Hence, the HCG operation is a high-sensitivity imaging operation, suitable for imaging in low-illuminance environments.

In correlated double sampling (CDS) in the HCG readout operation, the signal level is read out after the kTC noise of the analog pixel signal is read out. In CDS, the difference between the kTC noise and the signal level is taken.

Timing Chart Description (RS)

Figure 15:
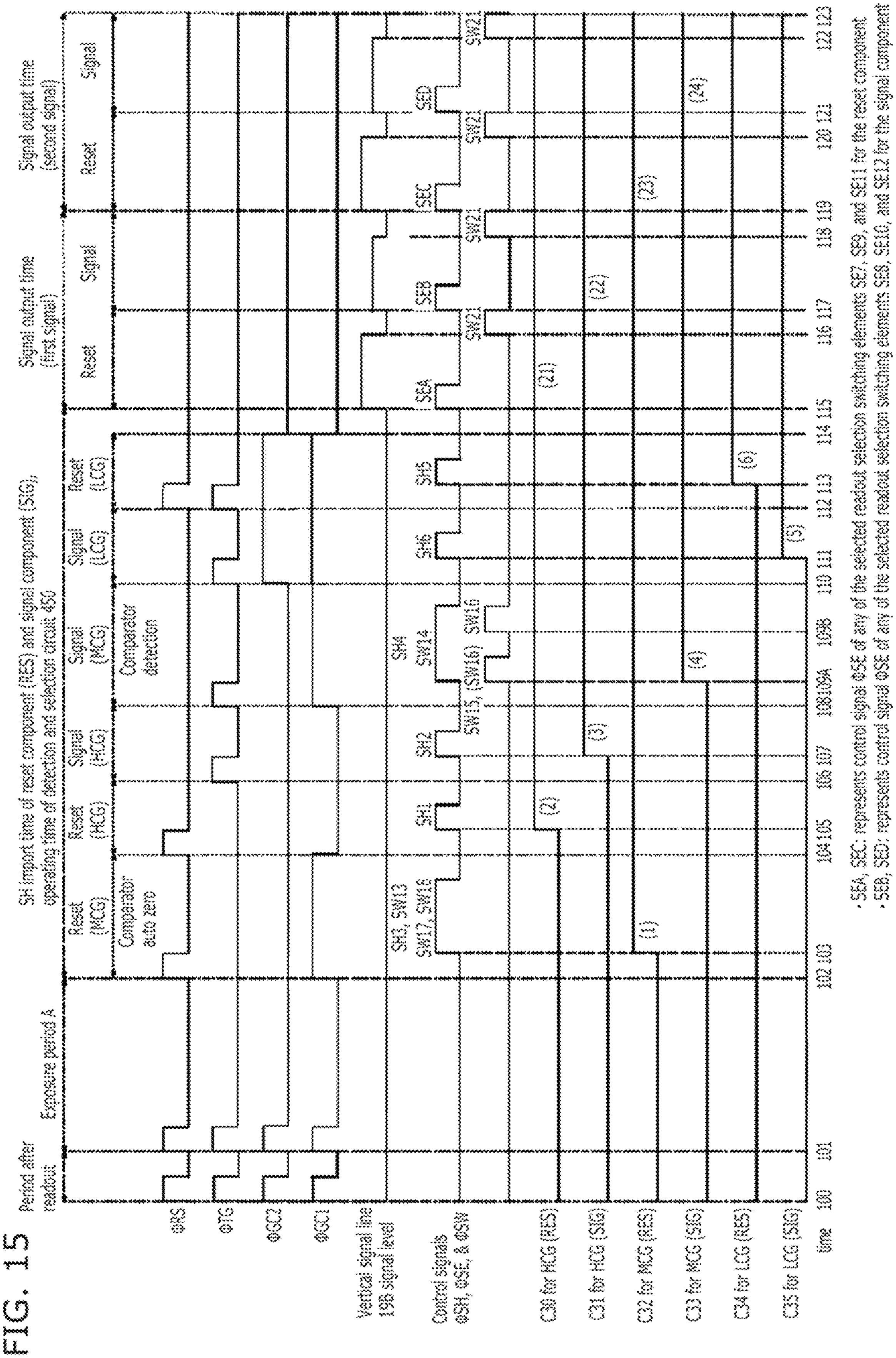
FIG. 15 illustrates readout timing from a pixel circuit to sample and hold circuit SH412 and readout timing from sample and hold circuit SH412 according to Embodiment 1.

With reference to FIG. 15, an example of the timing of signal readout operations when a plurality of pixel signals are read out using the rolling shutter method row by row of the lateral OFD pixel circuits 3*a* illustrated in FIG. 2 and at least one pixel signal is selected by selection circuit 400 in detection and selection circuit 450 illustrated in FIG. 6A and FIG. 7. Although two pixel signals (times t115 to t119 and times t119 to t123) are selected in the example illustrated in FIG. 15, only one pixel signal may be selected.

First, photodiode PD, FD0, GC1, and GC2 are reset at time t100, and the process waits for the exposure to start. Then, at time t101, the shutter operates to start the exposure. The exposure time ends at time t102.

Next, (1) at time t102, RS and GC1 are turned on and FD0 is reset to enter the readout period for the MCG reset component. Here, auto-zeroing (SW0, SH3, SW13, SW17, and SW18 are on) is implemented while the reset components from pixel circuit 3 are directly input. Next, (2) at time t104, GC1 is turned off, and the HCG reset component readout period begins. Next, (3) at time t106, TG is turned on and the signal charge stored in the photodiode is transferred to FD0 by the transfer signal (TG), and the HCG signal component (Q0) readout period begins. Next, (4) at time t108, TG and GC1 are turned on and the signal charge that overflows at FD0 is transferred to storage capacitive element C1 by GC1, and the MCG signal component (Q0+Q1) readout period begins. Here, the MCG signal component from pixel circuit 3 is directly input to one of input terminals of each of comparator 411 and comparator 419 (SW0, SH4, and SW14 are on), and simultaneously, reference value (REF1) and reference value (REF2) are input to the other of input terminals of each of comparator 411 and comparator 419 (SW15 and SW16 are on). In first detection circuit 401, the inputs are temporally simultaneously input to the plurality of comparators 411 and 419 and compared (time t109A), or in second detection circuit 402, the inputs are temporally consecutively input to the single comparator 421 (times t109A and t1098). Next, (5) at time t110, TG, GC1, and GC2 are turned on and the charge in storage capacitive element C2 is transferred to FD0 by GC2, and the LCG signal component (Q0+Q1+Q2) readout period begins. Next, (6) at time t112, RS, GC1, and GC2 are turned on, and the LCG reset component readout period begins.

Thus, at each of times t103, t105, t107, t109, t111, and t113, by turning on control signal φSH of the sample and hold switching elements (SH3, SH1, SH2, SH4, SH6, and SH5), the sample and hold capacitive elements (C32, C30, C31, C33, C35, and C34) are connected to vertical signal line 30A. As a result, the output signal of pixel circuit 3*a* is held in the sample and hold capacitive elements (C32, C30, C31, C33, C35, and C34).

Here, readout selection switching element φSE is always off.

The comparison result is then latched and sent via selection control circuit 410 to selection circuit 400, which selects one or two signals from the plurality of pixel signals (three signals in this example).

Note that after (6) described above, processing may switch to operations performed by detection and selection circuit 450. The description and timing of the operations is as described in the First Detection Circuit Configuration Example section for first detection circuit 401, and in the Second Detection Circuit Configuration Example section for second detection circuit 402.

Next, the signal readout from sample and hold circuit SH412 will be described. Here, SEA and SEC represent one of readout selection switching element control signals φSE selected from SE7, SE9, and SE11 for the reset component. SEB and SED represent one of readout selection switching element control signals φSE selected from SE8, SE10, and SE12 for the signal component. With this, sample and hold capacitive elements C30, C32, and C34 for the reset component are selected by readout selection switching element control signal φSE. Similarly, sample and hold capacitive elements C31, C33, and C35 for the signal component are selected by readout selection switching element control signal φSE.

Although two pixel signals are selected in this example, if one pixel signal is selected, the process is completed at time t119, and processes from t119 to t123 are omitted.

First, the reset component held in the sample and hold capacitive element of the first signal among the pixel signals selected by turning on control signal φSE of readout selection switching element SEA at (21) time t115 is read out and transferred via amplification transistor SF30, and the signal component held in the sample and hold capacitive element of the first signal among the pixel signals selected by turning on control signal φSE of readout selection switching element SEB at (22) time t117 is read out and transferred via amplification transistor SF30.

Next, the reset component held in the sample and hold capacitive element of the second signal among the pixel signals selected by turning on control signal φSE of readout selection switching element SEC at (23) time t119 is read out and transferred via amplification transistor SF30, and the signal component held in the sample and hold capacitive element of the second signal among the pixel signals selected by turning on control signal φSE of readout selection switching element SED at (24) time t121 is read out and transferred via amplification transistor SF30.

Here, at times t116, t118, t120, and t122, the charge accumulated in the parasitic capacitance at the gate of amplification transistor SF30 may be discharged by switching element SW21.

With respect to the order in which signals are read out from the sample and hold capacitive elements, there is no particular order in which each gain is read out, and any order is acceptable. Preferably, since CDS is performed, the reset component and then signal component should be read out in this order per gain.

Note that one pixel signal among the plurality of pixel signals here means either HCG, MCG, or LCG. Two pixel signals means HCG and MCG or MCG and LCG.

The variations are canceled since the reset component is subtracted from the signal component by the CDS of the AD conversion circuit.

With this, by implementing auto-zeroing and analog CDS, the pixel signal level can be compared and judged after canceling the variation of the sample and hold capacitive element (C). Thus, in this timing chart, at least one signal is detected during the period when the reset and signal components of the MCG from pixel circuit 3 are being read out, and the reading and detection are processed simultaneously to increase speed. Since the pixel signals of pixel circuit 3 are used directly in the comparison instead of using the signals held in sample and hold circuit SH412, the comparison can be performed with high accuracy without the influence of noise generated by turning on and off switching elements, etc. In addition, the LCG capacity can be reduced, thus reducing layout surface area. When the comparison is divided temporally, the layout surface area can be further reduced because there is only one comparator 421.

Timing Chart Description (Blend Mode)

As described in the Mixing (Blending) at WDR Boundaries section above, when implementing a wide dynamic range function (WDR function), it is possible to mix (blend) HCG and MCG at the boundary between HCG and MCG and mix (blend) MCG and LCG at the boundary between MCG and LCG to mitigate changes in the S/N.

An example of the timing of the signal readout operation will be given with reference to FIG. 15.

Processes between times t100 and t115 in FIG. 15 are the same as described in the Timing Chart Description (RS) section above, so repeated description here will be omitted.

Next, the signal readout from sample and hold circuit SH412 will be described. Here, SEA and SEC represent one of readout selection switching element control signals φSE selected from SE7, SE9, and SE11 for the reset component. SEB and SED represent one of readout selection switching element control signals φSE selected from SE8, SE10, and SE12 for the signal component. With this, sample and hold capacitive elements C30, C32, and C34 for the reset component are selected by readout selection switching element control signal φSE. Similarly, sample and hold capacitive elements C31, C33, and C35 for the signal component are selected by readout selection switching element control signal φSE.

Although two signals are selected in this sample, one signal is selected when implementing the mixing (blending), so processing ends at time t119, and processes from time t119 to t123 are omitted.

This is because when HCG and MCG are mixed (blended), one mixed signal is selected; when MCG and LCG are mixed (blended), one mixed signal is selected, and when LCG is selected, it is not mixed and is one signal.

First, (21) based on the composition ratio determined at time t115, mixing (blending) is performed by turning on control signal φSE of readout selection switching element SEA, and the reset component held in the sample and hold capacitive element of the first signal of the selected pixel signals is read out and transferred through amplification transistor SF30. Next, (22) based on the composition ratio determined at time t117, mixing (blending) is performed by turning on control signal φSE of readout selection switching element SEB, and the signal component held in the sample and hold capacitive element of the first signal of the selected pixel signals is read out and transferred through amplification transistor SF30.

Timing Chart Description (GS)

Figure 16:
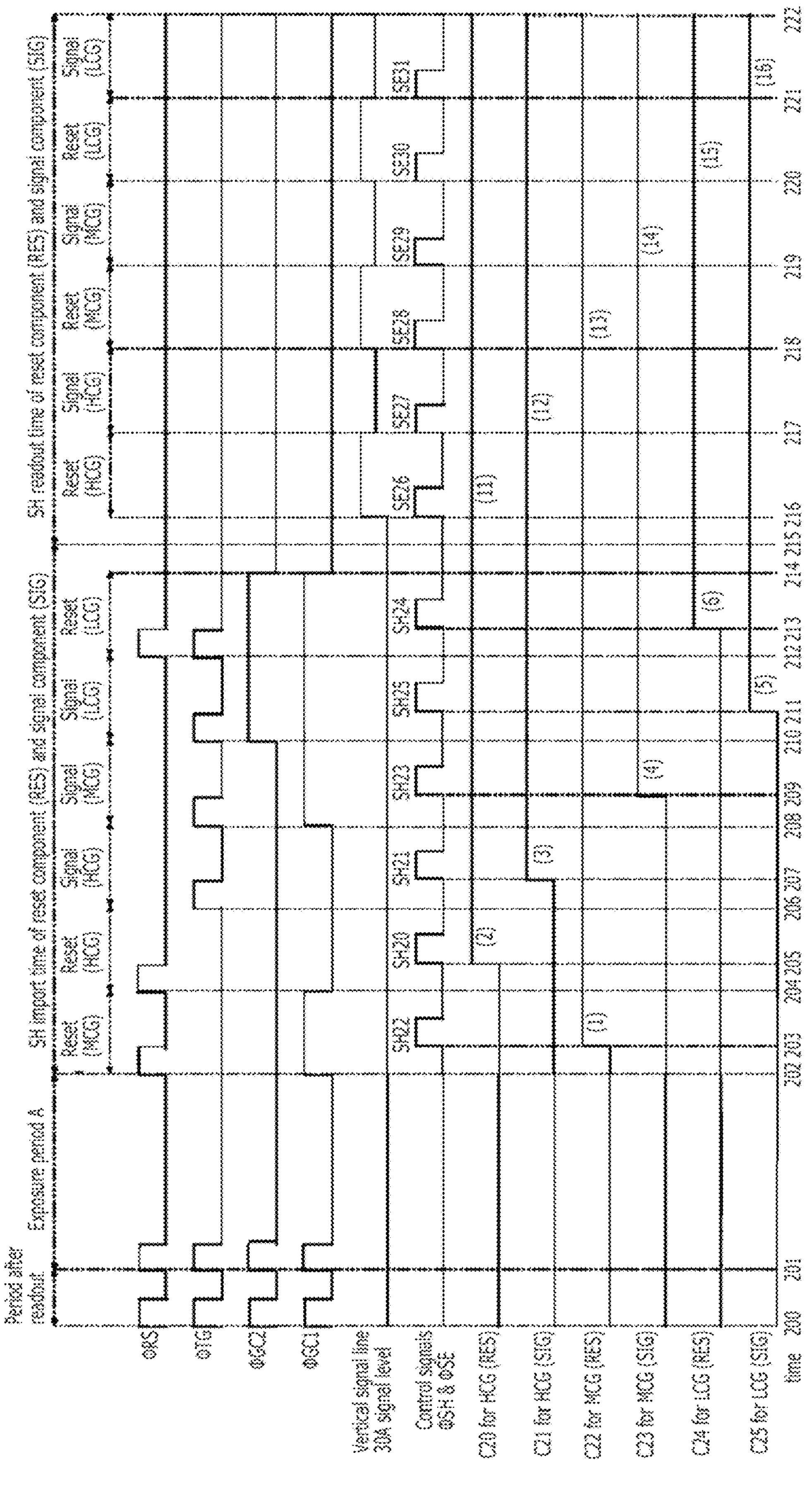
FIG. 16 illustrates readout timing from a pixel circuit to sample and hold circuit SH10 according to Embodiment 1.
Figure 17:
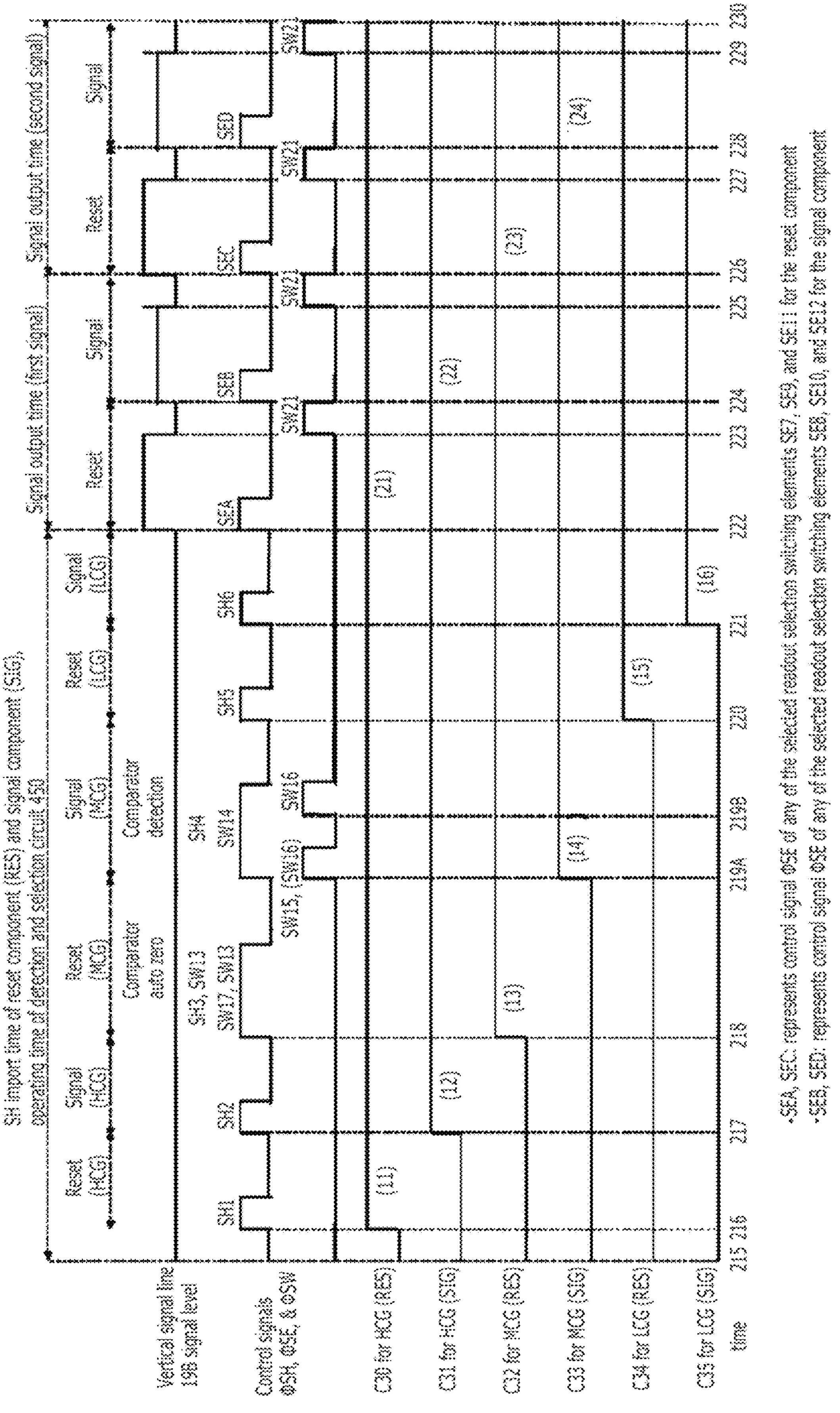
FIG. 17 is a continuation of the timing illustrated in FIG. 16, and illustrates readout timing from sample and hold circuit SH10 to sample and hold circuit SH412 and readout timing from sample and hold circuit SH412 according to Embodiment 1.

With reference to FIG. 16 and FIG. 17, an example of the timing of signal readout operations when, first, a plurality of pixel signals from pixel circuit 3*a* are read out to sample and hold circuit SH10 using the global shutter method for simultaneous readout of all pixels, or read out using the rolling shutter method for row by row readout, and then are read out from sample and hold circuit SH10 row by row using the rolling shutter method for a configuration including the lateral OFD pixel circuits 3*a* illustrated in FIG. 3 and sample and hold circuits SH10 provided one to one in a stacked arrangement, and at least one signal is selected by detection and selection circuit 450 illustrated in FIG. 6A and FIG. 7. Here, two signals are selected in FIG. 16 and FIG. 17 (at times t222 through t226 and times t226 through t230), but one signal may be selected.

Here, times t215 through t222 correspond to the same timing in FIG. 16 and FIG. 17.

First, photodiode PD, FD0, GC1, and GC2 are reset at time t200, and the process waits for the exposure to start. Then, at time t201, the shutter operates to start the exposure. The exposure time ends at time t102.

Next, (1) at time t202, RS and GC1 are turned on and FD0 is reset to enter the readout period for the MCG reset component. Next, (2) at time t204, GC1 is turned off, and the HCG reset component readout period begins. Next, (3) at time t206, TG is turned on and the signal charge stored in the photodiode is transferred to FD0 by the transfer signal (TG), and the HCG signal component (Q0) readout period begins. Next, (4) at time t208, TG and GC1 are turned on and the signal charge that overflows at FD0 is transferred to storage capacitive element C1 by GC1, and the MCG signal component (Q0+Q1) readout period begins. Next, (5) at time t210, TG, GC1, and GC2 are turned on and the charge in storage capacitive element C2 is transferred to FD0 by GC2, and the LCG signal component (Q0+Q1+Q2) readout period begins. Next, (6) at time t212, RS, GC1, and GC2 are turned on, and the LCG reset component readout period begins.

Thus, at each of times t203, t205, t207, t209, t211, and t213, the sample and hold capacitive elements (C22, C20, C21, C23, C25, and C24) are connected to vertical signal line 30B by turning on control signal φSH of the sample and hold switching elements (SH22, SH20, SH21, SH23, SH25, and SH24) of sample and hold circuit SH10. As a result, the output signal of pixel circuit 3*a* is held in the sample and hold capacitive elements (C22, C20, C21, C23, C25, and C24).

Here, readout selection switching element φSE is always off.

Next, the signal readout from sample and hold circuit SH10 will be described. Here, by turning selection control line φSEL_GS on, the output of amplification transistor SF2 is connected to vertical signal line 30A via selection transistor SEL_GS.

First, the reset component (sample and hold capacitive element C30) of the selected HCG pixel signal is read out and transferred via amplification transistor SF2 by turning control signal φSE of readout selection switching element SE26 on at (11) time t216. The signal component (sample and hold capacitive element C31) of the selected HCG pixel signal is read out and transferred via amplification transistor SF2 by turning control signal φSE of readout selection switching element SE27 on at (12) time t217.

Next, the reset component (sample and hold capacitive element C32) of the MCG pixel signal is read out and transferred via amplification transistor SF2 by turning control signal φSE of readout selection switching element SE28 on at (13) time t218. Here, auto-zeroing (SW0, SH3, SW13, SW17, and SW18 are on) is implemented while the reset components from pixel circuit 3 are directly input. The signal component (sample and hold capacitive element C33) of the MCG pixel signal is read out and transferred via amplification transistor SF2 by turning control signal φSE of readout selection switching element SE29 on at (14) time t219. Here, the MCG signal component from pixel circuit 3 is directly input to one of input terminals of each of comparator 411 and comparator 419 (SW0, SH4, and SW14 are on), and simultaneously, reference value (REF1) and reference value (REF2) are input to the other of input terminals of each of comparator 411 and comparator 419 (SW15 and SW16 are on). In first detection circuit 401, the inputs are temporally simultaneously input to the plurality of comparators 411 and 419 and compared (time t219A), or in second detection circuit 402, the inputs are temporally consecutively input to the single comparator 421 (times t219A and t219B).

Next, the reset component (sample and hold capacitive element C34) of the MCG pixel signal is read out and transferred via amplification transistor SF30 by turning control signal φSE of readout selection switching element SE30 on at (15) time t220, and the signal component (sample and hold capacitive element C35) of the MCG pixel signal is read out and transferred via amplification transistor SF2 by turning control signal φSE of readout selection switching element SE31 on at (16) time t221.

Stated differently, the sample and hold capacitive elements (C30, C31, C32, C33, C34, and C35) are connected to vertical signal line 30A by turning control signals φSH of sample and hold switching elements (SH20, SH31, SH32, SH33, SH34, and SH35) of sample and hold circuit SH412 on at the same time as each of times t216, t217, t218, t219, t220, and t221 when readout selection switching element control signal φSE of the above sample and hold circuit SH10 is turned on. As a result, the output signal of sample and hold circuit SH10 is held in the sample and hold capacitive elements (C30, C31, C32, C33, C34, and C35).

Here, readout selection switching element φSE is always off.

Here, in this timing chart, at least one signal is detected during the period when the reset and signal components of the MCG from pixel circuit 3 are being read out, and the reading and detection are processed simultaneously to increase speed. The comparison result is then latched and sent via selection control circuit 410 to selection circuit 400, which selects one or two signals from the plurality of pixel signals (three signals in this example).

Note that after (16) described above, processing may switch to operations performed by detection and selection circuit 450, without performing both the readout and detection at the same time. The description and timing of the operations is as described in the First Detection Circuit Configuration Example section for first detection circuit 401, and in the Second Detection Circuit Configuration Example section for second detection circuit 402.

Next, the signal readout from sample and hold circuit SH412 will be described. Since this is the same as described in the Timing Chart Description 1 section, repeated description here will be omitted.

Timing Chart Description (Advantages of Embodiment 1)

An example of the timing of the signal readout operation by detection and selection circuit 450 according to Embodiment 1 will be described below. Here, the timing when selecting one signal from a plurality of pixel signals will be described.

Figure 18:
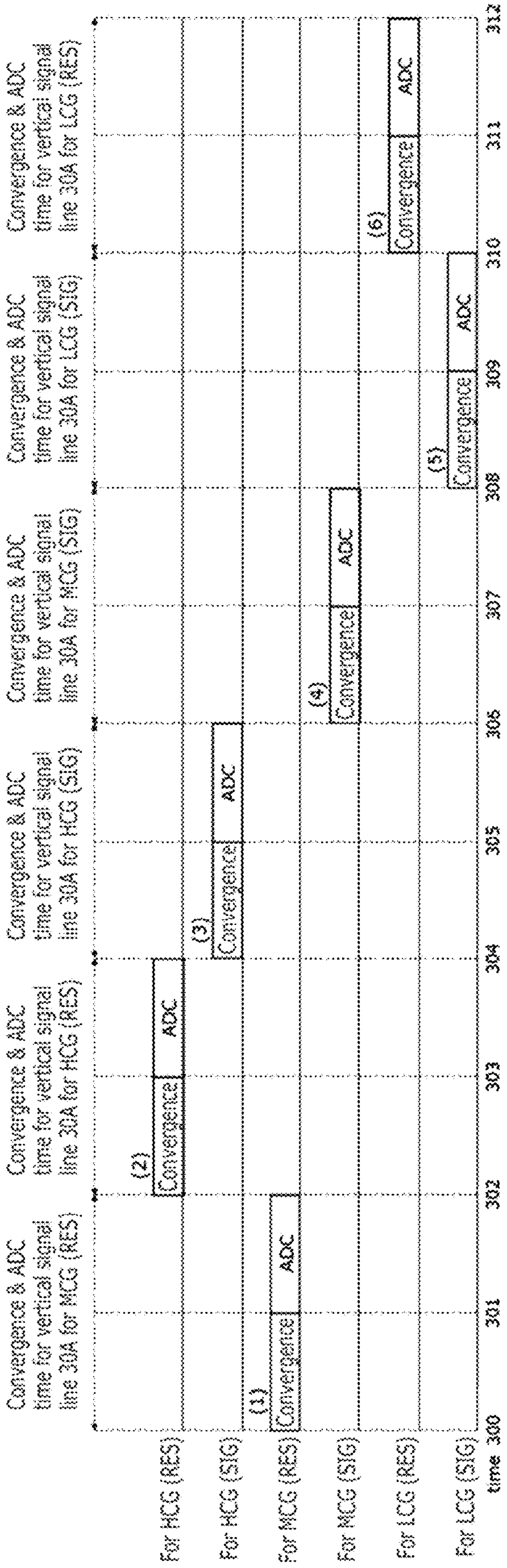
FIG. 18 PRIOR ART
FIG. 18 illustrates vertical signal line and ADC timing according to a conventional example.

(i) An example of the timing of signal readout operation in a conventional example (estimated from PTL 1) is illustrated in FIG. 18. Specifically, FIG. 18 illustrates the convergence time of vertical signal line 30A and the processing time of AD conversion circuit 26. This is, as an example, the readout timing of signals from pixel circuit 3*a* using the rolling shutter method, and the basic concept is the same for readout timing of signals from sample and hold circuit SH10 using the global shutter method; only the reading order from the sample and hold capacitive element is changed, and the basic concept remains the same.

First, for the reset component of MCG, the convergence time of vertical signal line 30A takes from time t300 to t301, then the processing time of column AD circuit 25 takes from time t301 to t302.

Next, for the reset component of HCG, the convergence time of vertical signal line 30A takes from time t302 to t303, then the processing time of column AD circuit 25 takes from time t303 to t304.

Next, for the signal component of HCG, the convergence time of vertical signal line 30A takes from time t304 to t305, and then the processing time of column AD circuit 25 takes from time t305 to t306.

Next, for the signal component of MCG, the convergence time of vertical signal line 30A takes from time t306 to t307, and then the processing time of column AD circuit 25 takes from time t307 to t308.

Next, for the signal component of LCG, the convergence time of vertical signal line 30A takes from time t308 to t309, and then the processing time of column AD circuit 25 takes from time t309 to t310.

Next, for the reset component of LCG, the convergence time of vertical signal line 30A takes from time t310 to t311, then the processing time of column AD circuit 25 takes from time t311 to t312.

Figure 19:
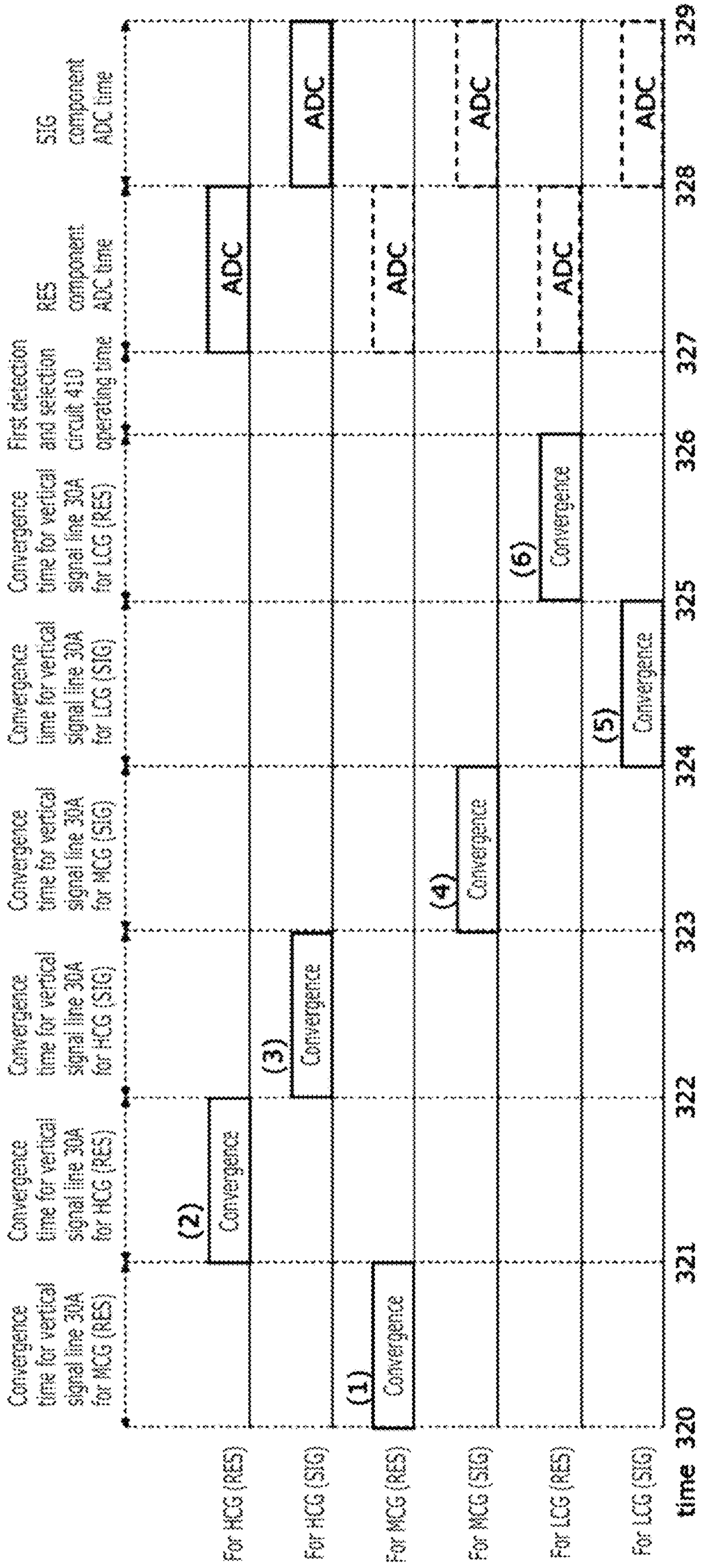
FIG. 19 illustrates vertical signal line and ADC timing according to Embodiment 1.

(ii) An example of the timing of signal readout operation according to Embodiment 1 is illustrated in FIG. 19. Specifically, FIG. 19 illustrates the convergence time of vertical signal line 30A and the processing time of AD conversion circuit 26.

First, for the reset component of MCG, the convergence time of vertical signal line 30A takes from time t320 to t321, and the pixel signal is held in sample and hold circuit SH412.

Next, for the reset component of HCG, the convergence time of vertical signal line 30A takes from time t321 to t322, and the pixel signal is held in sample and hold circuit SH412.

Next, for the signal component of HCG, the convergence time of vertical signal line 30A takes from time t322 to t323, and the pixel signal is held in sample and hold circuit SH412.

Next, for the signal component of MCG, the convergence time of vertical signal line 30A takes from time t323 to t324, and the pixel signal is held in sample and hold circuit SH412.

Next, for the signal component of LCG, the convergence time of vertical signal line 30A takes from time t324 to t325, and the pixel signal is held in sample and hold circuit SH412.

Next, for the reset component of LCG, the convergence time of vertical signal line 30A takes from time t325 to t326, and the pixel signal is held in sample and hold circuit SH412.

Next, the operation time for selecting one signal from a plurality of pixel signals by detection and selection circuit 450 takes from time t326 to t327.

Next, for the reset component of this one selected signal, the processing time of column AD circuit 25 takes from time t327 to t328.

Next, for the signal component of this one selected signal, the processing time of column AD circuit 25 takes from time t328 to t329.

Here, convergence time and ADC time when the HCG signal is selected are shown as solid lines for clarity, and convergence time and ADC time when MCG or LCG is selected are shown as dashed lines.

With this, detection and selection circuit 450 is arranged in a stage before AD conversion circuit 26 and reads one signal from the three signals without redundant reading of all the signals. Therefore, although the instances of convergence time of vertical signal line 30A remains the same, increased speed and reduced power are achieved in analog and digital processing in a subsequent stage including AD conversion circuit 26. For example, if three signals become one signal, the speed is increased by a factor of three and the power is reduced to ⅓. Here, six is reduced to two since because there are both reset and signal components.

OB Clamping Implementation Example

Next, OB clamping will be described with reference to FIG. and FIG. 21.

Pixel array 1 includes OB area 6 and effective area 7. The same pixel circuits 3 as in light-shielded effective area 7 are disposed in OB area 6. In Embodiment 1 or Embodiment 2 as well, the plurality of pixel signals of OB area 6 are input to detection and selection circuit 450.

Here, in the OB area, the signal level is low and the HCG gain is always selected. Accordingly, with respect to the plurality of pixel signals of OB area 6, it is necessary to fix and select signals for HCG, MCG, and LCG for each region in advance.

The signals for HCG, MCG, and LCG in OB area 6 are then used to OB clamp the signals for HCG, MCG, and LCG of effective area 7.

Figure 20:
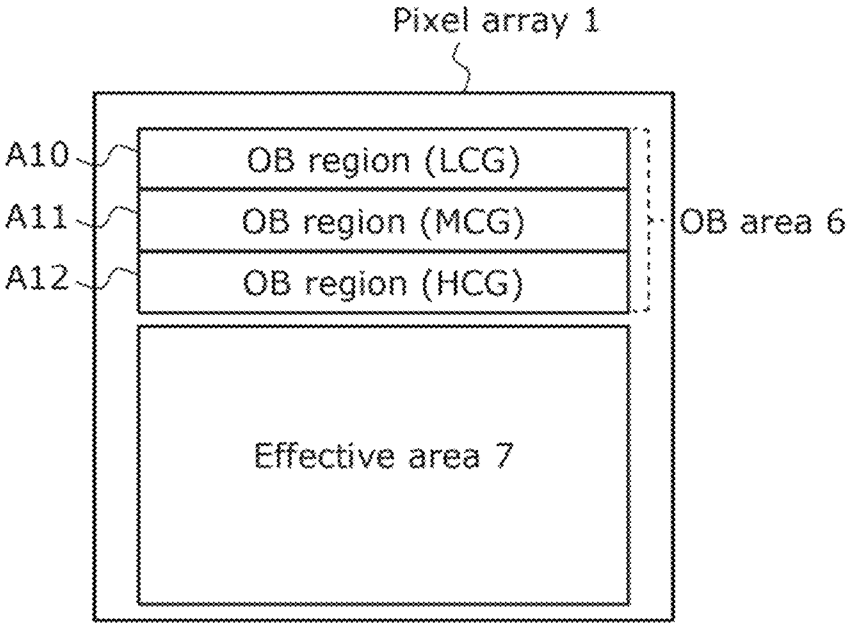
FIG. 20 illustrates an effective area and an OB area in a pixel array.

In FIG. 20, the plurality of pixel signals of effective area 7 are OB clamped using the pixel signals of sample and hold circuit SH412 corresponding to LCG signals (A10), MCG signals (A11), and HCG signals (A12) divided into a vertical arrangement in OB area 6.

Figure 21:
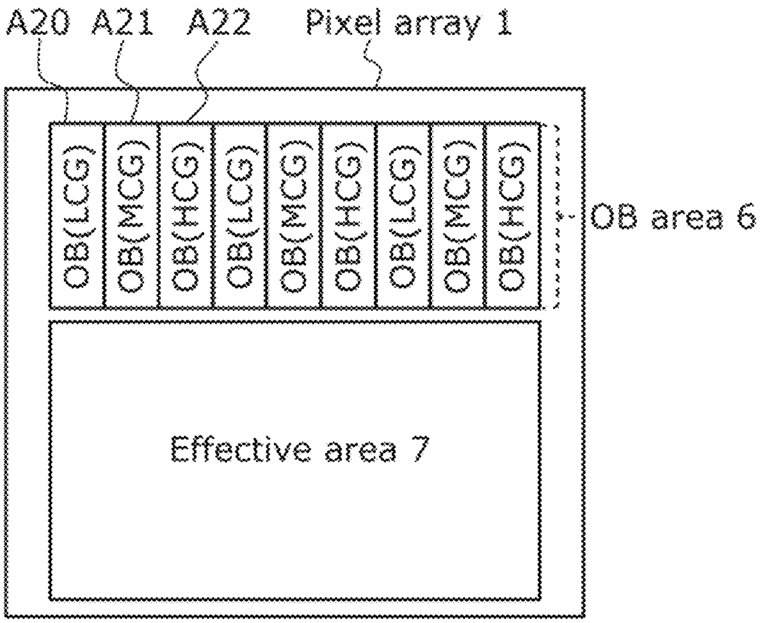
FIG. 21 illustrates an effective area and an OB area in a pixel array.

In FIG. 21, the plurality of pixel signals of effective area 7 are OB clamped using the pixel signals of sample and hold circuit SH412 corresponding to LCG signals (A20), MCG signals (A21), and HCG signals (A22) divided into a horizontal arrangement in OB area 6.

With this, the OB clamp can cancel the fixed component that is dependent on the layout and drive of sample and hold circuit SH412.

Configuration Example of Stacked Structure BSI of Pixel Circuit and Detection and Selection Circuit Next, a configuration example of a stacked structure BSI of the pixel circuit and the detection and selection circuit according to Embodiment 1 and Embodiment 2 will be described.

FIG. 1, FIG. 22, FIG. 23A, FIG. 23B, FIG. 24A, and FIG. 24B illustrate examples of the solid-state imaging apparatus according to Embodiment 1 configured as a stacked-structure back-side illumination image sensor. The solid-state imaging apparatus in these figures includes a first semiconductor chip and a second semiconductor chip that are bonded together or a plurality of semiconductor chips. The first semiconductor chip and the second semiconductor chip are bonded to each other on their respective wiring-layer-side surfaces. In these figures, "Pix" indicates pixel circuit 3, and "SH" indicates sample and hold circuit SH10.

The first semiconductor chip is labeled as the pixel chip in these figures, and includes the main part of solid-state imaging apparatus 100 as a back-side illumination CMOS image sensor. This first semiconductor chip includes photodiode PD of each pixel circuit 3.

The second semiconductor chip is labeled as logic chip A or logic chip B in these figures, and includes the main analog and logic circuits, such as signal processor 70, for example. This second semiconductor chip can include the column detection and selection circuit and sample and hold circuit SH10.

In solid-state imaging apparatus 100 configured in such a manner, pixel circuit 3 can be mounted on the pixel chip as a stacked structure BSI type CIS, and column detection and selection circuit 27 described above can be mounted on the logic chip. Stated differently, a PD can be provided per pixel circuit 3 on the pixel chip and column detection and selection circuit 27 can be configured on the logic chip, and the pixel signals can be read directly to column detection and selection circuit 27. With this, the logic chip includes only analog and logic circuits, which are easy to integrate and reduce layout surface area. Furthermore, at least one optimal signal is selected from among the plurality of pixel signals from pixel array 1 by column detection and selection circuit 27. This reduces the number of pixel signals to be converged in vertical signal line 30A and the number of pixel signals to be AD converted, which in turn reduces the convergence time and the time and power required for signal processing, resulting in increased speed and reduced power. Specifically, the pixel chip and the logic chip may include connection points A and B illustrated in FIG. 10 and FIG. 11.

Figure 22:
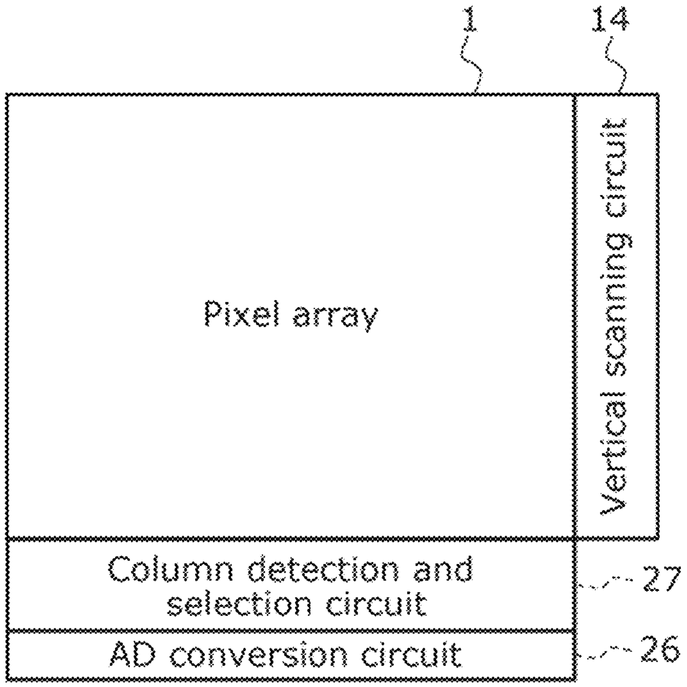
FIG. 22 is a block diagram of a configuration example of a pixel array and a column detection and selection circuit according to Embodiment 1.

FIG. 1 and FIG. 22 each illustrate an example of the solid-state imaging apparatus according to Embodiment 1 configured as an image sensor (not a stacked-structure image sensor). In this case, pixel array 1, column detection and selection circuit 27, and AD conversion circuit 26 are mounted without being stacked. At least one optimal signal is selected from among the plurality of pixel signals from pixel array 1 by column detection and selection circuit 27 and AD converted by AD conversion circuit 26. This reduces the time and power required for signal processing because the number of pixel signals to be AD converted is reduced, resulting in increased speed and reduced power, without having to utilize a stacked structure.

Figure 23A:
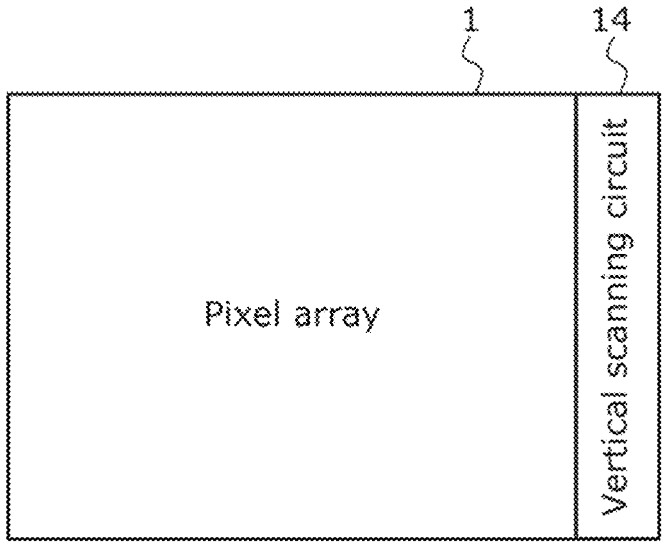
FIG. 23A is a block diagram of a configuration example of a pixel array according to Embodiment 1.
Figure 23B:
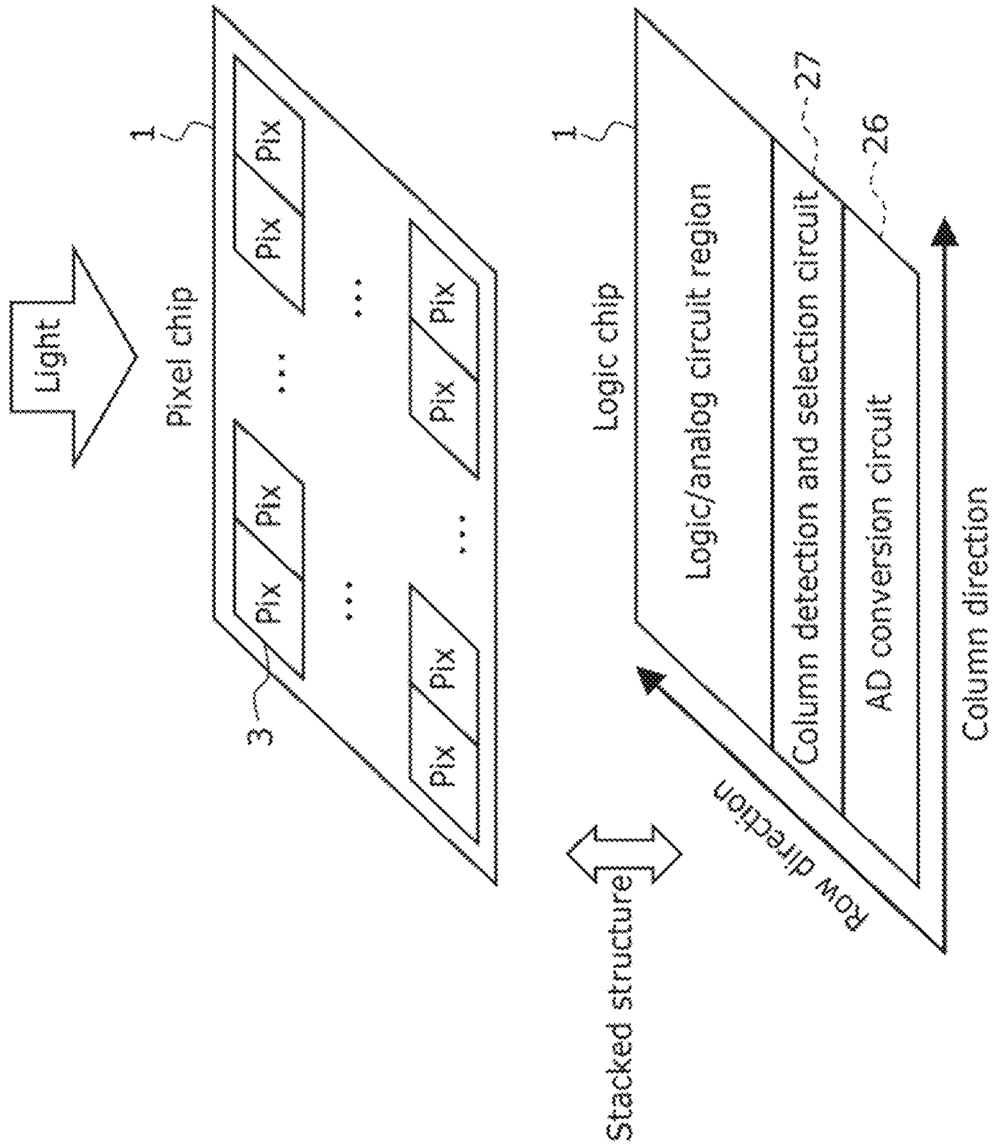
FIG. 23B is a diagram illustrating a configuration example of a solid-state imaging apparatus according to Embodiment 1 as a stacked-structure image sensor.

FIG. 1, FIG. 23A, and FIG. 23B illustrate examples of the solid-state imaging apparatus according to Embodiment 1 configured as a stacked-structure back-side illumination image sensor. This is a stacked structure BSI type CIS, with each pixel circuit 3 provided on the pixel chip and column detection and selection circuit 27 and AD conversion circuit 26 provided on the logic chip. The logic chip includes only analog and logic circuits, which are easy to integrate and reduce layout surface area. At least one optimal signal is selected from among the plurality of pixel signals from pixel array 1 by column detection and selection circuit 27 and AD converted by AD conversion circuit 26. This reduces the time and power required for signal processing because the number of pixel signals to be AD converted is reduced, resulting in increased speed and reduced power.

Figure 24A:
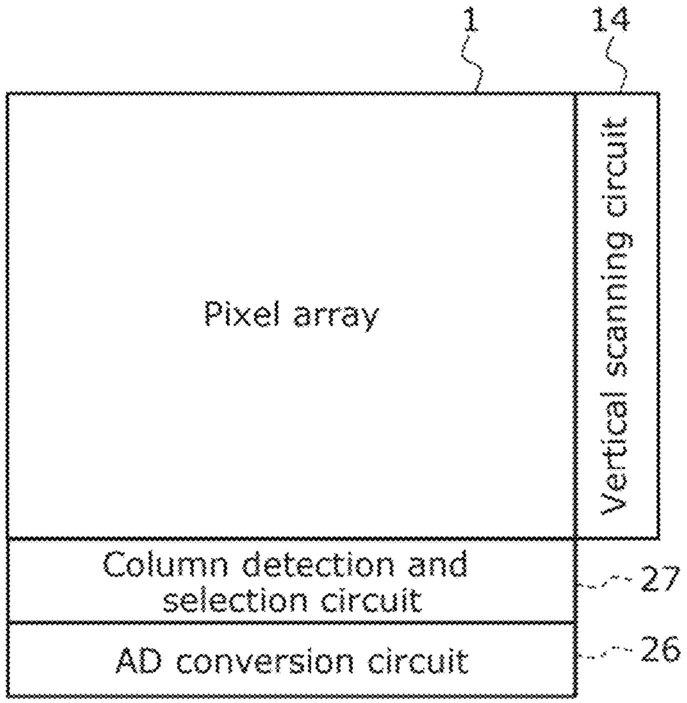
FIG. 24A is a block diagram of a configuration example of a pixel array and a column detection and selection circuit according to Embodiment 1.
Figure 24B:
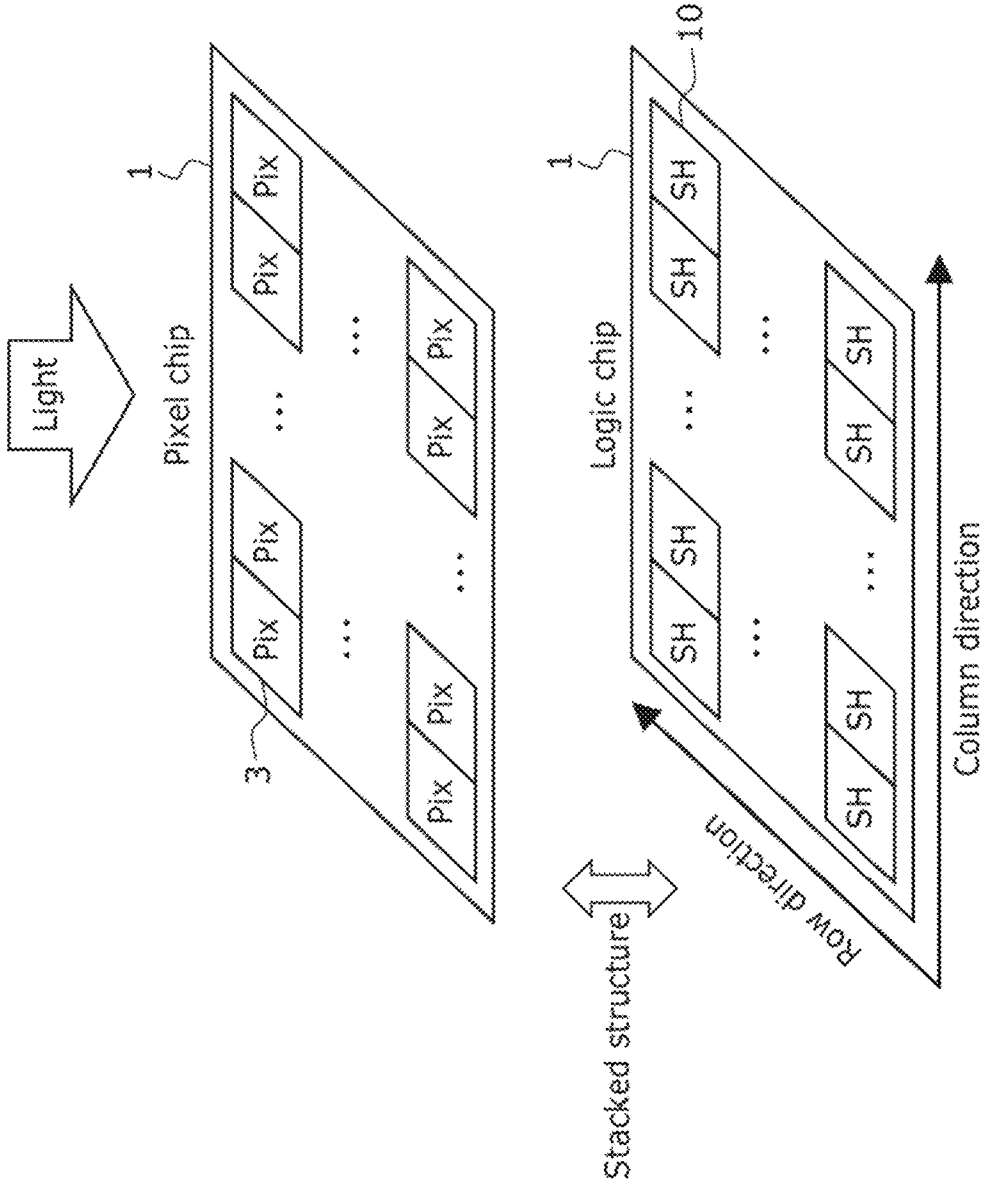
FIG. 24B is a diagram illustrating a configuration example of a solid-state imaging apparatus according to Embodiment 1 as a stacked-structure image sensor.

FIG. 1, FIG. 24A, and FIG. 24B illustrate examples of the solid-state imaging apparatus according to Embodiment 1 configured as a stacked-structure back-side illumination image sensor. This is a stacked structure BSI type CIS, with each pixel provided on the pixel chip and global-shutter sample and hold circuits SH10 respectively corresponding to pixel circuits 3 provided on the logic chip. Column detection and selection circuit 27 and AD conversion circuit 26 are provided on the pixel chip or the logic chip. Sample and hold switching element SH and readout selection switching element SE can be configured on the logic chip per sample and hold circuit SH10, and since sample and hold circuits 10 corresponding to pixel circuits 3 are directly bonded, pixel signals can be read out to sample and hold circuits at high speed. Sample and hold capacitive element C may be divided between the pixel chip and the logic chip if the mounting surface area is limited. The plurality of pixel signals from sample and hold circuit SH10 are read out row by row using the rolling method, and at least one optimal signal is selected by column detection and selection circuit 27 and AD converted by AD conversion circuit 26. This reduces the time and power required for signal processing because the number of pixel signals to be AD converted is reduced, resulting in increased speed and reduced power.

Regarding the junction of the pixel chip and the logic chip, in FIG. 10, each vertical signal line 30A of pixel array 1 on the pixel chip is input to detection and selection circuit 450 via junction A, and the output is connected to vertical signal line 19B, which is input to column AD circuit 25.

Regarding the junction of the pixel chip and the logic chip, in FIG. 11, each vertical signal line 30A of pixel array 1 on the pixel chip is input to two detection and selection circuits 450 via junctions A and B, and the outputs are connected to vertical signal line 19B, which is input to column AD circuit 25. While first detection circuit 401 of one detection and selection circuit 450 is detecting, the selection circuit of the other detection and selection circuit 450 performs signal selection, whereby readout is performed row by row using the rolling method to achieve increased speed.

Other Comments

In sample and hold circuit SH412 illustrated in FIG. 6A, the output terminals of the sample and hold switching elements (SH1 through SH6) are connected to the respective sample and hold capacitive elements (C30 through C35) and the respective readout selection switching elements (SE7 through SE12). The output terminals of the sample and hold switching elements (SH1 through SH6) are also connected to the node of the gate of amplification transistor SF30 via the respective readout selection switching elements (SE7 through SE12). Sample and hold circuit SH412 may be configured as follows.

Figure 6C:
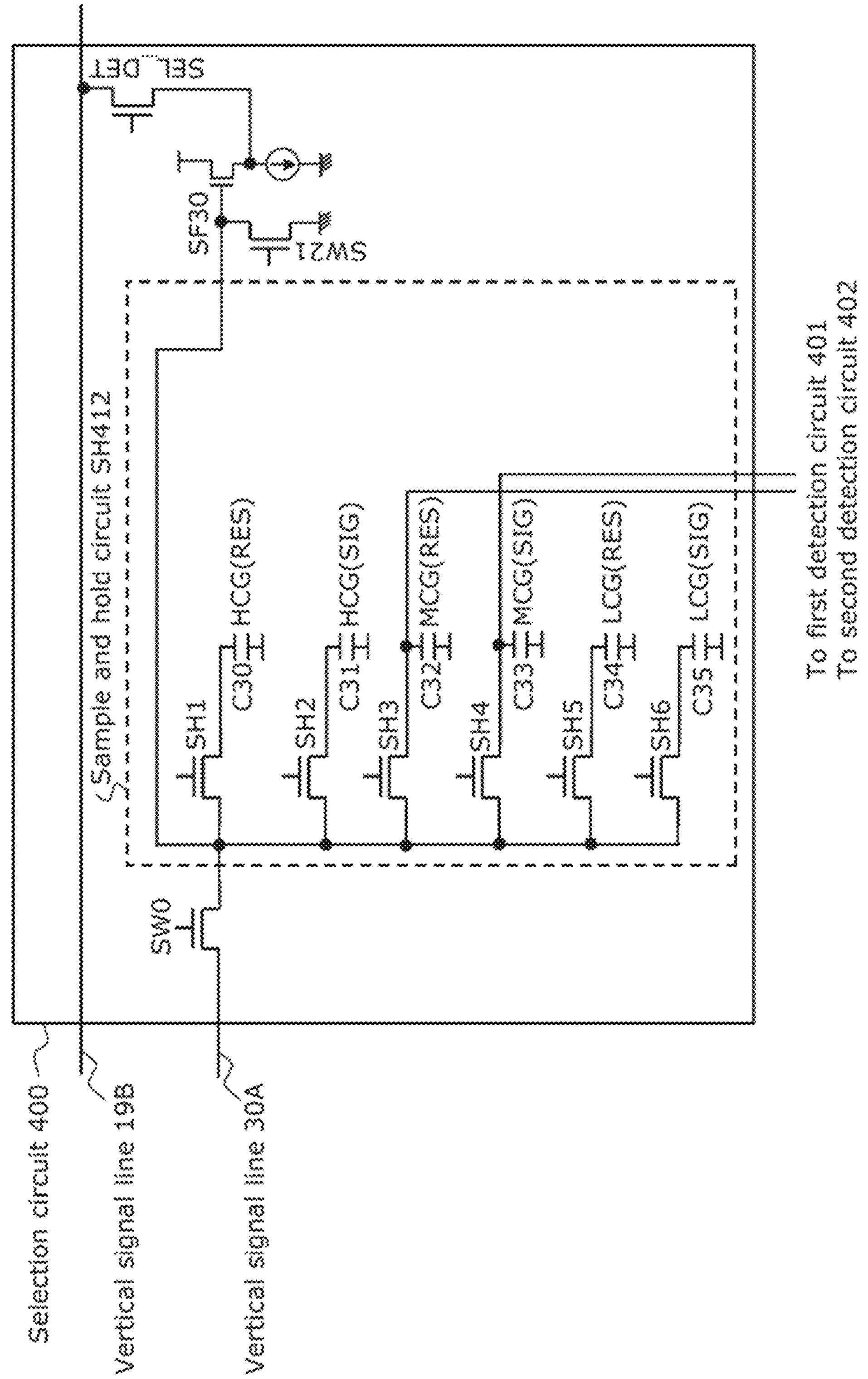
FIG. 6C illustrates a variation of a selection circuit.

As in the configuration of sample and hold circuit SH412 illustrated in FIG. 6C, the readout selection switching elements (SE7 through SE12) may be removed, the sample and hold switching elements (SH1 through SH6) may have one of their two terminals connected to the node of the gate of amplification transistor SF30 and the other of their two terminals connected to the respective sample and hold capacitive elements (C30 through C35). As a result, the sample and hold switching elements (SH1 through SH6) illustrated in FIG. 6C also serve the functions of the sample and hold switching elements (SH1 through SH6) and the readout selection switching elements (SE7 through SE12) illustrated in FIG. 6A.

In this case, in the operation and timing diagram for detection and selection circuit 450, the timing of readout selection switching element control signals φSE (SE7 through SE12) should be read as the timing of sample and hold switch control signals φSH (SH1 through SH6). When reading out the signals of the sample and hold capacitive elements (C30 through C35), switching element SW0 must be turned off. Here, the parasitic capacitance value of the wiring in the floating state is negligible compared to the capacitance values of the sample and hold capacitive elements (C30 through C35), and does not affect the holding voltage of the sample and hold capacitive elements (C30 through C35).

This configuration has the advantage of reduced surface area due to a reduced number of elements and simplified control signals due to a reduced number of control signals.

Although vertical signal line 19B is conventionally provided on the pixel chip and not susceptible to noise, in the present embodiment, it may be susceptible to noise because it passes through the analog circuitry of the logic chip. Therefore, in the logic chip, the power supply or GND wiring layer may be provided in a layer above or below the wiring layer of vertical signal line 19B to serve as an electromagnetic shield. This can achieve the same effect as an electromagnetic shield against noise from the digital and analog circuits of the logic chip, and eliminate noise superimposition on vertical signal line 19B.

Amplification transistor SF30 of detection and selection circuit 450 has device noise (thermal noise, 1/f noise, RTS noise), etc. To inhibit this noise, it is effective to make the transistor surface area (gate area) as large as possible in order to reduce device noise, and it is preferable to make the transistor surface area larger than that of amplification transistor SF1 of pixel circuit 3. This reduces device noise that generates when reading signals from selection circuit 400 through amplification transistor SF30.

Note that amplification transistor SF2 of sample and hold circuit SH10 has device noise (thermal noise, 1/f noise, RTS noise), etc. To inhibit this noise, it is more effective to make the transistor surface area as large as possible, and it is preferable to make the transistor surface area larger than amplification transistor SF1 of pixel circuit 3*a* and pixel circuit 3*b*.

Although an example of signal selection in units defined according to the color filter array is given using the typical Bayer array of four colors (R, Gr, B, and Gb), the color filters can be complementary colors, etc., and the array can be different from the four-pixel unit.

The sample and hold capacitors are MIM and MOS capacitors, which require low-leakage and high-density capacitance characteristics, and providing a light-shielding layer at the substrate contact area is preferable to inhibit parasitic sensitivity.

In pixel circuits 3*a* (lateral OFD) and 3*b* (vertical OFD) according to the present embodiment, one photodiode PD, three storage capacitive elements, and three charge storages are provided to generate three signals—HCG, MCG, and LCG—but if more of each element is provided, three or more signals can be generated and the dynamic range can be extended even further.

Note that by, for example, including a plurality of photodiodes PD with different sensitivities in pixel circuits 3*a* and 3*b* and increasing the number of storage capacitive elements, the number of pixel signals can be further increased by combining these signal charges. This increases the number of WDR frames and thus further extends the dynamic range.

To reduce power consumption, current supply I0 may be turned on only when the pixel signals of pixel circuits 3*a* and 3*b* are read out to sample and hold circuit SH10.

The technique of detection and selection circuit 450 that selects at least one pixel signal from a plurality of pixel signals can be deployed not only as a global-shutter imaging apparatus, but also as a time of flight (TOF) distance-measuring apparatus. Of course, the technique can be expanded to a rolling shutter method in addition to the global shutter method. This enables application in an imaging apparatus or distance-measuring imaging apparatus that capture images of a subject.

Embodiment 2

First, a configuration example of the solid-state imaging apparatus according to the present embodiment will be given. In Embodiment 2, in the configuration example illustrated in FIG. 29, vertical signal line 30A of pixel array 1 is divided vertically into a plurality of vertically arranged segments, each of which is provided with detection and selection circuit 450 and is arranged in a stage before column AD circuit 25.

Note that FIG. 29 illustrates an example in which pixel array 1 is mounted on a pixel chip and detection and selection circuits 450 are mounted on logic chip A or logic chip B. FIG. 29 illustrates pixel array 1 as if it were divided into a vertical arrangement, but in reality, pixel circuits 3 are arranged at a regular pitch and are not physically divided; FIG. 29 depicts a simplified representation of the electrical connections.

The following description will focus on the points of difference with Embodiment 1.

Solid-state Imaging Apparatus 100 Configuration Example

FIG. 29 is a block diagram of a configuration example of solid-state imaging apparatus 100 according to Embodiment 1.

The following description will focus on the points of difference with Embodiment 1.

Pixel array 1 includes a plurality of pixel circuits 3*a* or 3*b* arranged in a matrix. In FIG. 1, the plurality of pixel circuits 3 are arranged in n rows and m columns. However, unlike Embodiment 1, in pixel array 1, vertical signal line 30A is divided into a plurality of vertically arranged segments, which significantly reduces parasitic resistance and parasitic capacitance, and speeds up convergence time. For example, if vertical signal line 30A is divided into M vertically arranged segments, the convergence time of vertical signal line 30A is 1/M.

A plurality of detection and selection circuits 450 are arranged in the logic chip to correspond to pixel array 1 in which vertical signal line 30A is divided into vertically arranged segments as described above (and are disposed in stages before AD conversion circuit 26).

Vertical signal line 30A is provided on the pixel chip in pixel array 1. The plurality of pixel signals output from amplification transistor SF1 of pixel circuit 3*a* or 3*b* are input to detection and selection circuit 450 on the logic chip via vertical signal line 30A. At least one pixel signal is then selected from the plurality of pixel signals based on the reference values (REF1, REF2, and REF3) supplied by gain reference signal generator 40. The selected signal is then connected from amplification transistor SF30 to vertical signal line 19B via selection transistor SEL_DET. In this way, at least one pixel signal selected from the plurality of pixel signals output from pixel circuit 3*a* or 3*b* is propagated to column AD circuit 25. Here, in a conventional embodiment, vertical signal line 19B requires a plurality of instances of convergence time corresponding to the plurality of pixel signals, but in Embodiment 2, the convergence time can be significantly reduced since at least one pixel signal is selected.

Signal processor 90 includes frame memory 97 and controller 96, and includes a hysteresis function with respect to reference values (REF1, REF2, and REF3) supplied to detection and selection circuit 450 for previous and current frames. Based on gain selection signal 403 of the previous frame supplied from detection and selection circuit 450, signal processor 90 calculates a reference value for the current frame, supplies hysteresis selection signal 404 to detection and selection circuit 450, and reflects the reference value in the current frame.

Signal processor 70 calculates, by interpolation processing, an unselected pixel signal based on the selected pixel signal, and combines the selected pixel signal with the other pixel signal calculated by interpolation processing.

With this, detection and selection circuits 450 are provided in stages before AD conversion circuit 26, stacked in correspondence with pixel array 1, and perform selective reading to read out at least one pixel signal from among a plurality of pixel signals without performing redundant reading to read out all of the plurality of signals, whereby increased speed and reduced power can be achieved in analog and digital processing in a subsequent stage including AD conversion circuit 26. Furthermore, by dividing vertical signal line 30A of pixel array 1 into a plurality of vertically arranged segments, the convergence of vertical signal line 30A is improved and speed in the pixel array is increased. For example, if N pixel signals become one pixel signal, the speed in the analog and digital processes involving vertical signal line 19B is increased by a factor of N and the power is reduced to 1/N. Furthermore, the convergence of vertical signal line 30A is M times faster with M divisions into vertically arranged segments, and if the number of divisions M is increased, the convergence time of the vertical signal lines becomes almost negligible.

This allows for increased speed in all areas in the pixel array, analog processing areas, and digital processing areas. At the same time, the same dynamic range as when a plurality of pixel signals are used can be maintained.

Figure 34A:
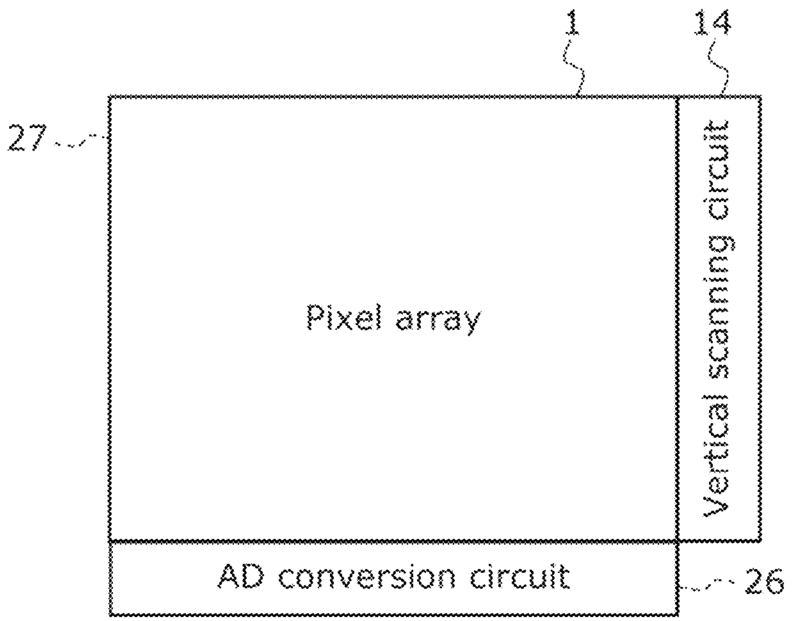
FIG. 34A is a block diagram of a configuration example of a pixel array according to Embodiment 2.
Figure 34B:
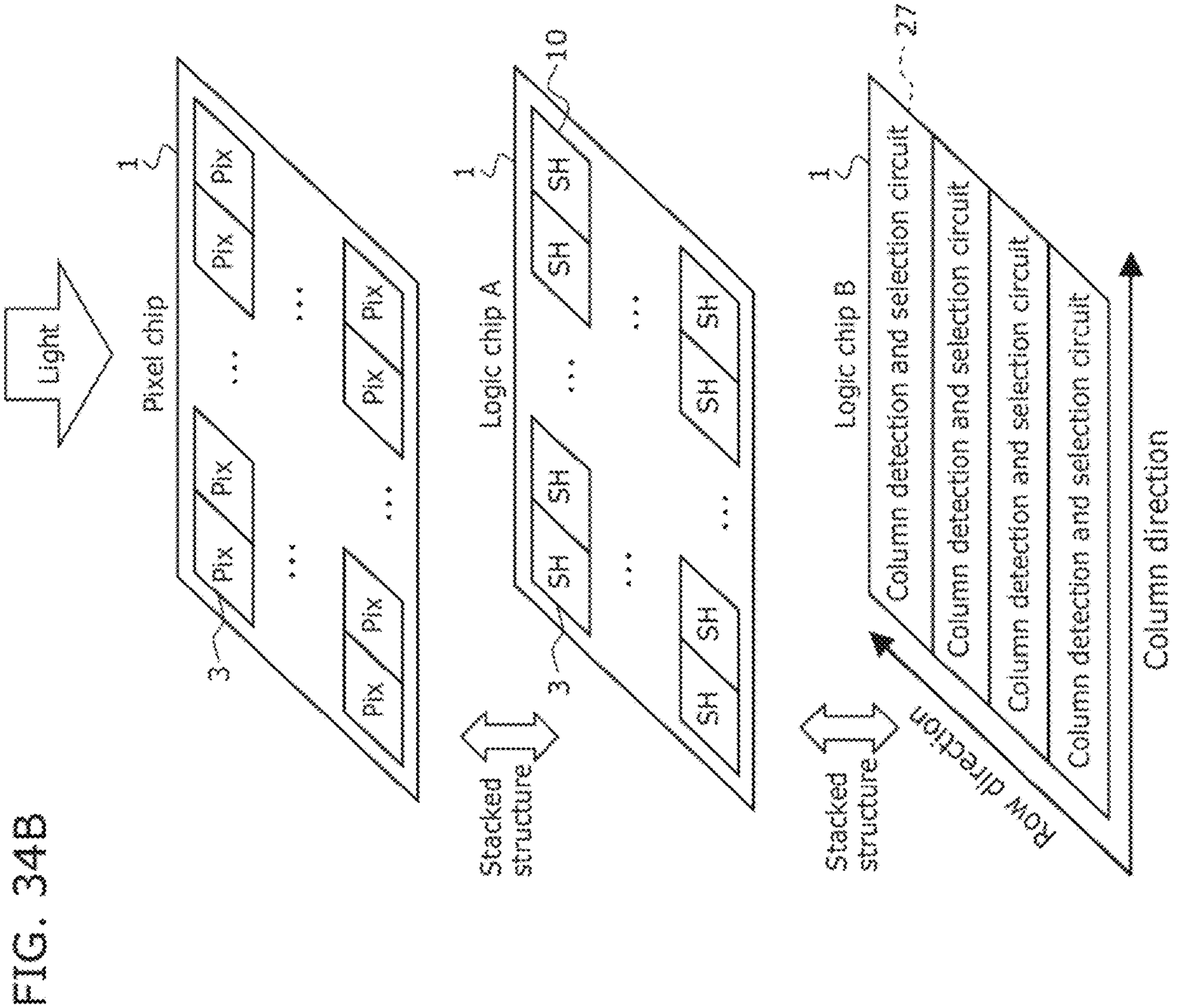
FIG. 34B is a diagram illustrating a configuration example of a solid-state imaging apparatus according to Embodiment 2 as a stacked-structure image sensor.

In FIG. 3 and FIG. 5, which are suitable configurations for the global shutter method, sample and hold circuits SH10 are provided on logic chip A, as illustrated in FIG. 34B, so vertical signal line 30A divided into vertically arranged segments is not provided in pixel array 1 but in the array of sample and hold circuits SH10. Detection and selection circuits 450 are correspondingly provided, and increased speed just as described above is achieved.

Timing Chart Description (Advantages of Embodiment 2)

Figure 32:
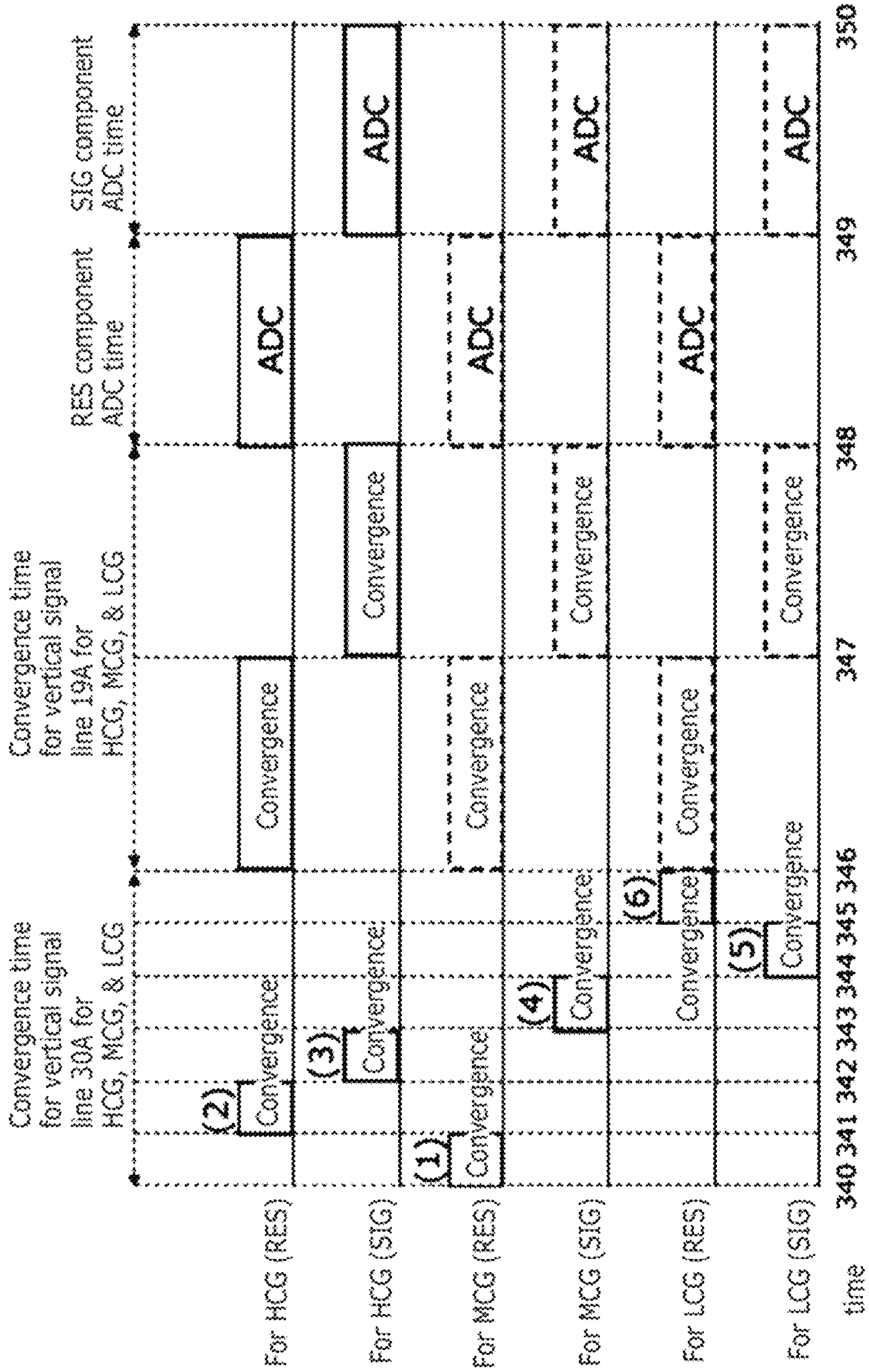
FIG. 32 illustrates vertical signal line and ADC timing according to Embodiment 2.
Figure 33A:
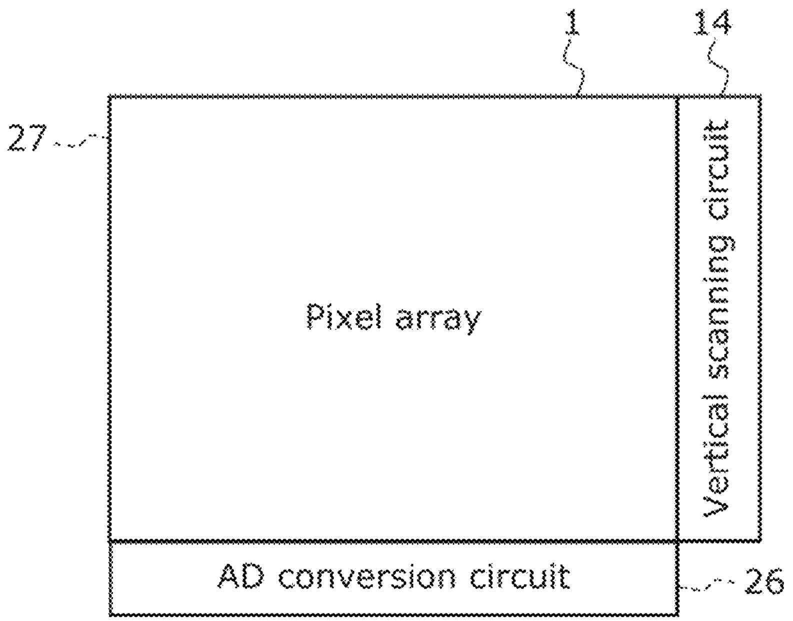
FIG. 33A is a block diagram of a configuration example of a pixel array according to Embodiment 2.
Figure 33B:
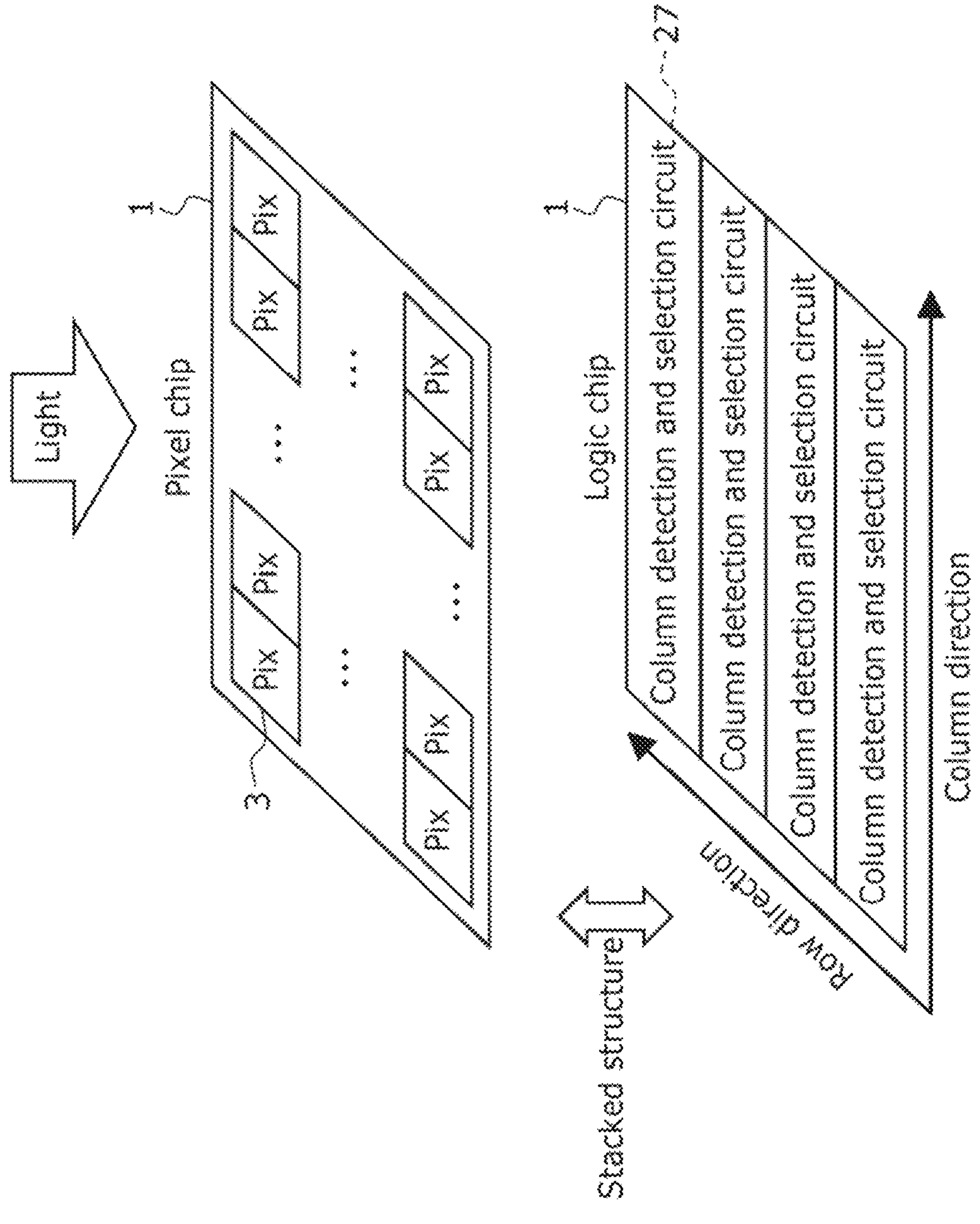
FIG. 33B is a diagram illustrating a configuration example of a solid-state imaging apparatus according to Embodiment 2 as a stacked-structure image sensor.

An example of the timing of the signal readout operation by detection and selection circuit 450 according to Embodiment 2 will be described below. Here, the timing when selecting one pixel signal from a plurality of pixel signals will be described. An example of the timing of signal readout operation according to Embodiment 2 is illustrated in FIG. 32. Specifically, FIG. 32 illustrates the convergence time of vertical signal line 30A and the processing time of AD conversion circuit 26.

Figure 30:
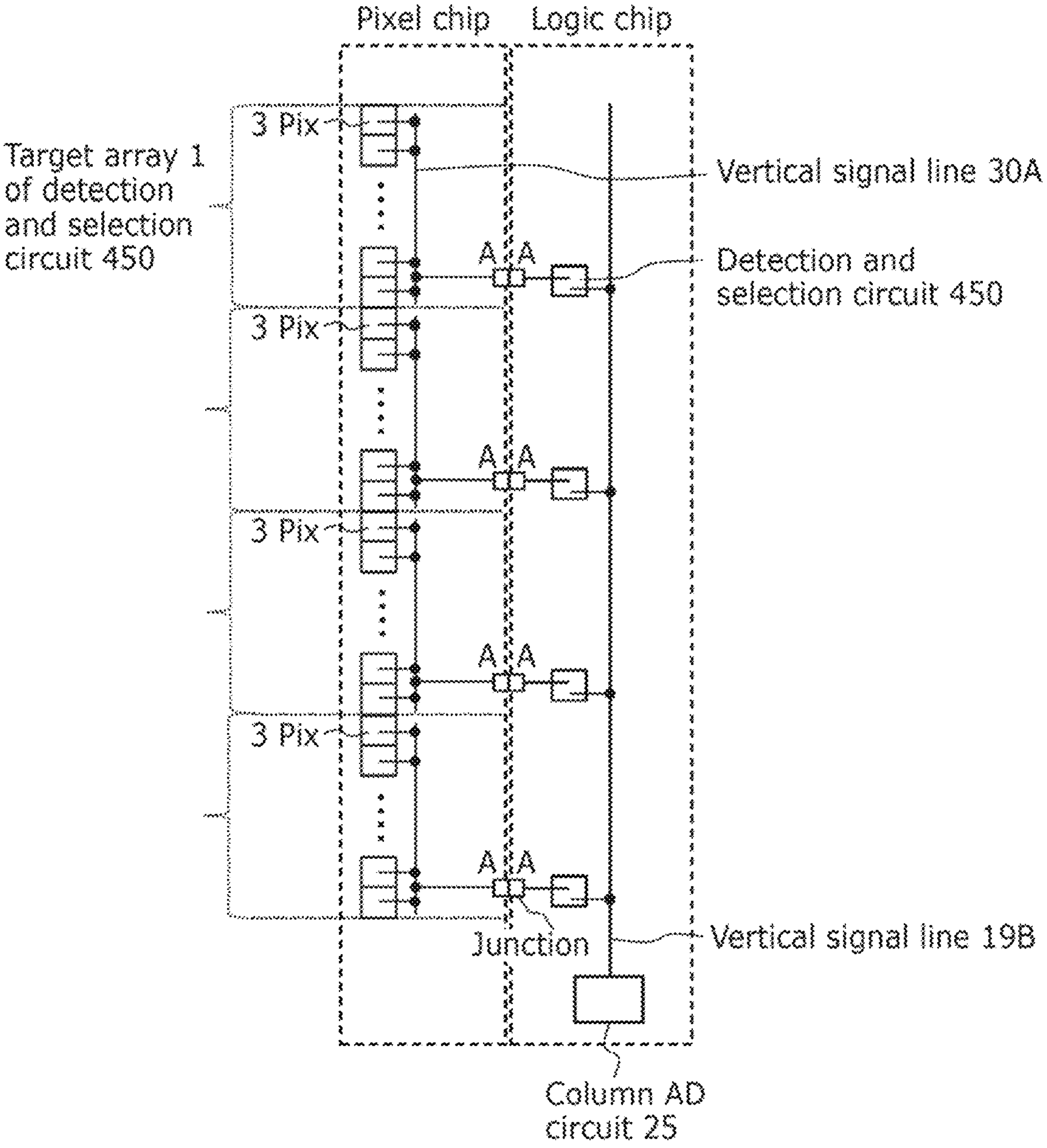
FIG. 30 illustrates an example of a junction between a pixel circuit and one detection and selection circuit according to Embodiment 2.

Here, as illustrated in FIG. 30, vertical signal line 30A of pixel array 1 is divided into four vertically arranged segments, each of which is provided with detection and selection circuit 450. Accordingly, the parasitic resistance and capacitance of vertical signal line 30A is ¼ that of Embodiment 1, and the convergence time is ¼ as well. Furthermore, as described in the Configuration Example for Increasing Speed of Detection and Selection Circuit section above, a plurality of detection and selection circuits 450 are provided, as illustrated in FIG. 31, and the amount of time required by detection and selection circuits 450 is zero.

First, for the reset component of MCG, the convergence time of vertical signal line 30A takes from time t340 to t341, and the pixel signal is held in sample and hold circuit SH412.

Next, for the reset component of HCG, the convergence time of vertical signal line 30A takes from time t341 to t342, and the pixel signal is held in sample and hold circuit SH412.

Next, for the signal component of HCG, the convergence time of vertical signal line 30A takes from time t342 to t343, and the pixel signal is held in sample and hold circuit SH412.

Next, for the signal component of MCG, the convergence time of vertical signal line 30A takes from time t343 to t344, and the pixel signal is held in sample and hold circuit SH412.

Next, for the signal component of LCG, the convergence time of vertical signal line 30A takes from time t344 to t345, and the pixel signal is held in sample and hold circuit SH412.

Next, for the reset component of LCG, the convergence time of vertical signal line 30A takes from time t345 to t346, and the pixel signal is held in sample and hold circuit SH412.

Next, the operating time to select one pixel signal from the plurality of pixel signals by detection and selection circuit 450 is not required as described above.

Next, for the reset signal component of this one selected pixel signal, the convergence time of vertical signal line 30A takes from time t346 to t347.

Next, for the reset signal component of this one selected pixel signal, the convergence time of vertical signal line 30A takes from time t347 to t348.

Next, for the reset component of this one selected pixel signal, the processing time of column AD circuit 25 takes from time t348 to t349.

Next, for the signal component of this one selected pixel signal, the processing time of column AD circuit 25 takes from time t349 to t350.

Here, convergence time and ADC time when HCG is selected are shown as solid lines for clarity, and convergence time and ADC time when MCG or LCG is selected are shown as dashed lines.

With this, the instances of convergence time of vertical signal line 30A remains the same, but the wiring length of vertical signal line 30A is reduced to ¼ and each convergence time is reduced to ¼, resulting in a total increase of speed by a factor of four. By going from three signals (HCG, MCG, and LCG) to one pixel signal, the processing time for each column AD circuit 25 can be reduced from six iterations to two iterations when considering both the signal and reset components, resulting in a total increase of speed by a factor of three. Furthermore, the speed of analog and digital processing in a subsequent stage including column AD circuit 25 can also be increased by a factor of three.

Furthermore, vertical signal line 30A of pixel array 1 can be divided per row, and selection circuit 400 and first detection circuit 401 or second detection circuit 402 can be provided for each pixel to minimize the convergence time of vertical signal line 30A, and then one or two signals can be selectively read out from the plurality of pixel signals at the output stage from pixel circuit 3.

This allows for increased speed in all areas in the pixel array, analog processing areas, and digital processing areas. At the same time, the same dynamic range as when a plurality of pixel signals are used can be maintained.

Reduced Power Consumption

Figure 35:
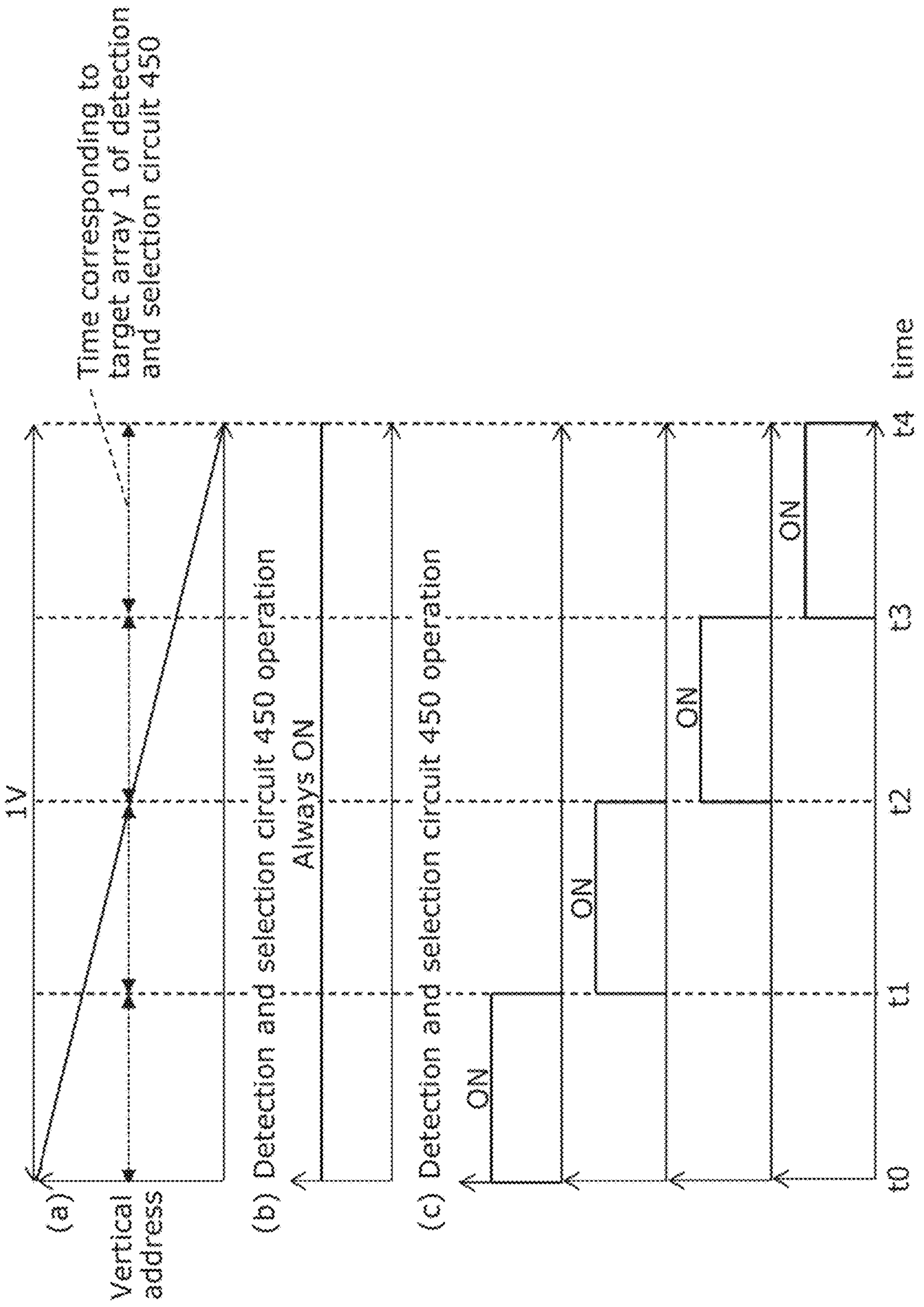
FIG. 35 is a block diagram of a configuration example for achieving reduced power consumption according to Embodiment 2.

The reduced power consumption in Embodiment 2 will be described with reference to FIG. 35. Using the example where vertical signal line 30A of pixel array 1 is divided into four vertically arranged segments, FIG. 35 illustrates (a) the time dependency of the vertical address, (b) an example of operation when detection and selection circuit 450 is always on, and (c) an example of operation when detection and selection circuit 450 is on only while processing the plurality of pixel signals corresponding to pixel array 1. The solid line in (a) indicates the readout timing for each row.

With this, the operation in (c) does not require detection and selection circuit 450 to be always on, and reduced power consumption can be achieved. Note that this can be implemented with both the rolling shutter method and the global shutter method.

Configuration Example of Stacked Structure BSI of Pixel Circuit and Detection and Selection Circuit Next, a configuration example of a stacked structure BSI of the pixel circuit and the detection and selection circuit according to Embodiment 1 and Embodiment 2 will be described.

FIG. 29, FIG. 33A, FIG. 33B, FIG. 34A, and FIG. 34B illustrate examples of the solid-state imaging apparatus according to Embodiment 2 configured as a stacked-structure back-side illumination image sensor. The solid-state imaging apparatus in these figures includes a first semiconductor chip and a second semiconductor chip that are bonded together or a plurality of semiconductor chips. The first semiconductor chip and the second semiconductor chip are bonded to each other on their respective wiring-layer-side surfaces. In these figures, "Pix" indicates pixel circuit 3, and "SH" indicates sample and hold circuit SH10.

The first semiconductor chip is labeled as the pixel chip in these figures, and includes the main part of solid-state imaging apparatus 100 as a back-side illumination CMOS image sensor. This first semiconductor chip includes photodiode PD of each pixel circuit 3.

The second semiconductor chip is labeled as logic chip A or logic chip B in these figures, and includes the main analog and logic circuits, such as signal processor 70, for example. This second semiconductor chip can include the column detection and selection circuit and sample and hold circuit SH10.

In solid-state imaging apparatus 100 configured in such a manner, pixel circuit 3 can be mounted on the pixel chip as a stacked structure BSI type CIS, and column detection and selection circuit 27 described above can be mounted on the logic chip. Stated differently, a PD can be provided per pixel circuit 3 on the pixel chip and column detection and selection circuit 27 can be configured on the logic chip, and the pixel signals can be read directly to column detection and selection circuit 27. Accordingly, in Embodiment 2 in particular, vertical signal line 30A of pixel array 1 is divided into a plurality of vertically arranged segments which significantly reduces the parasitic resistance and capacitance of vertical signal line 30A and speeds up the convergence time. Furthermore, at least one optimal pixel signal is selected from among the plurality of pixel signals from pixel array 1 by column detection and selection circuit 27. This reduces the number of pixel signals to be converged in vertical signal line 30A and the number of pixel signals to be AD converted, which in turn reduces the convergence time and the time and power required for signal processing, resulting in increased speed and reduced power. Specifically, the pixel chip and the logic chip may include connection points A and B illustrated in FIG. 30 and FIG. 31.

FIG. 29, FIG. 33A, FIG. 33B, FIG. 34A, and FIG. 34B illustrate examples of the solid-state imaging apparatus according to Embodiment 2 configured as a stacked-structure back-side illumination image sensor. The configuration is a stacked structure BSI type CIS in which each pixel of the pixel chip is provided, vertical signal line 30A of pixel array 1 is divided into a plurality of vertically arranged segments, and column detection and selection circuits 27 are provided on the logic chip to correspond with the divided pixel array 1. AD conversion circuit 26 is then provided on the pixel chip or logic chip.

FIG. 29, FIG. 34A, and FIG. 34B illustrate examples of the solid-state imaging apparatus according to Embodiment 2 configured as a stacked-structure back-side illumination image sensor. The configuration is a stacked structure BSI type CIS in which each pixel of the pixel chip is provided, vertical signal line 30A of pixel array 1 is divided into a plurality of vertically arranged segments, column detection and selection circuits 27 are provided on logic chip B to correspond with the divided pixel array 1, and sample and hold circuits 10 are provided on logic chip A between pixel array 1 and column detection and selection circuits 27. AD conversion circuit 26 is then provided on the pixel chip or logic chip A or B.

A configuration in which a PD is provided per pixel circuit 3 on the pixel chip and column detection and selection circuits 27 are provided on the logic chip can be achieved, and as illustrated in FIG. 29, since vertical signal line 30A of pixel array 1 is divided into a plurality of vertically arranged segments, the parasitic resistance and capacitance of vertical signal line 30A can be significantly reduced since the physical length of vertical signal 30A is reduced. Thus, for example, if vertical signal line 30A is divided into four vertically arranged segments as illustrated in FIG. 30 and FIG. 31, pixel signal readout time can be reduced to ¼ in convergence time. Furthermore, since this pixel signal can be directly read out to detection and selection circuit 450, at least one optimal pixel signal is selected from among the plurality of pixel signals from pixel array 1 by column detection and selection circuit 27.

Therefore, conventionally, using a plurality of pixel signals required a plurality of instances of convergence time of vertical signal line 19B and a plurality of instances of time for signal processing for AD conversion in AD conversion circuit 26, but according to Embodiment 2, by selecting at least one pixel signal from the plurality of pixel signals, vertical signal line 19B convergence time can be reduced to at least one instance, and the time required for signal processing for AD conversion in AD conversion circuit 26 can also be reduced to at least one instance. This makes it possible to achieve increased speed and reduced power.

Regarding the junction of the pixel chip and the logic chip, in FIG. 29, divided vertical signal lines 30A of pixel array 1 on the pixel chip are input to detection and selection circuit 450 via junction A, and the output is connected to vertical signal line 19B, which is input to column AD circuit 25.

Regarding the junction of the pixel chip and the logic chip, in FIG. 30, divided vertical signal lines 30A of pixel array 1 on the pixel chip are input to two detection and selection circuits 450 via junctions A and B, and the outputs are connected to vertical signal line 19B, which is input to column AD circuit 25. While one detection and selection circuit 450 detects first detection circuit 401, the signals are selected by the other selection circuit and read out row by row using the rolling method to achieve increased speed.

Embodiment 3A

Figure 36:
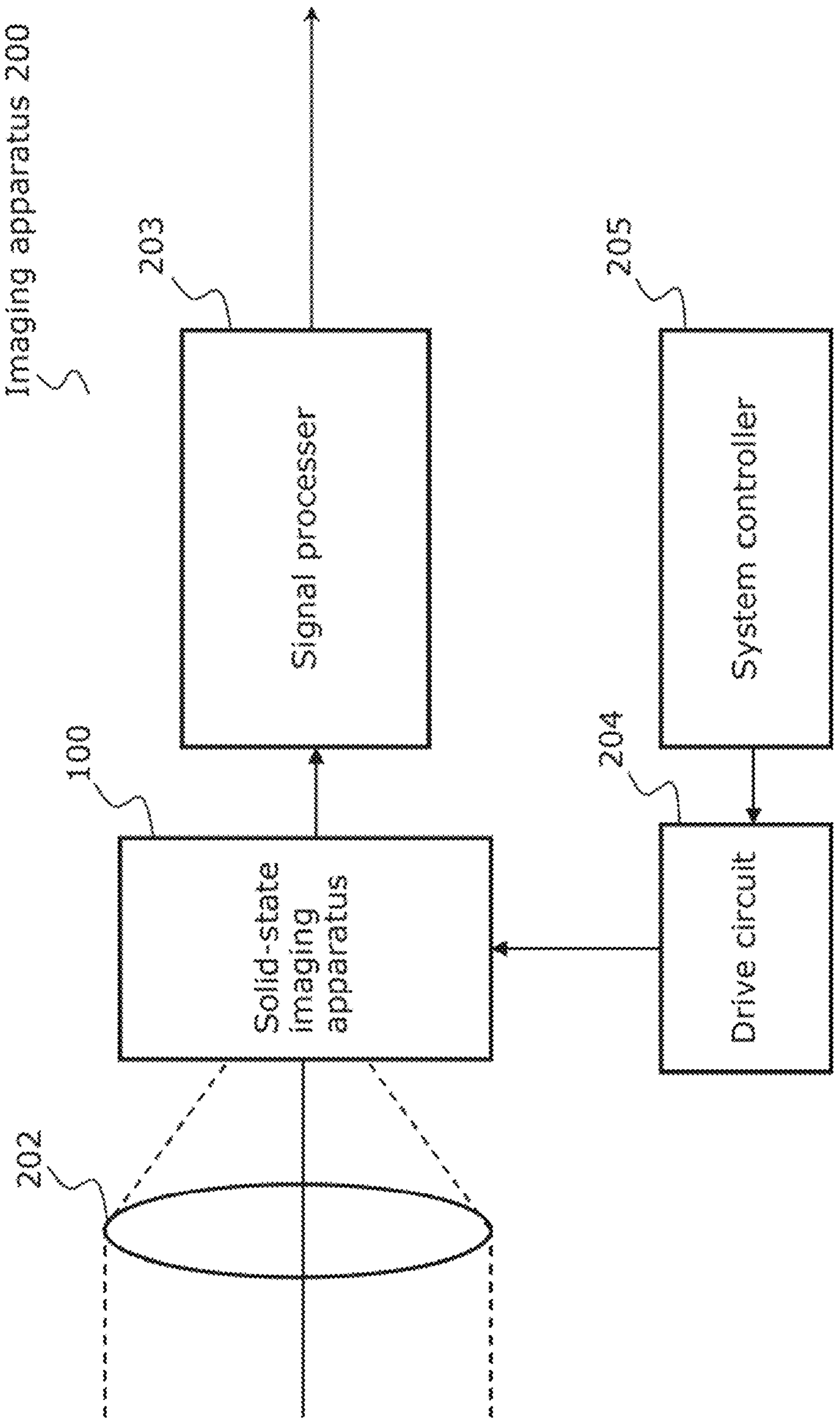
FIG. 36 is a diagram illustrating an example of a camera system including an imaging apparatus according to Embodiment 3.

FIG. 36 is a diagram illustrating a configuration example of imaging apparatus 200 to which solid-state imaging apparatus 100 according to Embodiments 1 to 2 is applied. The imaging apparatus illustrated in the same figure is a camera system, and includes solid-state imaging apparatus 100, imaging optical system 202 including a lens, signal processor 203, drive circuit 204, and system controller 205.

Solid-state imaging apparatus 100 according to Embodiments 1 to 2 is used in imaging apparatus 200.

Drive circuit 204 receives control signals in accordance with the drive mode from system controller 205 and provides drive mode signals to solid-state imaging apparatus 100. In solid-state imaging apparatus 100 to which the drive mode signals are supplied, drive pulses corresponding to the drive mode signals are generated and supplied to each block in solid-state imaging apparatus 100.

Signal processor 203 receives image signals output from solid-state imaging apparatus 100 and performs various signal processing on the image signals.

Thus, the imaging apparatus according to the present embodiment includes solid-state imaging apparatus 100 described above, imaging optical system 202 that guides incident light from a subject to solid-state imaging apparatus 100, and signal processor 203 that processes the output signal from solid-state imaging apparatus 100.

Embodiment 3B

Figure 37:
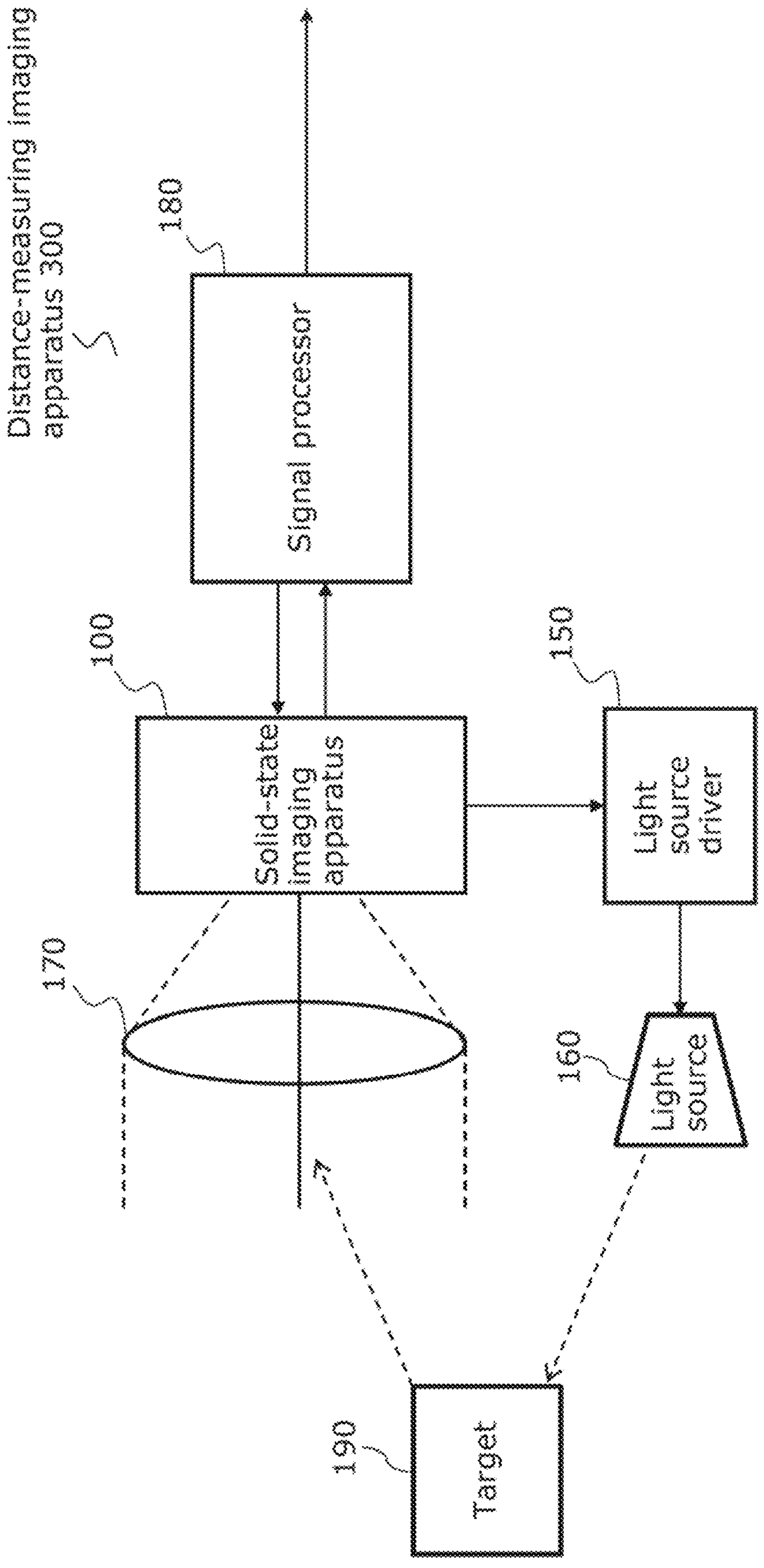
FIG. 37 is a diagram illustrating an example of a distance measuring system including a distance-measuring imaging apparatus according to Embodiment 3.

FIG. 37 is a block diagram of a configuration example of distance-measuring imaging apparatus 300 according to Embodiment 3B. The target whose distance is to be measured is labeled with reference sign 190.

Distance-measuring imaging apparatus 300 includes light source driver 150, light source 160, optical lens 170, signal processing circuit 180, and solid-state imaging apparatus 100.

Solid-state imaging apparatus 100 according to Embodiments 1 to 2 is used in distance-measuring imaging apparatus 300.

Light source driver 150 supplies drive signals to light source 160 in accordance with signals from solid-state imaging apparatus 100 instructing light emission.

Light source 160 generates pulsed light for distance measuring in accordance with the drive signals of light source driver 150.

Lens 170 is a lens for focusing the reflected pulsed light from target 190 corresponding to the pulsed light from light source 160.

Signal processing circuit 180 calculates the distance to target 190 based on the signal received from solid-state imaging apparatus 100.

Solid-state imaging apparatus 100 causes target 190 to be illuminated with near-infrared light from light source 160 under background light. The reflected light from target 190 is incident on pixel array 10 through optical lens 170. Reflected light incident on pixel array 1 is formed into an image, and the formed optical image is converted into a pixel signal. The output of solid-state imaging apparatus 100 is converted to distance data by signal processing circuit 180, and also to a visible distance image or luminance image, depending on the application.

INDUSTRIAL APPLICABILITY

The present disclosure relates to a solid-state imaging apparatus, as well as an imaging apparatus and a distance-measuring imaging apparatus that use the solid-state imaging apparatus as an imaging device, and is suitable for a video camera, a digital camera, and a distance-measuring system, for example.

The invention claimed is:

1. A solid-state imaging apparatus comprising:
a pixel circuit;
a detection and selection circuit; and
an AD conversion circuit, wherein
the pixel circuit outputs a plurality of pixel signals corresponding to mutually different gains or sensitivities,
the detection and selection circuit:
includes a sample and hold circuit that holds the plurality of pixel signals output from the pixel circuit,
compares one or more of the plurality of pixel signals held in the sample and hold circuit with a reference value to generate a signal selection signal that instructs selection of a pixel signal among the plurality of pixel signals,
selects at least one pixel signal among the plurality of pixel signals held in the sample and hold circuit based on the signal selection signal, and
selectively outputs the at least one pixel signal selected from the sample and hold circuit, and
the detection and selection circuit is arranged in a stage before the AD conversion circuit that AD converts the at least one pixel signal selectively output from the sample and hold circuit of the detection and selection circuit.

2. The solid-state imaging apparatus according to claim 1, further comprising:

a first semiconductor chip including a pixel array, the pixel array including a plurality of pixel circuits, each of which is the pixel circuit, and a vertical signal line; and a second semiconductor chip including the detection and selection circuit and stacked on the first semiconductor chip, wherein the pixel array and the vertical signal line are divided into a plurality of pixel arrays and a plurality of vertical signal lines, and the detection and selection circuit is provided in each of the plurality of pixel arrays.

3. The solid-state imaging apparatus according to claim 1, wherein the sample and hold circuit includes a plurality of sample and hold elements that hold the plurality of pixel signals, when the pixel signal instructed by the signal selection signal is within a predetermined range including the reference value, the detection and selection circuit mixes the pixel signal instructed by the signal selection signal with another pixel signal at a composition ratio of $\alpha$:(1−$\alpha$) to generate a mixed pixel signal, and outputs the mixed pixel signal as the pixel signal instructed by the signal selection signal, a being a real number greater than or equal to zero and less than or equal to one, $\alpha$ is defined according to a difference between a level of the pixel signal instructed by the signal selection signal and the reference value, and a capacitance ratio of the plurality of sample and hold elements corresponding to the plurality of pixel signals is an inverse ratio of a gain that converts an original signal charge into a voltage value within the pixel circuit in the plurality of pixel signals.

4. The solid-state imaging apparatus according to claim 1, wherein the sample and hold circuit includes two sample and hold capacitive elements, one for a reset component and one for a signal component, in correspondence with each of the plurality of pixel signals, and the detection and selection circuit compares a pixel signal level with the reference value, the pixel signal level calculated by subtracting the reset component from the signal component.

5. The solid-state imaging apparatus according to claim 1, wherein the reference value is defined according to a gain of AD conversion by the AD conversion circuit.

6. The solid-state imaging apparatus according to claim 1, further comprising:

a reference ramp signal generator that simultaneously generates a plurality of RAMP signals corresponding to the plurality of pixel signals; and a selection switch that selects and outputs one of the plurality of RAMP signals to the AD conversion circuit, wherein the selection switch selects the one of the plurality of RAMP signals according to the signal selection signal.

7. The solid-state imaging apparatus according to claim 1, wherein the detection and selection circuit generates a same signal selection signal for pixels included in a unit defined according to a color filter array.

8. The solid-state imaging apparatus according to claim 1, wherein the signal selection signal generated by the detection and selection circuit instructs selection of two pixel signals among the plurality of pixel signals.

9. The solid-state imaging apparatus according to claim 1, wherein the detection and selection circuit outputs the at least one pixel signal selected to the AD conversion circuit via a vertical signal line, the detection and selection circuit generates a gain selection signal having a same effect as the signal selection signal, and the vertical signal line is shared in a time-division manner for transferring of the gain selection signal from the detection and selection circuit to the AD conversion circuit and transferring of the pixel signal from the detection and selection circuit to the AD conversion circuit.

10. The solid-state imaging apparatus according to claim 1, wherein the pixel circuit includes a first amplification transistor for outputting the plurality of pixel signals, the detection and selection circuit includes a second amplification transistor that outputs the pixel signal instructed by the signal selection signal, and a gate area of the second amplification transistor is greater than a gate area of the first amplification transistor.

11. The solid-state imaging apparatus according to claim 1, wherein a vertical signal line from the detection and selection circuit is provided above a wiring layer of a power supply or above a wiring layer of a ground electric potential.

12. The solid-state imaging apparatus according to claim 1, further comprising:

a first semiconductor chip including a pixel array, the pixel array including a plurality of pixel circuits, each of which is the pixel circuit, and a vertical signal line; and a second semiconductor chip including the detection and selection circuit and stacked on the first semiconductor chip, wherein the vertical signal line is divided into vertically arranged segments per row of the pixel array, and the detection and selection circuit is provided per pixel circuit.

13. An imaging apparatus comprising:

the solid-state imaging apparatus according to claim 1 that captures an image of a subject;

an imaging optical system that guides incident light from the subject to the solid-state imaging apparatus; and a signal processor that processes an output signal from the solid-state imaging apparatus.

14. A distance-measuring imaging apparatus comprising:

the solid-state imaging apparatus according to claim 1 that controls driving of a light source to emit pulsed light to a target and captures reflected light from the target;

an imaging optical system that guides the reflected light from the target to the solid-state imaging apparatus; and a signal processor that processes an output signal from the solid-state imaging apparatus.

15. The solid-state imaging apparatus according to claim 1, wherein the sample and hold circuit of the detection and selection circuit comprises:

a plurality of sample and hold capacitive elements;

a plurality of associated sample and hold switching elements; and a plurality of associated readout selection switching elements.

16. The solid-state imaging apparatus according to claim 1, wherein the plurality of pixel signals include a first pixel signal for low illuminance, a second pixel signal for medium illuminance, and a third pixel signal for high illuminance, the solid-state imaging apparatus further comprises a combining circuit that calculates, by interpolation processing, an unselected pixel signal based on the at least one pixel signal selected, and combines the at least one pixel signal selected and the unselected pixel signal calculated by interpolation processing, the reference value in the detection and selection circuit includes a first reference value and a second reference value, the first reference value includes a value corresponding to a level, of the second pixel signal, that corresponds to a level at a boundary immediately before a saturation level of the first pixel signal, and the second reference value corresponds to a level at a boundary immediately before a saturation level of the second pixel signal.

17. The solid-state imaging apparatus according to claim 16, wherein the first reference value includes a value that corresponds to a level at a boundary immediately before a saturation level of the first pixel signal.

18. The solid-state imaging apparatus according to claim 16, wherein the first reference value and the second reference value are adjusted according to the signal selection signal of a previous frame to imbue hysteresis which facilitates selection of a pixel signal for a current frame of a same gain or sensitivity as the pixel signal instructed by the signal selection signal of the previous frame.

19. The solid-state imaging apparatus according to claim 1, wherein the detection and selection circuit includes:

a detection circuit that generates the signal selection signal; and a selection circuit that includes the sample and hold circuit and selects the at least one pixel signal among the plurality of pixel signals held in the sample and hold circuit based on the signal selection signal.

20. The solid-state imaging apparatus according to claim 19, wherein a plurality of pairs of the selection circuit and the detection circuit are provided per pixel circuit, and the detection circuit included in one of the plurality of pairs and the selection circuit included in another of the plurality of pairs operate in parallel temporally.

* * * * *